(12) United States Patent
Sitti et al.

(10) Patent No.: US 8,398,909 B1
(45) Date of Patent: Mar. 19, 2013

(54) DRY ADHESIVES AND METHODS OF MAKING DRY ADHESIVES

(75) Inventors: Metin Sitti, Pittsburgh, PA (US); Burak Aksak, Pittsburgh, PA (US); Michael Murphy, Waltham, MA (US)

(73) Assignee: Carnegie Mellon University, Pittsburgh, PA (US)

( * ) Notice: Subject to any disclaimer, the term of this patent is extended or adjusted under 35 U.S.C. 154(b) by 726 days.

(21) Appl. No.: 12/562,643

(22) Filed: Sep. 18, 2009

Related U.S. Application Data

(60) Provisional application No. 61/192,482, filed on Sep. 18, 2008.

(51) Int. Cl.
| | |
|---|---|
| *B29C 41/20* | (2006.01) |
| *B29C 45/14* | (2006.01) |
| *B29C 59/02* | (2006.01) |
| *B29C 53/00* | (2006.01) |
| *B29C 41/22* | (2006.01) |

(52) U.S. Cl. ........ 264/255; 264/243; 264/250; 264/257; 264/259; 264/266; 264/279; 264/295; 264/320; 264/339

(58) Field of Classification Search .................. None
See application file for complete search history.

(56) References Cited

U.S. PATENT DOCUMENTS

| | | | | |
|---|---|---|---|---|
| 3,192,589 | A * | 7/1965 | Pearson | 24/452 |
| 3,718,725 | A * | 2/1973 | Hamano | 264/163 |
| 5,392,498 | A * | 2/1995 | Goulait et al. | 24/452 |
| 5,636,414 | A * | 6/1997 | Litchholt | 24/304 |
| 5,762,645 | A * | 6/1998 | Peck et al. | 604/391 |
| 5,800,845 | A * | 9/1998 | Akeno et al. | 425/224 |
| 5,845,375 | A * | 12/1998 | Miller et al. | 24/452 |
| 6,393,673 | B1 * | 5/2002 | Kourtidis et al. | 24/304 |
| 6,569,673 | B1 * | 5/2003 | Nakagawa et al. | 435/286.6 |
| 6,737,160 | B1 | 5/2004 | Full et al. | |
| 6,872,439 | B2 | 3/2005 | Fearing et al. | |
| 7,011,723 | B2 | 3/2006 | Full et al. | |
| 7,074,294 | B2 * | 7/2006 | Dubrow | 156/276 |
| 7,229,685 | B2 | 6/2007 | Full et al. | |
| 7,445,741 | B2 * | 11/2008 | Poulakis et al. | 264/254 |
| 7,632,417 | B2 | 12/2009 | Suh et al. | |
| 7,700,173 | B2 * | 4/2010 | Jagota et al. | 428/40.1 |
| 7,811,272 | B2 * | 10/2010 | Lindsay et al. | 604/389 |
| 8,142,700 | B2 * | 3/2012 | Sitti et al. | 264/139 |
| 8,153,254 | B2 * | 4/2012 | Arzt et al. | 428/397 |
| 8,206,631 | B1 * | 6/2012 | Sitti et al. | 264/255 |
| 2002/0124359 | A1 * | 9/2002 | Murasaki et al. | 24/452 |
| 2004/0134045 | A1 * | 7/2004 | Poulakis et al. | 24/442 |
| 2005/0151385 | A1 * | 7/2005 | Autumn et al. | 294/86.4 |
| 2005/0181170 | A1 | 8/2005 | Fearing et al. | |

(Continued)

OTHER PUBLICATIONS

Autumn, Kellar et al., "Adhesive force of a single gecko foot-hair", Letters to Nature, 2000 Macmillan Magazines Ltd., Nature, vol. 405, 681-685, Jun. 8, 2000, www.nature.com.

(Continued)

*Primary Examiner* — Jeffrey Wollschlager
(74) *Attorney, Agent, or Firm* — David G. Oberdick; Peter J. Borghetti

(57) ABSTRACT

Dry adhesives and methods of making dry adhesives including a method of making a dry adhesive including applying a liquid polymer to the second end of a stem, contacting the liquid polymer on the stem with a tip shaping surface, bending the stem relative to the backing layer while contacting the liquid polymer on the stem with the tip shaping surface, curing the liquid polymer to form a tip on the second end of the stem while bending the stem relative to the backing layer and while contacting the liquid polymer on the stem with the tip shaping surface, and
removing the tip from the tip shaping surface after the liquid polymer cures.

14 Claims, 38 Drawing Sheets

U.S. PATENT DOCUMENTS

| | | | |
|---|---|---|---|
| 2005/0271870 A1* | 12/2005 | Jackson | 428/297.7 |
| 2006/0005362 A1* | 1/2006 | Arzt et al. | 24/442 |
| 2006/0078725 A1 | 4/2006 | Fearing et al. | |
| 2006/0202355 A1 | 9/2006 | Majidi et al. | |
| 2008/0070002 A1* | 3/2008 | Majidi et al. | 428/141 |
| 2008/0073323 A1 | 3/2008 | Full et al. | |
| 2008/0280085 A1* | 11/2008 | Livne | 428/40.1 |
| 2010/0136281 A1* | 6/2010 | Sitti et al. | 428/92 |

OTHER PUBLICATIONS

Autumn, Kellar et al., "Mechanisms of Adhesion in Geckos", Integr. Comp. Biol., 42:1081-1090 (2002).

Sitti, Metin et al., "Synthetic Gecko Foot-Hair Micro/Nano-Structures as Dry Adhesives", Journal of Adhesion Science and Technology, 2003 (under review).

Glassmaker, N.J., et al., "Design of biomimetic fibrillar interfaces: 1. Making Contact", J.R. Soc. Lond. Interfaces (2004)DOI:10.1098/RSIF.2004.0004, 1-11.

Chung, Jun Young et al., "Roles of discontinuities in bio-inspired adhesive pads", J.R. Soc. Interface (2005) 2, 55-61; doi:10.1098/rsif.2004.0020.

Hansen, W.R. et al., "Evidence for self-cleaning in gecko setae", PNAS, Jan. 11, 2005, vol. 102, No. 2, 385-389. www.pnas.org/cgi/doi/10.1073/pnas.0408304102.

Autumn, K. et al., "Effective elastic modules of isolated gecko setal arrays", Journal of Experimental Biology 209, 3558-3568, The Company of Biologists 2006; doi: 10.1242/jeb02469.

Kim, S. et al., "Biologically inspired polymer microfibers with spatulate tips as repeatable fibrillar adhesives", Applied Physics Letters 89, 261911-1 to 261911-3 (2006).

del Campo, Aranzazu et al., "Contact Shape Controls Adhesion of Bioinspired Fibrillar Surfaces", American Chemical Society, 1-8, Aug. 28, 2007; doi:10:1021/197010502.

del Campo, Aranzazu et al., "Patterned Surfaces with Pillars with Controlled 3D Tip Geometry Mimicking Bioattachment Devices", Adv. Mater, 2007, 19, 1973-1977; DOI:10.1002/adma.200602476.

Ge, Liehui et al. "Carbon nanotube-based synthetic gecko tapes", PNAS, Jun. 26, 2007, vol. 104, No. 26, 10792-10795. www.pnas.org/cgi/doi/10.1073/pnas.0703505104.

Gorb. S., et al. "Biomimetic mushroom-shaped fibrillar adhesive microstructure", J.R. Soc. Interface (2007) 4. 271-275; DOI:10.1098/rsif:2006.0164.

Greiner, Christian et al. "Adhesion of Bioinspired Micropatterned Surfaces: Effects of Pillar Radius, Aspect Ratio, and Preload", Langmuir, American Chemical Society, 1-8; Feb. 27, 2007; 10:1021/1a0633987.

Murphy, Michael P., et al. "Adhesion and anisotropic friction enhancements of angled heterogeneous micro-fiber arrays with spherical and spatula tips", J. Adhesion Sci. Technol., vol. 21, No. 12-13, 1281-1296 (2007). www.brill.nl/jast.

Kustandi, T.S., et al. "Fabrication of a gecko-like hierarchical fibril array using a bonded porous alumina template", J. Micromech. Microeng. 17 (2007) N75-N81; DOI:10.1088/0960-1317/17/10/NO2.

Lee, Haestin et al. "Mussel-Inspired Surface Chemistry for Multifunctional Coatings", Science, vol. 318, Oct. 19, 2007, 426-430. www.sciencemag.org/cgi/collection/mat_sci.

Aksak, Burak et al., "Gecko Inspired Micro-Fibrillar Adhesives for Wall Climbing Robots on Micro/Nanoscale Rough Surfaces", Proc. IEEE Robotics and Automation Conference, 3058-3063, Pasadena, CA, May 2008.

Bhushan, Bharat et al., "Biomimetic hierarchical structure for self-cleaning", Applied Physics Letters 93, 0931101-1 to 0931101-3 (2008); DOI:10.1063/1.2976635.

Jeong, Hoon Eui, et al., "High aspect-ratio polymer nanostructures by tailored capillarity and adhesive force", Science Direct, Colloids and Surfaces A: Physiochem Eng. Aspects 313-314 (2008) 359-364. www.sciencedirect.com; DOI:10.101b/j.colsurfa.2007.04.163.

Mahdavi, Alborz et al., "A biodegradable and biocompatible gecko-inspired tissue adhesive", PNAS, Feb. 19, 2008, vol. 105, No. 7, 2307-2312. www.pnas.org/cgi/doi/10.1073/pnas.0712117105.

Min, Wei-Lun et al., "Bioinspired Self-Cleaning Antireflection Coatings", Adv. Materials, 2008, 20, 1-5; DOI1:10-1002/adma.200800791.

Qu, Liangti et al., "Carbon Nanotube Arrays with Strong Shear Binding-On and Easy Normal Lifting-Off", Science, Oct. 10, vol. 322, 235-242, 2008; www.sciencemag.org/cgi/collectionb/mat_sci.

Sethi, Sunny et al., "Gecko-Inspired Carbon Nanotube-Based Self-Cleaning Adhesives", Nano Letters, Am. Chem. Soc., vol. 8, No. 3 (2008) 822-825.

Greiner, Christian, et al., "Hierarchical Gecko-Like Adhesives", Adv. Materials, 2009, 2, 479-482. DOI:10.1002/adma.200801548.

Lee, Jongho et al., "Contact Self-Cleaning of Synthetic Gecko Adhesive From Polymer Microfibers", Langmuir, Am. Chem. Soc., 24, 10587-10591, 2008. www.ncbi.nlm.nih.gov/pubmed/18781819.

Kim, Seok et al., "Enhanced friction of elastomer microfiber adhesives with spatulate tips", Applied Physics Letters, 91, 221913-1 to 221913-3 (2007).

Murphy, Michael P. et al., "Gecko-Inspired Directional and Controllable Adhesion", Wiley InterScience, Small, 2009, 5 No. 2, 170-175; DOI:10.1002/smll.200801161.

Murphy, Michael P. et al., "Enhanced Adhesion by Gecko-Inspired Hierarchical Fibrillar Adhesives", Applied Materials & Interfaces, vol. 1, No. 4, 849-855 (2009); DOI:10.1021/am8002439.

Del Campo, Aranzazu, et al., Design Parameters and Current Fabrication Approaches for Developing Bioinspired Dry Adhesives, Macromal. Biosci. 2007, 7, 118-127, DOI 10.1002/mabi.200600214.

Lanzetta, M., et al., "Shape deposition manufacturing of biologically inspired hierarchical microstructures", CIRP Annals—Manufacturing Technology, 57 (2008) 231-234. www.ees.elsevier.com/cirp/default.asp.

Arzt, Eduard, et al., "From micro to nano contacts in biological attachment devices", PNAS, Sep. 16, 2003, vol. 100, No. 19, 10603-10606. www.pnas.org/cgi/doi/10.1073/pnas.1534701100.

Autumn, K., et al., "Frictional adhesion: a new angle on gecko attachment", J. of Exp. Bio., 209, 3569-3579, 2006. doi: 10:1242/jeb.02486.

Autumn, Kellar, et al, "Evidence for van der Waals adhesion in gecko setae", PNAS, Sep. 17, 2002, vol. 99, No. 19, pp. 12252-12256. www.pnas.org/cgi/doi/10.1073/pnas.192252799.

Bogy, D.B., "Two Edge-Bonded Elastic Wedges of Different Materials and Wedge Angles Under Surface Tractions", Journal of Applied Mechanics, Jun. 1971, 377-386.

Ge, Liehui, et al., "Carbon nanotube-based synthetic gecko tapes", PNAS, Jun. 26, 2007, vol. 104, No. 26, 10792-10795, www.pnas.org/cgi/doi/10.1073/pnas.0703505.

Glassmaker, Nicholas, et al., "Biologically inspired crack trapping for enhanced adhesion", PNAS Jun. 26, 2007, vol. 104, No. 26, 10786-10791. www.pnas.org/cgi/doi/10.1073/pnas.0703762104.

Huber, Gerrit, et al., "Evidence for capillarity contributions to gecko adhesion from single spatula nanomechanical measurements", PNAS, Nov. 8, 2005, vol. 102, No. 45, 16293-16296. www.pnas.org/cgi/doi/10.1073/pnas.0506328102.

Kim, Sangbae et al., Smooth Vertical Surface Climbing with Directional Adhesion, IEEE Transactions on Robotics, vol. 24, No. 1, Feb. 2008, 1-10.

Irschick, Duncan J., et al., Whole-organism studies of adhesion in pad-bearing lizards: creative evolutionary solutions to functional problems, J. Comp. Physiol A.: Neuroethology, Sensory, Neural, and Behavioral Physiology (2006) vol. 192, No. 11, 1169-1177. DOI: 10:1007/s00359-006-0145-2.

Aksak, Burak et al., "Adhesion of Biologically Inspired Vertical and Angled Polymer Microfiber Arrays", Am. Chem. Soc., Langmuir, A-H (2006).

Sitti, Metin et al., "Nanomolding based fabrication of synthetic gecko foot-hairs", Proceedings of the IEEE Nanotechnology Conference, 137-140, 2002.

Spuskanyuk, A.V., et al., "The effect of shape on the adhesion of fibrillar surfaces", Acta Biomaterialia, vol. 4, No. 6, 1669-1676, 2008.

Asbeck, Alan, et al., "Climbing rough vertical surfaces with hierarchical directional adhesion", IEEE Transactions on Robotics, vol. 24, No. 1, 1-10, 2008.

Kim, Tae Wan, et al., Effect of stiffness of multi-level hierarchical attachment system on adhesion enhancement, Ultramicroscopy 107 (2007) 902-913. doi: 10.1016/j.ultramic.006.11.008.

Autumn, K. et al., "Biological Adhesives", Springer Berlin Heidelberg, 2006, Preface and Table of Contents.

Simmermacher, G., "Untersuchungen ber haftapparate an tarsalgliedern von insekten," Zeitschr. Wiss. Zool, vol. 40, 481-556, 1884.

Dellit, W. D., "Zur anatomie and physiologie der geckozehe," Jena. Z. Naturw, vol. 68, 613-656, 1934.

Yao, H. et al., "Adhesion and sliding response of a biologically inspired fibrillar surface: experimental observations", J. R. Soc. Interface (2008) 5, 723-733. doi:10.1098/rsif.2007.1225.

* cited by examiner

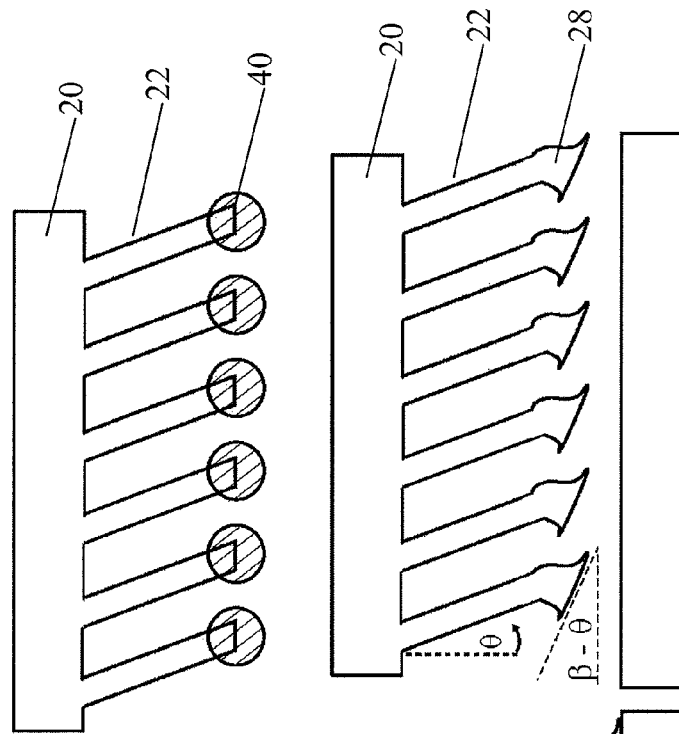
Fig. 3b
Fig. 3d
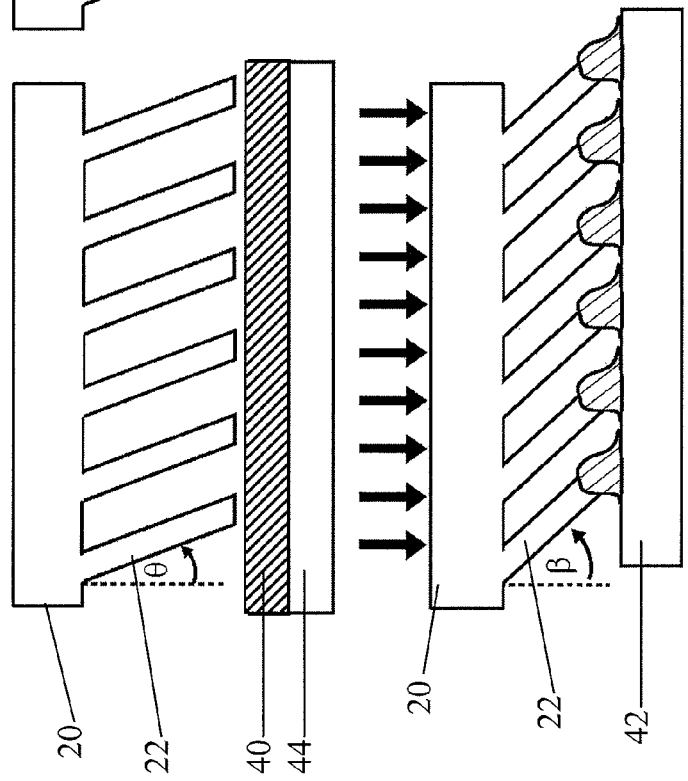
Fig. 3a
Fig. 3c

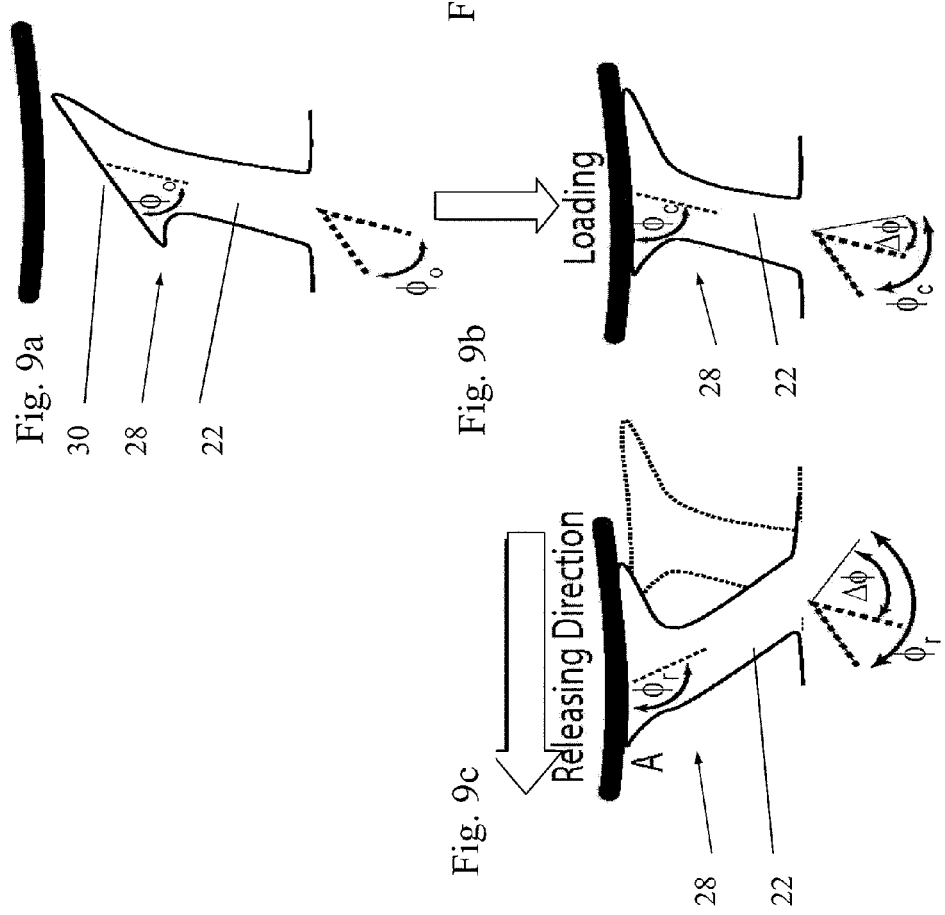

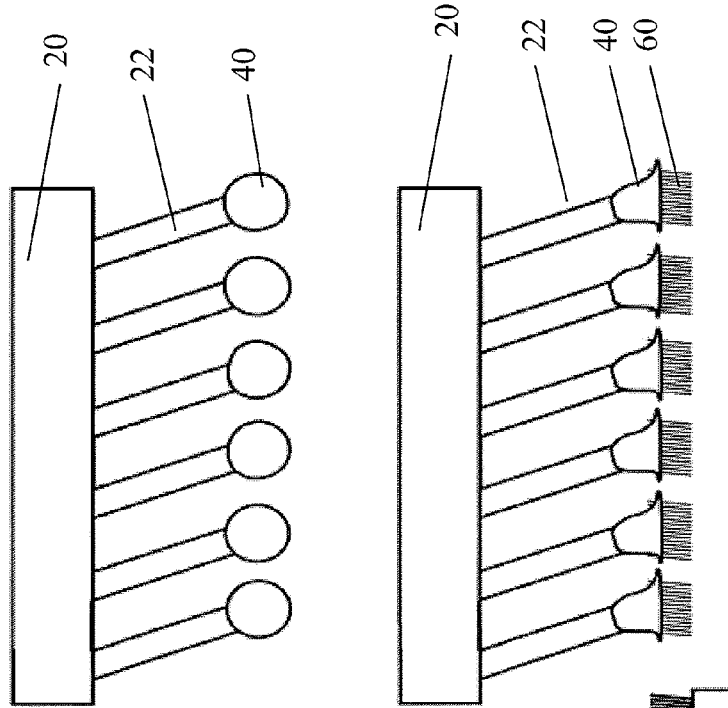
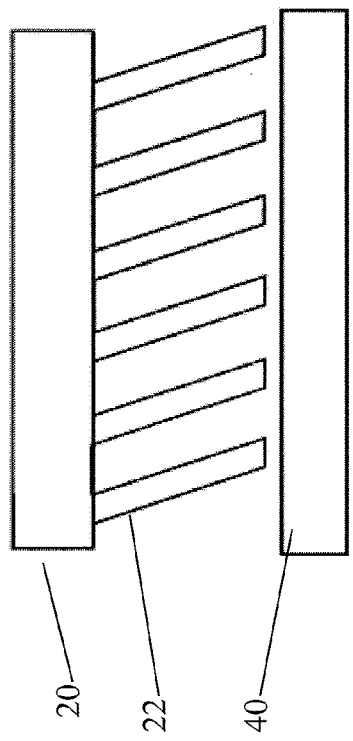
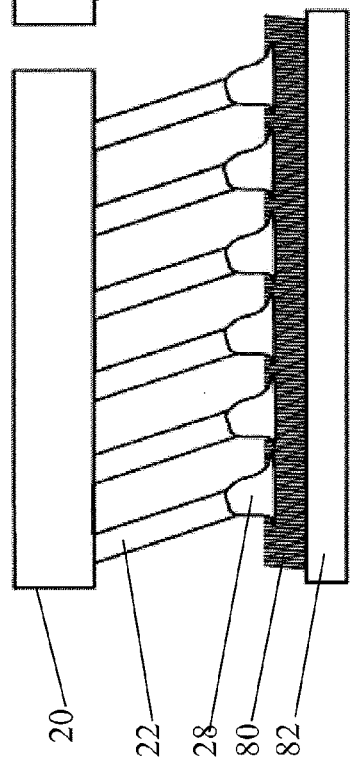
Fig. 15a
Fig. 15b
Fig. 15c
Fig. 15d

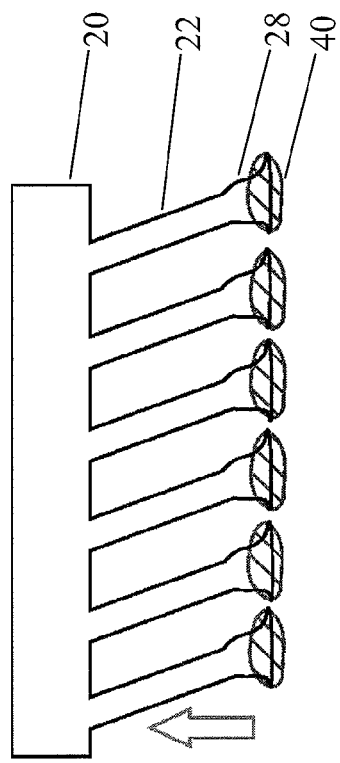
Fig. 17a
Fig. 17b
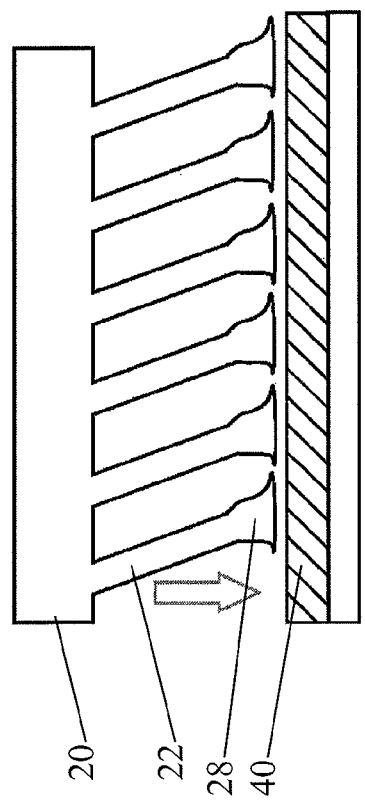
Fig. 17c
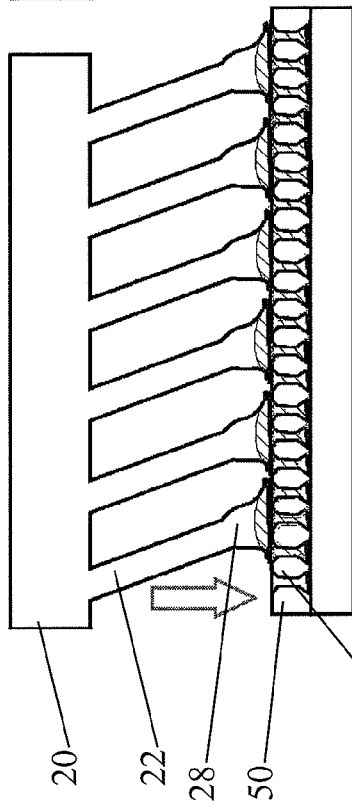
Fig. 17d

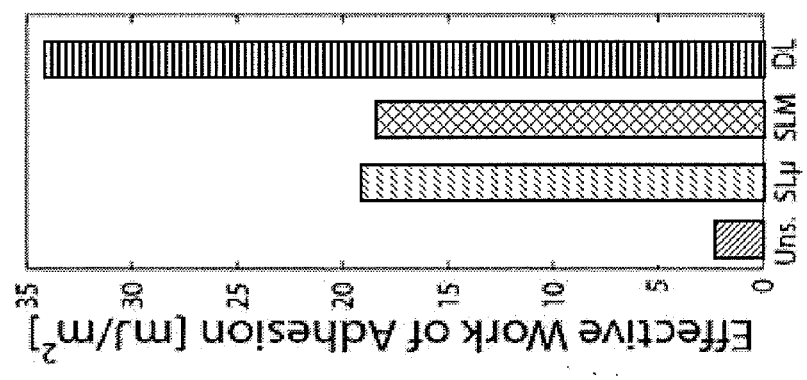
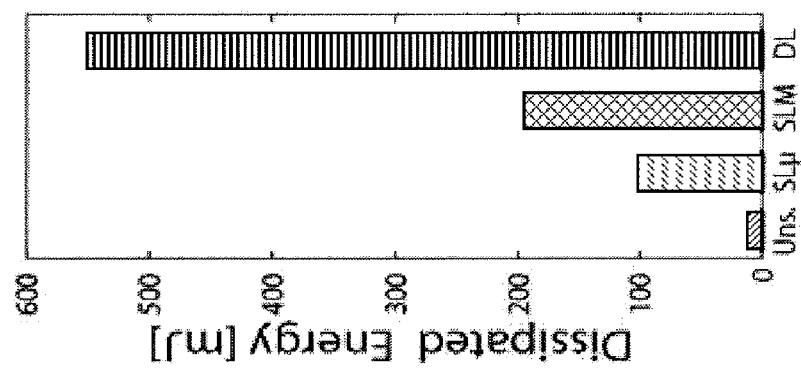
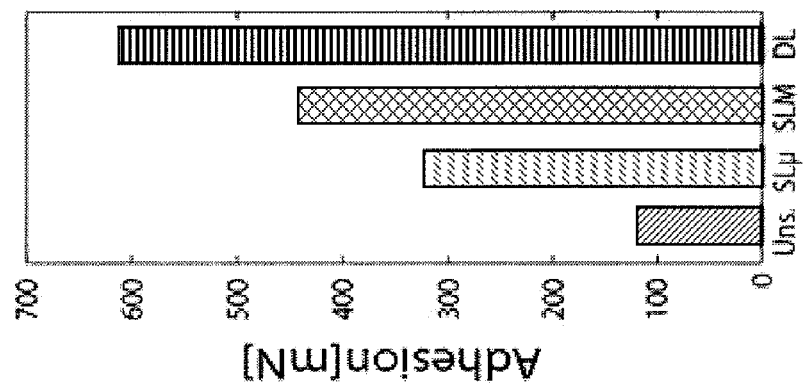
Fig. 29b
Fig. 29c
Fig. 29d

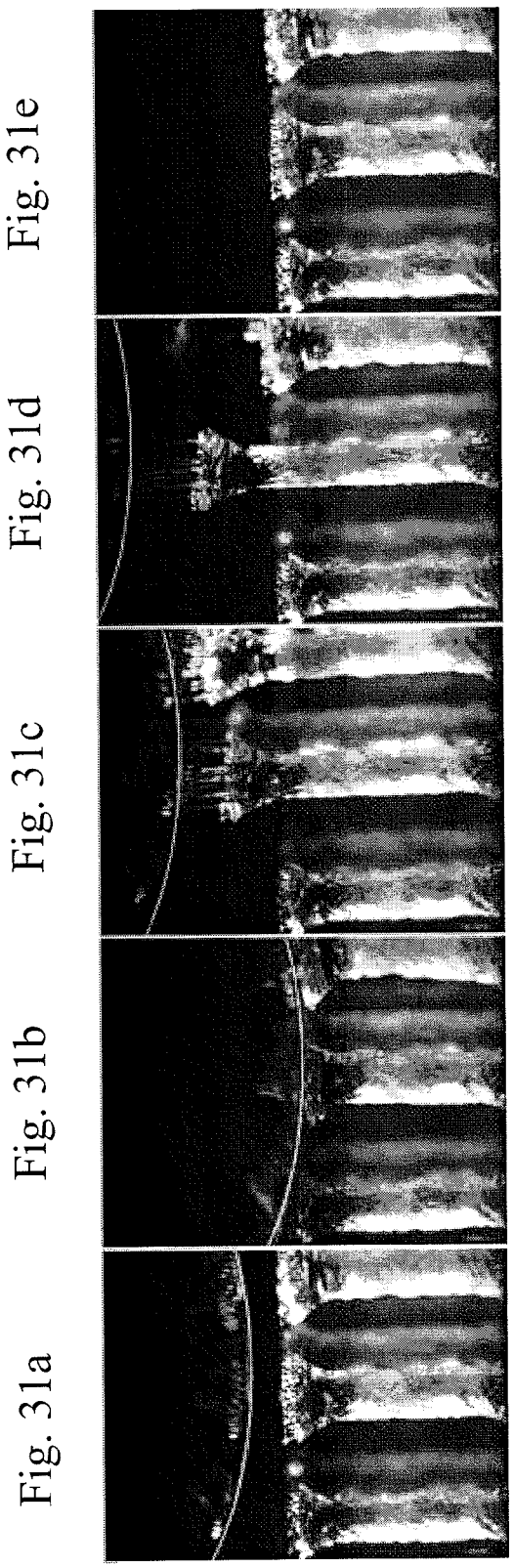

DRY ADHESIVES AND METHODS OF MAKING DRY ADHESIVES

CROSS-REFERENCE TO RELATED APPLICATIONS

This application claims priority from U.S. provisional patent application No. 61/192,482, filed Sep. 18, 2008, and which is incorporated by reference herein. This application is related to U.S. patent application Ser. No. 12/448,242, filed Jun. 12, 2009, and U.S. patent application Ser. No. 12/448,243, filed Jun. 12, 2009. This application is related to United States patent application entitled "Dry Adhesives and Methods of Making Dry Adhesives", filed Sep. 18, 2009, under Ser. No. 12/562,683.

STATEMENT REGARDING FEDERALLY-SPONSORED RESEARCH AND DEVELOPMENT

This invention was made, in part, with government support under Grant Number CMMI-0900408 awarded by the National Science Foundation. The United States government may have certain rights in this invention.

FIELD OF THE INVENTION

The present invention relates to dry adhesives, and methods for making dry adhesives including, for example, fibrillar microfibers and nanofibers.

BACKGROUND OF THE INVENTION

Fibrillar Adhesives in Nature

Nature provides endless inspiration for solutions to engineering challenges. Particularly at the small (sub-millimeter) scale, millions of years of evolution has resulted in fascinating structures with unique, sometimes non-intuitive properties. In the case of small agile climbing animals, fibrillar foot-pads as a solution for gripping surfaces has evolved many times. Similar structures are present in animals of different phyla, including arthropods (spiders, insects), and chordates (lizards), suggesting independent evolution. There is also evidence that these structures evolved independently within different types of lizards (Geckos, Anoles, and Skinks), with slightly different resulting structures [D. Irschick, A. Herrel, and B. Vanhooydonck, "Whole-organism studies of adhesion in pad-bearing lizards: creative evolutionary solutions to functional problems," Journal of Comparative Physiology A: Neuroethology, Sensory, Neural, and Behavioral Physiology, vol. 192, no. 11, pp. 1169-1177, 2006].

There exist a wide variety of fibrillar adhesives across the wide variety of animals, which utilize these structures. Some insects have fibrillar foot pads which secrete oily fluids which aid in adhesion, while others have completely dry structures. Adhesive pads which do not utilize secretions are called 'dry adhesives,' as they leave no residue on the surfaces to which they adhere. Dry adhesives exhibit many unique adhesive properties. They act similar to a pressure sensitive adhesive such as tape, but are highly repeatable with long lifetimes, do not require cleaning, and, often in combination with small claws, adhere to surfaces which are anywhere from atomically smooth silicon to extremely textured rock. Furthermore, they exhibit directional properties, adhering in one direction, and easily releasing from the surface when loathed in another. Adhesion pressures as high as 200 kPa have been demonstrated for gecko subdigital toepads and single fiber (seta) measurements exhibited adhesion pressures greater than 500 kPa (50N/cm$^2$) [K. Autumn, "Biological Adhesives," Springer Berlin Heidelberg, 2006]. Using advanced fibrillar adhesives, several gecko species are capable of carrying up to 250% of their own body weight up a smooth vertical surface. Dry fibrillar adhesives are also quite power efficient. They can be attached and detached from surfaces with very low forces by means of special loading and peeling motions. Once adhered to a surface, they require no power to maintain contact, and resist detachment for long periods of time.

Interestingly, and against intuition, the material that makes lip these high performance adhesive footpads is not sticky at all. The fibers are made from a β-keratin, much like bird claws and feathers. It is the small size-scale and geometrical structure, which allows this material to act as a powerful and versatile attachment mechanism.

Mechanics of Fibrillar Adhesion

The hairlike structures of gecko footpads have fascinated scientists for well over a century, with various hypotheses about the mode of attachment. In 1884, Simmermacher proposed the hypothesis that gecko lizards might adhere to surfaces using micro-suction cups [G. Simmermacher, "Untersuchungen ber haftapparate an tarsalgliedern von insekten," Zeitschr. Wiss. Zool, vol. 40, pp. 481-556, 1884]. Fifty years later, Dellit carried out experiments in a vacuum winch demonstrated that suction is not the dominant attachment mechanism in geckos [W. D. Dellit, "Zur anatomie and physiologie der geckozehe," Jena. Z. Naturw, vol. 68, pp. 613-656, 1934]. Similarly, electrostatic adhesion and micro-interlocking were ruled out. It was not until the advent of the Scanning Electron Microscope that scientists were able to investigate the true structure of these microscopic features. What they observed is a forest of microscale fibers, each branching into finer and finer hairs, ending in spatula-like tips. It is this structure that turns the stiff keratin into a capable adhesive.

Conventional pressure sensitive adhesives such as adhesive tapes, gels, and soft elastomers function by deforming into the shape of the contacting surface when pressed into contact. Materials with very low Young's modulus (stiffness) conform to surfaces to create large contact areas and do not store enough elastic energy to induce separation from the surface after the loading is removed. However, due to their low modulus, these materials tend to pick up contaminants from the surface, and are typically not re-usable.

Stiffer materials do not easily conform to surface roughness, and if deformed into intimate contact through high loading, store enough elastic energy to return to their original shape, peeling away from the surface in the process of relaxation. Bulk stiff materials generally do not exhibit tackiness or adhesion due to this self-peeling behavior.

The structures found in the attachment pads of the animals described above consist of arrays of thousands or millions of hair-like fibers, which stanch vertically or at an angle from the pad surface. Each fiber acts independently and generally has a specialized tip structure. The hairs in these fibrillar adhesives conform to the roughness of the climbing surface to increase the real contact area much like the deformation of soft adhesive tape, resulting in high adhesion by surface forces [K. Autumn et al., "Adhesive force of a single gecko foot-hair," Nature, vol. 405, pp. 681-685, 2000]. This adhesion, called dry adhesion, is argued to arise from molecular surface forces such as van der Waals forces [K. Autumn et al. "Evidence for van der waals adhesion in gecko setae," Proceedings of the National Academy of Sciences USA, vol. 99, pp. 12252-12256, 2002], possibly in combination with capillary forces [G. Huber et al., "Evidence for capillarity contributions to gecko adhesion from single spatula nanomechanical measurements," Proceedings of the National Academy of Sciences USA, vol. 102, pp. 16293-16296, 2005]. Although the total potential contact area of a surface broken up into fibers is less than the area of a flat surface because of the gaps between the fibers, the ability for each fiber to bend and conform to the surface roughness allows thousands, millions or billions of fibers no make small individual contacts, which add up to a large surface area. In comparison, a flat surface only makes contact with the asperities of a surface, and since the deformations of bulk material are typically small, the total contact area is much less than in the fibrillar case. An illustration of this comparison can be seen in FIG. 1, which illustrates the contact area of a flat stiff material 2 against a rough surface 4 (FIG. 1a) can be less than the contact area of a fibrillar adhesive 6 against the same surface 4 (FIG. 1b) despite the area lost between the fibers.

Because of the high aspect ratio (height to diameter) of the fibers in FIG. 1b, the fibrillar surface's effective modulus is low despite the material modulus typically being quite high. The keratinous materials found in geckos' fibers are estimated to have a Young's modulus of approximately 1-2.5 GPa. However, due to their hairy structure, the effective modulus is closer to 100 kPa, much like a soft tacky elastomer.

Animals with very low mass, such as insects, generally have a simply micro-fiber structure with specialized tips. In large lizards such as the Tokay gecko the fibers take on a complicated branched structure with microscale (4-5 μm) diameter base fibers which branch down to sub-micron (200 nm) diameter terminal fibers. At the end of these terminal fibers are specialized tips.

The most advanced fibrillar dry adhesives are found in the heaviest animals such as the Tokay and New Caledonia Giant Gecko gecko which can weigh up to 300 grams. Gecko toes have been shown to adhere with high interfacial shear strength to smooth surfaces (88-200 kPa). These animals have adhesive pads with many levels of compliance including their toes, foot tissue, lamellae, and fibers. This multi-level hierarchy allows the adhesives pads to conform to surface roughness with various frequency and wavelength scales. The fibers are angled with respect to the animals' toes, and the branched tips are also oriented with respect to the base of the fiber. The result is that the gecko pad exhibits a high level of directional dependence, high adhesion while dragging the toe inwards, and no adhesion in the opposite direction. This directionality is sometimes referred to as frictional anisotropy or, more appropriately, directional adhesion.

Studies of gecko footpads have revealed that due to their asymmetric angled structure, they are non-adhesive in their resting state, and a dragging motion is required to induce adhesive behavior [K. Autumn et al., "Frictional adhesion: a new angle on gecko attachment," Journal of Experimental Biology, vol. 209, pp. 3569-3579, 2006]. Reversing the direction of this dragging motion removes the fibers from the surface with very little force.

Motivation for Fabrication of Dry Adhesives

The dry fibrillar adhesive structures found in nature exhibit properties, which may be highly desirable in synthetic materials. The mechanics which gives rise to the adhesion in these structures does not rely on liquids or pressure differentials, therefore fibrillar dry adhesives are uniquely suited for a variety of uses. Since dry adhesives leave no residue and can grip over large areas, they could be used as grippers for delicate parts for transfer and assembly of anything from computer chips in a clean-room to very large porous carbon-fiber panels for vehicle construction.

If manufactured inexpensively, synthetic dry adhesives could also find uses in daily life as a general adhesive tape for hanging items, fastening clothing, or as a grip enhancement in athletic activities such as gloves, shoes, and grips.

Man-made dry adhesives might be used for temporary attachment of structures during assembly, or allow astronauts to grip the smooth outer surfaces of spacecraft during extra-vehicular missions.

Since biological dry adhesives allow animals to climb on smooth surfaces, synthetic dry adhesives should enable robots to do the same. Robots with dry adhesive grippers may be used for inspection and repair of spacecraft hulls, or terrestrial structures. Since the adhesives require no power to remain attached, climbing robots could perch for days, weeks, or months with very little power usage. Also, due to the power efficient attachment and detachment, robots might move as easily up a wall as they currently traverse the ground. Similarly, one day, gloves covered in synthetic dry adhesives might allow humans to easily scale smooth vertical surfaces.

There are potential applications for fibrillar adhesives in the field of medicine as well. Safe, non-destructive temporary tissue adhesives could assist in surgical procedures. Capsule endoscopes might use fibrillar adhesives to anchor to intestine walls without damaging the tissue in order to closely examine or biopsy an area of interest. Fibrillar adhesives may also be designed for attachment to skin as an alternative to conventional adhesive bandages and patches.

PRIOR ART

Synthetic Fibrillar Adhesives

In 2000, when Autumn et al. published work measuring the adhesion of a single gecko seta, suggesting that it is the van der Waals intermolecular forces dominantly, which allow geckos to climb, it spawned a field of research into understanding and modeling the underlying principles of fibrillar adhesion, and fabricating synthetic mimics. Soon after, Autumn et al. demonstrated van der Waals forces and a unique geometry are primarily responsible for the adhesion. Sitti and Fearing created the first synthetic fibrillar adhesives by silicone rubber micromolding in the same year [M. Sitti and R. S. Fearing, "Nanomolding based fabrication of synthetic gecko foothairs," In Proceedings of the IEEE Nanotechnology Conference, pp. 137-140, 2002].

In the years since then, there has been a flurry of research, with more than 50 publications on the topic in 2007 alone. Autumn continues to test biological specimens which provide insights into the mechanisms of adhesion, self cleaning [W. R. Hansen and K. Autumn, "Evidence for self-cleaning in gecko setae," Proceedings of the National Academy of Sciences USA, vol. 102, no. 2, pp. 385-389, 2005], and the directional properties of real gecko setae.

Huber and Sun demonstrated evidence that suggests that capillary forces of ambient water layers on surfaces play a significant role in fibrillar adhesion. Contact mechanics researchers such as Persson, Crosby, and Hui have investigated the crack trapping nature of patterned and fibrillar surfaces, which they have shown to increase the adhesion and toughness of the interfaces. In addition, Hui studied the bending and buckling nature of fibrillar surfaces, and the effects of this behavior on the adhesion of simple pillars. Arzt has investigated the effects of scale and shape of natural fibrillar adhesives, concluding that tip shape has less importance at smaller size scales. Several groups have demonstrated an inverse correlation between animal size and fibril tip dimension, with the heaviest animals having the finest fiber structures [E. Arzt, S. Gorb, and R. Spolenak, "From micro to nano contacts in biological attachment devices," Proceedings of the National Academy of Sciences USA, vol. 100, no. 19, pp. 10603-10606, 2003].

The mechanics of fiber to fiber interactions have been studied and modeled to determine the proper spacing and patterning for a high density of fibers without clumping. Fibers will clump together if the adhesion energy between neighboring fibers is greater than the stored elastic energy of the fibers bending into contact. The resulting equations can be used to calculate the closest spacing without permanent collapse.

The effects of crack trapping on increasing the toughness and adhesion of fibrillar surfaces have been studied on the macro-scale as well as the micro-scale. Several structures have been tested, and show enhancement over non-fibrillated structures.

The roughness adaptation of gecko pads has also been investigated through testing and modeling. The mechanics of fiber deformation and buckling reveals that fibrillar structures can decrease the effective modulus of the surface by several orders of magnitude, allowing conformation to various rough and curved surfaces.

In addition to research to understand and model the mechanics of adhesion, several research groups have developed fabrication techniques to create synthetic fibrillar arrays. Since van der Waal's forces are universal, a wide variety of materials and techniques may be used to construct the fibers. Initially, simple vertical fiber arrays were fabricated from various materials such as polymers. Methods such as electron-beam lithography, micro/nanomolding, nanodrawing, and self-assembly are employed to fabricate fibers from polymers, polymer organorods, and multi-walled carbon nanotubes.

Generally, arrays of simple pillar structures were not effective in increasing the adhesion of surfaces. Significant adhesion enhancement was demonstrated only when the flat tips of the structures were fabricated to have higher radii for increased contact area. Gorb et al. fabricated polyvinylsiloxane fibers with thin plate flat mushroom tips which demonstrated adhesion enhancement as well as contamination resistance [S. Gorb et al., "Biomimetic mushroom-shaped fibrillar adhesive microstructure," Journal of The Royal Society Interface, vol. 4, pp. 271-275, 2007]. Similarly, Del Campo et al. developed techniques for forming flat mushroom tips as well as more complex 3D geometries, including asymmetric tips, by dipping [A. Del Campo et al., "Patterned surfaces with pillars with controlled and 3d tip geometry mimicking bioattachment devices," Advanced Materials, vol. 19, pp. 1973-1977, 2007]. Kim et al. developed fabrication methods to form microscale fibers with flat mushroom tips by exploiting the champagne glass effect during Deep Reactive Ion Etching to form negative templates in silicon on oxide wafers [S. Kim and M. Sitti, "Biologically inspired polymer microfibers with spatulate tips as repeatable fibrillar adhesives," Applied Physics Letters, vol. 89, no. 26, pp. 261911, 2006]. In addition, Kim demonstrated the importance of controlling the thickness of the backing layer in order to reduce coupling between fibers.

Glassmaker et al. fabricated polymer fibers topped with a terminal film which exhibited adhesion enhancement over tipless pillars and unstructured surfaces [Nicholas J. Glassmaker et al., "Biologically inspired crack trapping for enhanced adhesion," Proceedings of the National Academy of Sciences, vol. 104, pp. 10786-10791, 2007]. Angled pillars with a terminal film have also been fabricated with directional properties [H. Yao et al., "Adhesion and sliding response of a biologically inspired fibrillar surface: experimental observations," Journal of The Royal Society Interface, vol. 5 no. 24, pp. 723-733 2007]. By angling the pillars beneath the terminal film, the resultant structure exhibits anisotropic adhesion. In addition to stem angle, the angle of the surface of the tip with respect to the stem is as crucial in terms of controlling the anisotropic behavior in adhesion and friction. Kim et al. [S. Kim et al., "Smooth Vertical Surface Climbing With Directional Adhesion," IEEE Transactions on Robotics, vol. 24, no. 1, pp. 1-10, 2008] fabricated synthetic sub-millimeter wedges with the stem and tip surface of each individual wedge oriented at an angle with respect to the backing layer of the wedge array. These structures exhibited anisotropic friction much-like the biological counterparts. While the magnitude of friction was an order of magnitude less than the biological gecko footpads, adhesion in normal direction was negligible. Later Asbeck et al. [A. Asbeck et al., "Climbing rough vertical surfaces with hierarchical directional adhesion," IEEE International Conference on Robotics and Automation, Kobe, Japan, 2009] fabricated similarly shaped wedges that are an order of magnitude smaller which showed similar adhesion performance to the sub-millimeter wedges. Adhesion improvement, still low compared to the biological gecko footpad, occurred when they topped sub-millimeter wedges with a terminal film comprised of micro-wedges.

Higher modulus synthetic fibrillar adhesives have been developed on the sub-micron diameter scale. These fibers, made from stiffer materials ($E \geqq 1$ GPa) such as polypropylene, polyimide, and nickel, carbon nanofibers and carbon nanotubes. Although these stiffer fibers do not adhere well in the normal direction, and require high preloads to make intimate contact, shear adhesion pressures of up to 36 $N/cm^2$, which is higher than the adhesion strength of the gecko, have been demonstrated.

To more closely mimic the structure of the gecko's foot hairs, work has also been done to fabricate hierarchical fibers with multi-level structures. Ge et al. bundled carbon nanotubes into pillars which deform together but have individually exposed tips. [L. Ge et al., "Carbon nanotube-based synthetic gecko tapes," Proceedings of the National Academy of Sciences, vol. 104, no. 26, pp. 10792-10795, 2007]. Photolithography has been used to fabricate simple micro-pillars on top of base pillars [A. Del Campo and E. Arzt, "Design parameters and current fabrication approaches for developing bio-inspired dry adhesives," Macromolecular Bioscience, vol. 7, no. 2, pp. 118-127, 2007]. On the millimeter scale, Shape Deposition Manufacturing has been used to fabricate hierarchical structures in thin polymer plates, which are stacked into arrays [M. Lanzetta and M. R. Cutkosky, "Shape deposition manufacturing of biologically inspired hierarchical microstructures," CIRP Annals—Manufacturing Technology, vol. 57, pp. 231-234, 2008]. Kustandi et al. demonstrated a fabrication technique to use nanomolding in combination with micromolding to create a hierarchical structure with superhydrophobic properties.

In addition to dry adhesives, other work is being conducted on synthetic fibers with oily coatings, inspired by beetle adhesion, which exhibit increased adhesion over uncoated structures.

The microfiber fabrication methods described above are very expensive for producing commercial quantities of adhesive materials. Moreover, they cannot efficiently and controllably produce angled fibers with specialized tips or hierarchical structures with specialized tips. Accordingly, there is a need for improved dry adhesives and improved methods for making dry adhesives. In particular, there is a need for dry adhesives having greater adhesive forces and improved durability. In addition, there is a need for methods of making dry adhesives with lower costs of production. Those and other advantages of the present invention will be described in more detail hereinbelow.

BRIEF SUMMARY OF THE INVENTION

The present invention includes adhesives, methods for making adhesives, and fibers made according to those methods. Many embodiments are possible with the present invention. For example, the present invention provides methods to fabricate fibrillar structure which have specialized tips that increase adhesion, and provide directionality to adhesion. Methods are described to fabricate fibrillar structures with angled tips. Methods are also provided to fabricate hierarchical fibrillar structures.

The present invention provides methods for fabrication of vertical and angled micro- and nanofibers with adhesive qualities. The present invention further provides methods for the fabrication of micro- and nanofibers that have specialized tips or are hierarchically structured with specialized tips. Polymer micro- and nanofiber arrays are fabricated through a micro molding process which duplicates lithographically formed master template structures with a desired fiber material. This technique enables fabrication of fiber arrays inexpensively and with high yields, and enables the fabrication of fibers with controlled angles. In the present invention, the fiber ends are then dipped in a polymer solution, prior to further processing which create specialized and hierarchical tips to the fibers.

In one embodiment, after the dipping in a polymer solution, the assembly is then pressed against a surface at a predetermined angle to fabricate flattened tips at the ends of the fibers.

In another embodiment, fibers are fabricated using the methods of the present invention in different sizes, for example microfibers and nanofibers, and the smaller fibers are attached to the tips of the larger fibers by making contact with the liquid polymer at the end of the larger fibers to create hierarchical structures.

In another embodiment, fibers are fabricated according to the methods herein, dipped in a polymer solution, which is in turn molded to form hierarchical structures with smaller fiber structures attached to the tips of the larger fibers.

In another embodiment, the methods described herein are used to fabricate three-level hierarchical fiber structures.

In another embodiment, fibers are fabricated using the methods of the present invention, the fibers are then dipped in a polymer solution, and the assembly is pressed against an array of smaller fibers, such as carbon nanotubes, to form hierarchical structures.

There are several unique aspects to the fiber design described in this application. One is an enlarged and oriented terminal end or tip of the fiber. The enlarged tip increases the contact area of the fiber thus enhancing the interfacial resistance to separation between the fiber and the adhering surface. This shape also allows for more uniform distribution of the applied stress over the fiber tip surface [A. V. Spuskanyuk et al., "The effect of shape on the adhesion of fibrillar surfaces," Acta Biomaterialia, vol. 4, no. 6, pp. 1669-1676, 2008]. Another design aspect is the incorporation of sharp edges at the perimeter of the tip. The detachment of a single fiber usually starts from the edge as an edge crack followed by the propagation of this edge crack along the entire interface, which results in complete separation. The crack starts at the edge due to the fact that the edge acts as a stress concentrator and creates a singular stress state. For instance, when a soft fiber is in contact with a relatively rigid smooth surface, the stress at the edge of the fiber ($\sigma_e$) is singular and has the form:

$$\sigma_e = A\sigma c^{-\alpha} \quad (1)$$

In equation (1), $\sigma$ is the applied stress far from contact, A is a constant determined by the shape of the fiber, c is the distance from the edge of the fiber, and $\alpha$ is the order of stress singularity determined by the angle at the edge of contact [D. B. Bogy, "Two edge-bonded elastic wedges of different materials and wedge angles under surface traction," Journal of Applied Mechanics, vol. 38, pp. 377-386, 1971]. Note that at the edge of contact, c=0, stress is infinite. According to (1), it is possible to reduce the severity of stress singularity and as such improve detachment resistance by reducing A and $\alpha$. Enlarged tip shape featured in our fiber design allows for lower A values and reduces the severity of stress at the edge. In addition, sharper edges at the perimeter of the tip lower the order of stress singularity a adding another dimension of stress reduction at the contact edge. According to the work by Bogy, it is also possible to eliminate the stress singularity via sharper contact edges. While the oriented fashion of the stem and the base provides us with the directional properties, enlarged tip with sharper edges improve performance in both gripping and releasing direction. Furthermore, we obtain high adhesion in normal direction, which is not achievable with wedge designs [S. Kim et al., "Smooth Vertical Surface Climbing With Directional Adhesion," IEEE Transactions on Robotics, vol. 24, no. 1, pp. 1-10, 2008; A. Asbeck et al., "Climbing rough vertical surfaces with hierarchical directional adhesion," IEEE International Conference on Robotics and Automation, Kobe, Japan, 2009].

Many other variations are possible with the present invention. For example, different materials may be used to make the fibers and the dry adhesive, and the geometry and structure of the fibers and the dry adhesive may vary. In addition, different types of etching and other material removal processes, as well as different deposition and other fabrication processes may also be used. These and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments and not for purposes of limiting the invention, wherein:

FIG. 3 illustrates the fabrication process for angled fibers with specialized tips fabricated according to the present invention;

FIG. 9 illustrates fiber tip behavior under various loading conditions;

FIG. 17 illustrates the fabrication process for molding hierarchical fibrillar structures according to the present invention;

FIGS. 31-31e provide data and microphotographs of force vs. time data for double level vertical fibrillar materials fabricated according to the present invention.

DETAILED DESCRIPTION OF THE INVENTION

1 Introduction

Gecko toes have been shown to adhere with high interfacial shear strength to smooth surfaces (88-200 kPa), using microscale angled fiber structures on their feet. However, even with such large adhesion pressures, the detachment forces measured during climbing are nearly non-existent. The gecko is able to release its adhesive toes without overcoming the large adhesion forces, which it relies on to climb and cling to surfaces. These animals are able to control the amount of adhesion of its footpads during climbing by controlled motions during detachment.

Autumn et al. demonstrated that natural gecko setae exhibit extreme frictional anisotropy, with significant adhesive friction when dragged along their natural curvature ('gripping' or 'with' direction), and only Coulomb friction in the 'releasing' or 'against' direction. When loaded in the 'releasing' direction, the adhesive pads are easily peeled from the surface. We fabricated angled fibers with un-oriented mushroom tips to mimic this directional behavior, but no significant anisotropy was observed. Yao et al. observed directional adhesion and shear interface strength in angled sub-millimeter diameter PDMS stalks with a terminal film. Kim et al. have demonstrated sub-millimeter diameter angled polymer stalk arrays with angled ends, for use in a climbing robot, which exhibit desirable anisotropic shear forces. However, both of these larger-scale structures demonstrate significantly lower interfacial shear and adhesion strength than the gecko or microscale polymer fibers with mushroom tips.

Fibrillar structures have also been fabricated to increase (or decrease) friction. In addition, fiber surfaces have been created which provide shear adhesion using vertical arrays of single and multi-walled carbon nanotubes. Unfortunately, these fibrillar structures require very high preloads in order to provide interfacial shear strength. Stiff polypropylene sub-micron diameter fibers have been shown to exhibit shear adhesion without requiring high preloading. Polyurethane micro-fibrillar structures have demonstrated interfacial shear strength of over 400 kPa, but due to these high forces, irreversible damage occurs during detachment.

In this invention, we describe fabrication methods and structures that combine the high interfacial strength of mushroom tipped micron-scale fibers with the directionality of fiber structures with both angled stalks and tip endings. In Section 1.2, the fabrication techniques are detailed for single level structures. Experimental results are presented in Section 1.3, including investigation of adhesion anisotropy and adhesion control. In Section 1.4.2, the fabrication techniques for multi-level structures are detailed. Experimental results for the multi-level structures are provided in Section 1.4.6.

1.1 The Structure.

Figure 2:
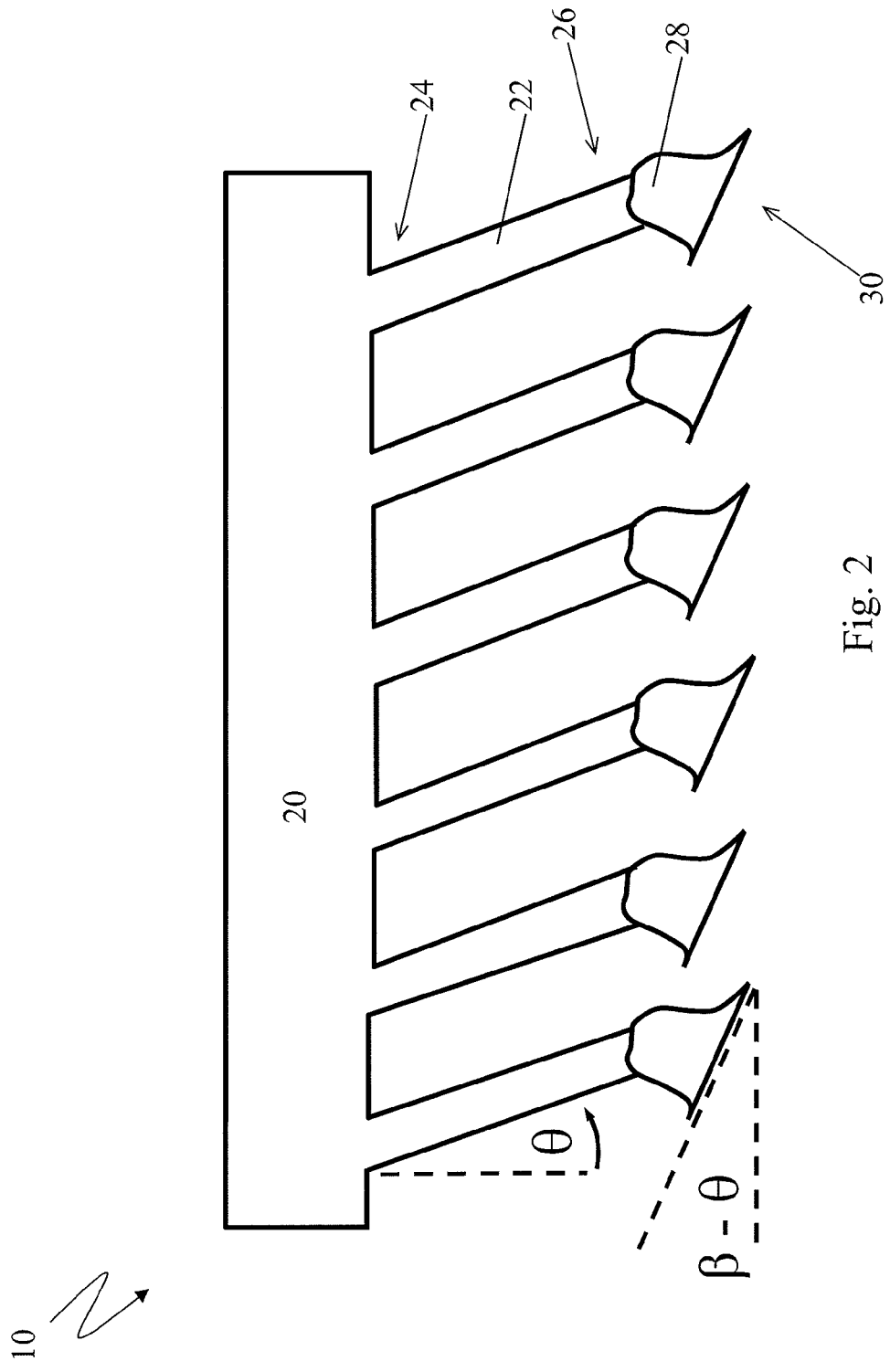
FIG. 2 illustrates one embodiment of a dry adhesive according to the present invention.

The present invention includes a variety of structures for dry adhesives. FIG. 2 illustrates one embodiment of a dry adhesive 10 according to the present invention. In that embodiment, the dry adhesive structure 10 includes a backing layer 20, a plurality of stems 22, and a tip 28. The term "fiber" will sometimes be used to refer to the stem 22 and tip 28 together. The term "fiber" will also sometimes be used to refer to the stem 22.

The stems 22 are attached to the backing layer 20. The illustrated embodiment shows a dry adhesive 10 having six stems 22, although a dry adhesive according to the present invention may have more or fewer than six stems 22. It is possible that a dry adhesive 10 could have a single stem 22 although in most applications the dry adhesive 10 will likely have many stems 22.

The stems 22 have first 24 and second 26 ends on opposite sides of the stem 22. The first end 24 of the stem 22 is connected to the backing layer 20, and the second end 26 of the stem 22 is connected to the tip 28.

The tip 28 includes an expanded surface 30 which is generally away from the stem. The expanded surface 30 is larger than the stem 22. In other words, the expanded surface 30 has an area that is greater than a cross sectional area of the second end 26 of the stem 22, when the cross-sectional area of the second end of the stem 22 is measured in a plane parallel to the expanded surface 30. The expanded surface 30 may be planar or it may be non-planar. For example, the expanded surface 30 may be concave or convex or it may have other features such as recesses and projections. If the expanded area 30 is non-planar, the cross-sectional area of the stem 22 can be measured parallel to a plane that most closely approximates the expanded surface 30.

In the illustrated embodiment the expanded surface 30 is not parallel to the backing layer 20. This orientation has been found to provide superior results with dry adhesives 10, although it is not required that the expanded surface 30 be non-parallel to the backing layer 20. For example, the present invention may also include tips 28 with an expanded surface 30 that is parallel to the backing layer 20.

The relationship between the backing layer 20, stem 22, and tip 28 can vary in different embodiments of the present invention. In the illustrated embodiment, the stem forms an angle θ relative to a line perpendicular to the backing layer 20. Similarly, the expanded surface 30 forms an angle β–θ relative to a plane parallel to the backing layer 20. The angle β can be defined during the fabrications process, as will be described in more detail hereinbelow.

Typically, the angles θ and β are between zero and ninety degrees. However, it is possible for those angles to be greater than ninety degrees. For example, if the backing layer 20 is non-planar, if it contains recesses into which the stem 22 can be bent, or if it otherwise makes allowances for the stem 20 to adopt such an orientation, then the angle θ may be greater than ninety degrees. Other variations are also possible, such as a J-shaped stem 22, which allows θ to be greater than ninety degrees. Similarly, it is also possible for β to be greater than ninety degrees, such as if the stem 22 takes a different shape or orientation from that illustrated herein. For example, a J-shaped stem 22 may allow for the expanded surface 30 to be rotated more than ninety degrees.

1.2 Fabrication of Specialized Tips on Single Level Structures

The fabrication process for creating directional adhesives with specialized tips 28 begins with the fabrication of an array of cylindrical base fibers. Angled or vertical base fiber arrays are fabricated through a micromolding process which duplicates lithographically formed master template structures with a desired fiber material. This method for fabrication of the fiber arrays is described in U.S. patent application Ser. No. 12/448,242, by the same inventors, which is incorporated herein by reference.

FIGS. 3a-3d illustrates one embodiment of a fabrication process according to the present invention. In that embodiment, the fabrication process is used for adding angled mushroom tips 28 to fibers 22. In FIG. 3a, bare fibers 22 with angle θ are aligned with a layer of liquid polymer 40. The liquid polymer 40 may be carried on a substrate or some other surface 44 for holding the liquid polymer 40. In FIG. 3b, the fibers are dipped into the liquid 40 and retracted, retaining some polymer 40 at the tips 28. In FIG. 3c, the fibers 28 are brought into contact with a tip-shaping surface 42, such as a substrate, and pressed with a constant load during curing, bending the fibers 22 to angle β. In FIG. 3d, the sample is peeled from the substrate 42 and the fibers 22 return to their original angle θ, resulting in tip angle (β–θ).

In one embodiment of the present invention, 1 in² fiber arrays are molded from polyurethane with a ≈1 mm thick backing layer using a thin spacer to define the thickness and ensure uniformity. A thin film of liquid ST-1060 polyurethane is spun onto a polystyrene substrate for 45 seconds at 4,000 rpm. The fiber array is placed on the film of liquid polyurethane (FIG. 3a). The liquid polyurethane wets the tips of the fibers, and then the fiber arrays are separated from the liquid film (FIG. 3b). Next, the fiber arrays are placed onto a low surface energy substrate and a weight, preferably (50-200 g) is placed onto the backing layer, which bends the base fibers to desired angle β (FIG. 3c) and forms a specialized expanded tip with desired orientation to the fibers. A variety of orientations of the tip to the fiber can be fabricated by adjusting the angle at which the fiber arrays are pressed onto the substrate to achieve desired adhesion and release characteristics.

The construct of the fiber array with the specialized tip material are then cured by methods known to those skilled in the art.

The fiber arrays are then peeled from the substrate, and the fibers return to their initial angle (θ), tilting the tips to an angle of (β–θ) as shown in FIG. 3d.

In one embodiment of the present invention, the microfibers have diameters of ~35 μm and lengths of ~100 μm, with base fiber angles from 0° to 33° from horizontal. The fibers are arranged in a square grid pattern with a center-to-center spacing of 120 μm. The fiber arrays are fabricated from a polyurethane elastomer with a Young's modulus of ~3 MPa, chosen for its high tear strength and high strain before failure.

Figure 4:
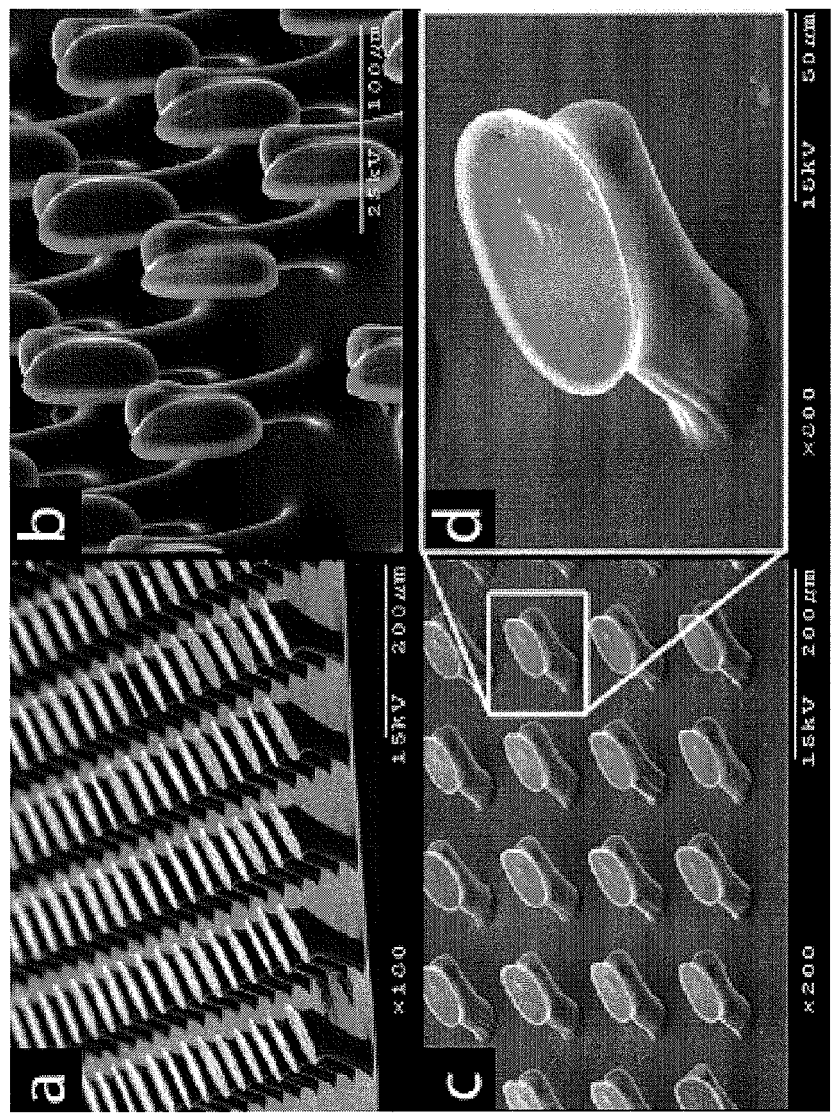
FIG. 4 provides SEM images of angled fibers with specialized tips fabricated according to the present invention.

This process has been implemented to form the first synthetic fibers with angled spatular tips. By varying the fiber geometry or the load during curing, the tip angle can be fabricated anywhere from 0 (no tip angle) to 90° (tips parallel to the fiber stem, see FIG. 4b below).

FIGS. 4a-4d are scanning electron microscope images of arrays of 35 μm diameter angled polyurethane microfibers with angled mushroom tips which were constructed according to one embodiment of the present invention. Tip orientation can be controlled to form tips with varying angles: (a) 34°; (b) 90°; (c,d) 23°. Details of the tip can be seen in (d).

Figure 5:
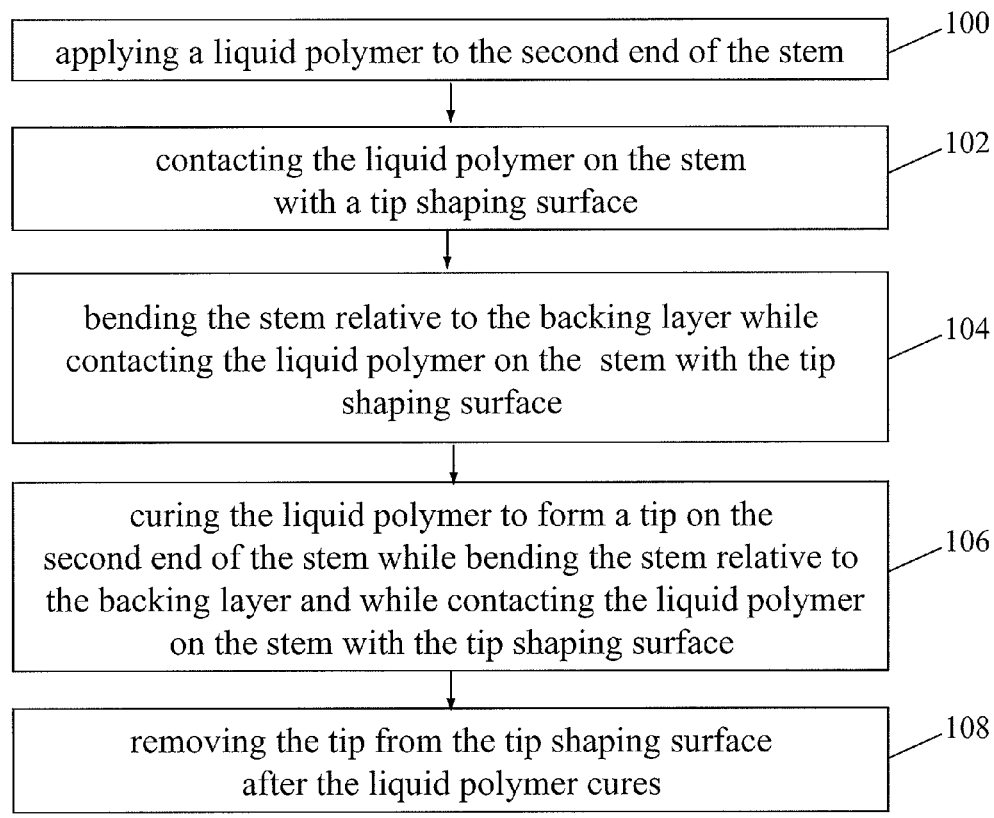
FIGS. 5-7 illustrate methods of making dry adhesives according to the present invention.

FIG. 5 illustrates one embodiment of a method of fabricating dry adhesive structures according to the present invention. The process may include forming a dry adhesive 10 with a structure including a backing layer 20 and stem 22 as described above. The stem 22 may be either perpendicular to the backing layer 20 or non-perpendicular to the backing layer 20. As described above, the stem includes first 24 and second 26 ends on opposite sides of the stem 22, and wherein the first end 24 of the stem 22 is connected to the backing layer 20 and the second end 26 of the stem 22 is connected to the tip 28.

Step 100 includes applying a liquid polymer 40 to the second end 26 of the stem 22 as described above, for example, with reference to FIG. 3b. Although the present invention will generally be described in terms of using a liquid polymer 40, it is possible that other materials may also be used in place of liquid polymer 40.

Step 102 includes contacting the liquid polymer on the stem with a tip shaping surface. See, for example, FIG. 3c above.

Step 104 includes bending the stem relative to the backing layer while contacting the liquid polymer on the stem with the tip shaping surface. See, for example, FIG. 3c above.

Step 106 includes curing the liquid polymer to faun a tip on the second end of the stem while bending the stem relative to the backing layer and while contacting the liquid polymer on the stem with the tip shaping surface. See, for example, FIG. 3c above.

Step 108 includes removing the tip from the tip shaping surface after the liquid polymer cures. See, for example, FIG. 3d above.

Many variations and modifications are possible with this method. Some of those variations and modifications will be described below.

For example, step 100 may include dipping the second end 26 of the stem 22 in a liquid polymer 40 followed by removing the second end 26 of the stem 22 from the liquid polymer 40 after the liquid polymer 40 is applied to the second end 26 of the stem 22. In other embodiments, the liquid polymer 40 may be applied by methods other than dipping, such as by spraying or otherwise applying the liquid polymer 40. In such cases, the step of removing the second end 26 from the liquid polymer 40 may not be needed in some embodiments.

Step 102, contacting the liquid polymer 40 on the stem 22 with a tip shaping surface 42, may includes forming the expanded surface 30 in the liquid polymer 40 as described above. This may also include forming a planar surface in the liquid polymer 40 where the liquid polymer 40 contacts the tip shaping surface 42. The planar surface may be formed, for example, by using a tip forming surface 42 that is planar. However, other tip forming surfaces 42 may be used to form other expanded surfaces 30 on the tip 28. For example, concave or convex tip forming surfaces 42 may be used, as well as tip forming surfaces 42 having recesses, bumps, or other features that can be used to shape the expanded surface 30 of the tip 28.

As described above, the expanded surface 30 of the tip 28 may have an area that is greater than a cross-sectional area of the second end 26 of the stem 22 in a plane parallel to the expanded surface 30 of the tip 28.

Step 104, bending the stem, may include applying a load to the backing layer. This is one way of being the stem 22, although other ways may also be used with the present invention.

Step 104, bending the stem, may also include bending the stem 22 in a direction away from a perpendicular orientation with the backing layer 20. In other words, a non-parallel stem 22 may be bent in such a way as to exaggerate or increase the extent to which the stem 22 is non-parallel with the backing layer 20.

Step 104, bending the stem 22 relative to the backing layer 20 while contacting the liquid polymer 40 with the tip shaping surface 42, may include bending the stem to form an angle β relative to an imaginary line perpendicular to the backing layer, wherein β is greater than θ and less than ninety degrees, as described above.

Step 106, curing the liquid polymer cures to form a tip 28, may include forming an expanded surface 30 in the tip 28 where the tip 28 contacts the tip shaping surface 42, and wherein after removing the tip 28 from the tip shaping surface 42 the expanded surface 30 of the tip 28 forms an angle β−θ relative to an imaginary plane parallel to the backing layer 20.

Step 106, curing the liquid polymer 40 to form a tip 28, may include forming the expanded surface 30 on the tip 28 where the tip 28 contacts the tip shaping surface 42. In other words, the shape of the expanded surface 30 may be formed during the curing step 106, when the liquid polymer 40 on the stem 22 changes from liquid form to cured or solid form and retains the general shape at the time of curing. As a result, curing the liquid polymer 40 forms an expanded surface 30 indicative of the tip shaping surface 42.

After step 108, removing the tip 28 from the tip shaping surface 42, the expanded surface 30 of the tip 28 may be planar and not parallel to the backing layer 20, as described in more detail herein.

After step 108, removing the tip from the tip shaping surface, the method of the present invention may result in a stem 22 that forms an angle θ relative to an imaginary line perpendicular to the backing layer 20, wherein θ is greater than zero degrees and less than ninety degrees. As described above, it is also possible for θ to be greater than ninety degrees. Other values for θ are also possible with the present invention. For example, θ may be zero degrees if the stems 22 are perpendicular to the backing layer 20.

Many other variations and modifications are also possible. For example, the method may also include maintaining the backing layer 20 parallel to the tip shaping surface 42 during step 104, when bending the stem 22 relative to the backing layer 104. The method may also include maintaining the backing layer 20 parallel to the tip shaping surface 30 during step 106, curing the liquid polymer 106. In other embodiments, the backing layer 20 may be maintained non-parallel to the tip shaping surface 42.

Figure 6:
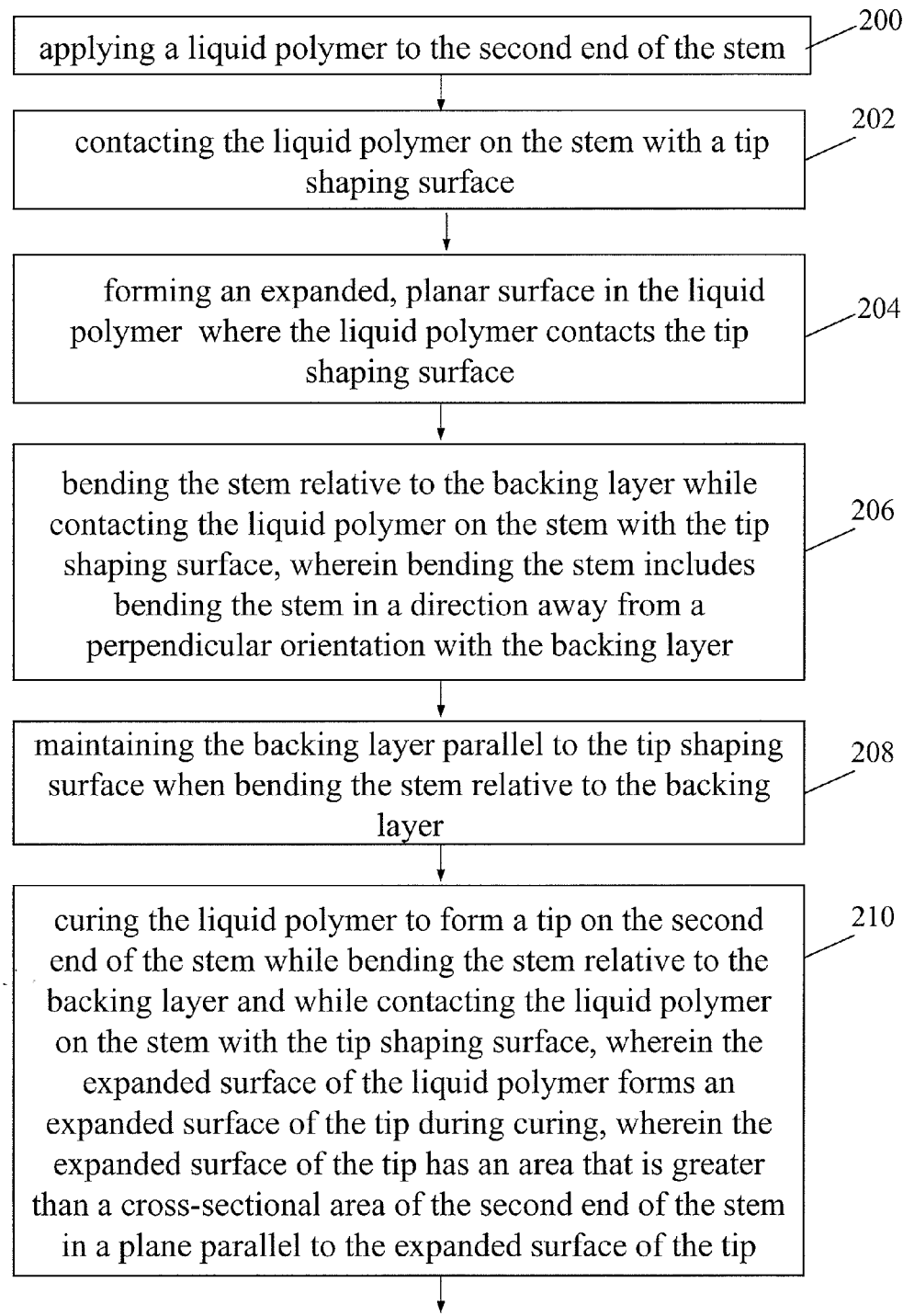
Figure 7:
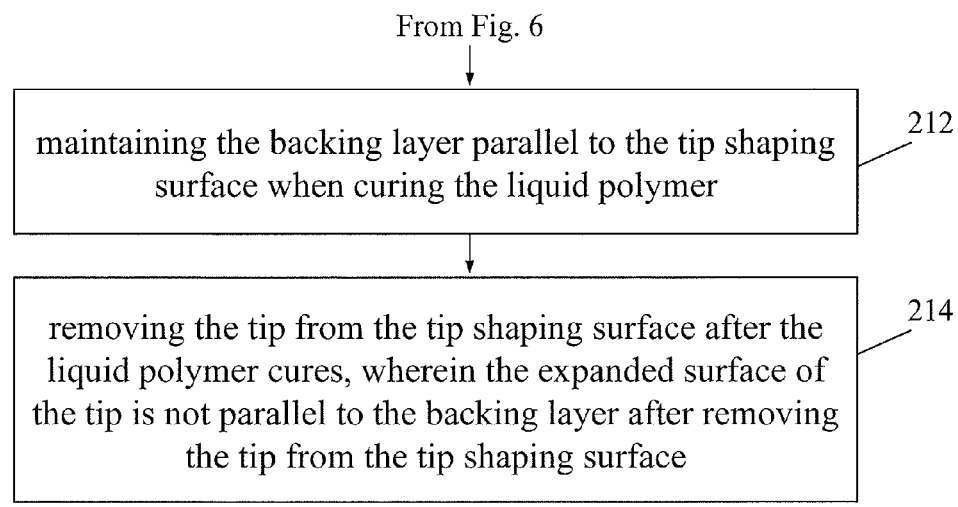

FIG. 6 illustrates another embodiment of the method according to the present invention. That method includes forming a dry adhesive 10 with a structure including a backing layer 20 and a non-perpendicular stem 22, wherein the stem 22 includes first 24 and second 26 ends on opposite sides of the stem 22, and wherein the first end 24 of the stem 22 is connected to the backing layer 20.

Step 200 includes applying a liquid polymer 40 to the second end 26 of the stem 28.

Step 202 includes contacting the liquid polymer 40 on the stem 22 with a tip shaping surface 42.

Step 204 includes forming an expanded, planar surface in the liquid polymer 40 where the liquid polymer contacts the tip shaping surface 42.

Step 206 includes bending the stem 22 relative to the backing layer 20 while contacting the liquid polymer 40 on the stem 22 with the tip shaping surface 42, wherein bending the stem 22 includes bending the stem 22 in a direction away from a perpendicular orientation with the backing layer 20.

Step 208 includes maintaining the backing layer 20 parallel to the tip shaping surface 42 when bending the stem 22 relative to the backing layer 22.

Step 210 includes curing the liquid polymer 40 to form a tip 28 on the second end 26 of the stem 22 while bending the stem 22 relative to the backing layer 20 and while contacting the liquid polymer 40 on the stem 22 with the tip shaping surface 42, wherein the expanded surface of the liquid polymer forms an expanded surface 30 of the tip 28 during curing, wherein the expanded surface 30 of the tip 28 has an area that is greater than a cross-sectional area of the second end 26 of the stem 22 in a plane parallel to the expanded surface 30 of the tip 28.

Step 212 includes maintaining the backing layer 20 parallel to the tip shaping surface 42 when curing the liquid polymer 40.

Step 214 includes removing the tip 28 from the tip shaping surface 42 after the liquid polymer 40 cures, wherein the expanded surface 30 of the tip 28 is not parallel to the backing layer 20 after removing the tip 28 from the tip shaping surface 42.

Many variations and modifications are possible according to the present invention. For example, after removing the tip 28 from the tip shaping surface 42, the method of the present invention may result in a stem 22 that forms an angle θ relative to an imaginary line perpendicular to the backing layer, wherein θ is greater than zero degrees and less than ninety degrees. Other values for θ are also possible with the present invention.

Step 206, bending the stem 22 relative to the backing layer 20 while contacting the liquid polymer 40 with the tip shaping surface 42, may include bending the stem 22 to form an angle β relative to an imaginary line perpendicular to the backing layer 20, wherein β is greater than θ and less than ninety degrees. Other values for θ and β are also possible with the present invention.

Step 210, curing the liquid polymer 40 form a tip, may include forming an expanded surface 30 in the tip 28 where the tip 28 contacts the tip shaping surface 42. Also, after step 214, removing the tip 28 from the tip shaping surface 42, the expanded surface 30 of the tip 28 may form an angle ($\beta-\theta$) relative to an imaginary plane parallel to the backing layer 20.

Other variations and modifications are also possible with the present invention.

1.3 Friction Anisotropy: Results

Shear and normal adhesion of our angled fiber arrays with specialized tips fabricated with the methods of the present invention as described above were measured in a variety of ways to investigate interfacial shear strength, directionality, and the controllability of adhesion. In one measurement method, normal and shear forces were measured during a fixed shear displacement of 500 μm between a 6 mm diameter glass spherical indenter and the fiber array. In a second set of experiments with the same indenter, we measured the effect of varying shear displacements on the resulting shear and normal forces.

Figure 8A:
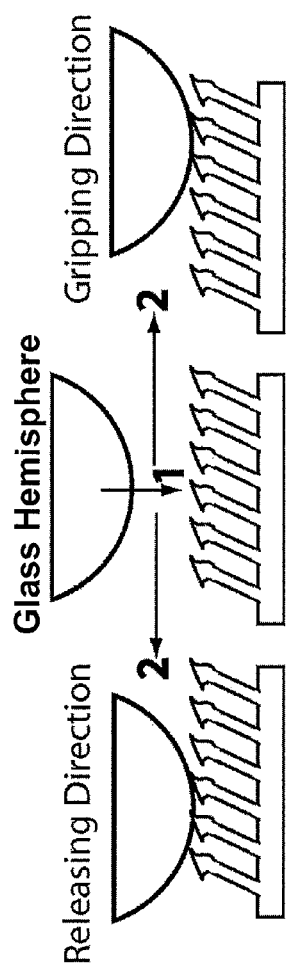
FIG. 8 provides data on gripping and releasing properties of materials formed according to the present invention.
Figure 8B:
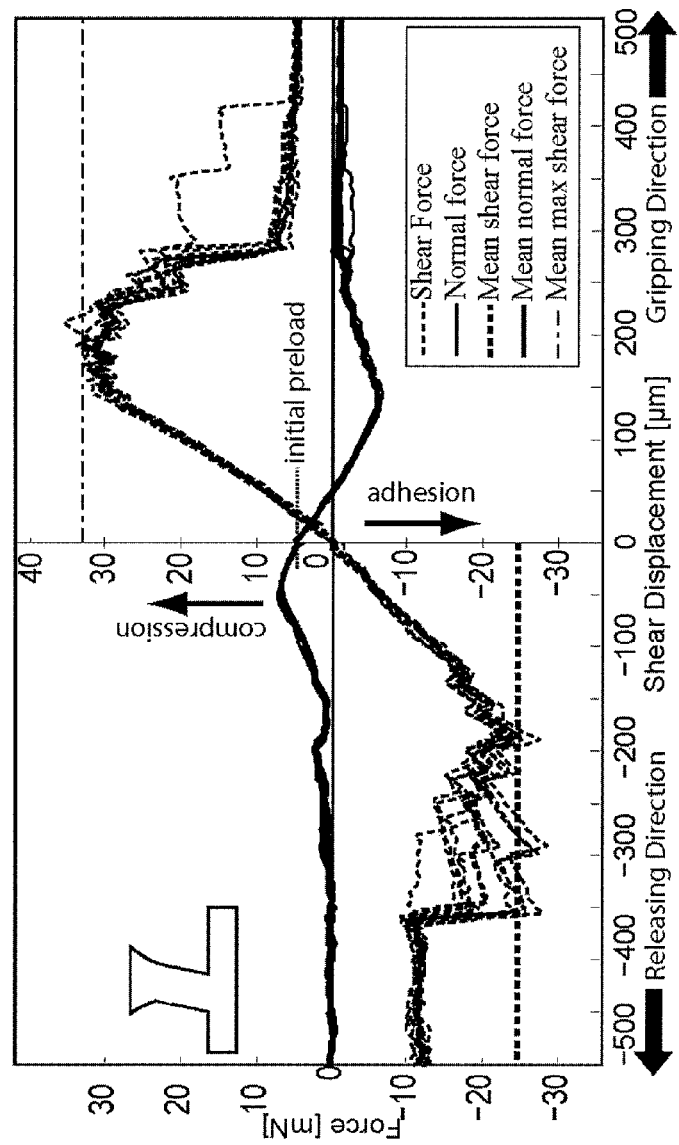
Figure 8C:
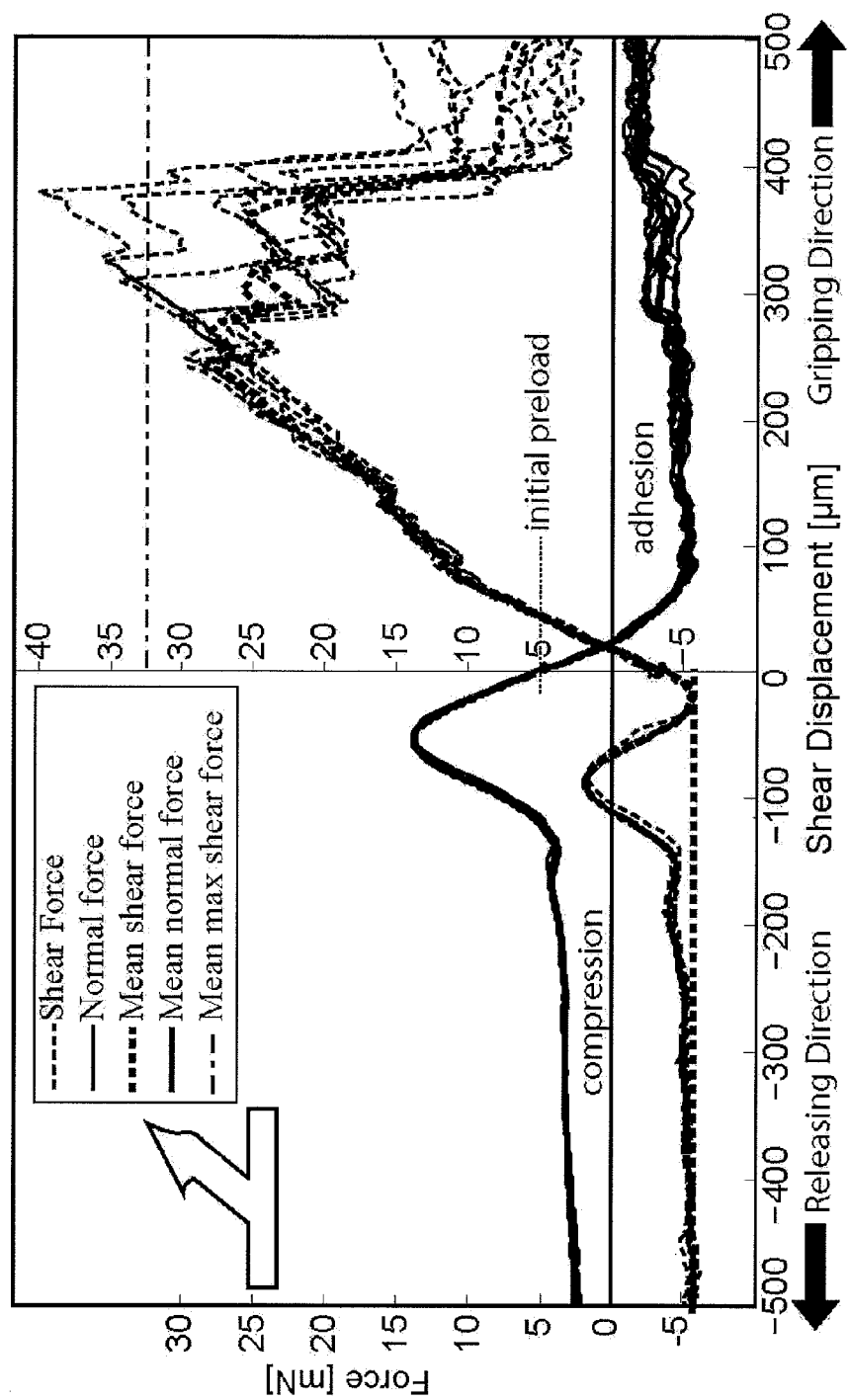

A custom adhesion characterization system, described previously [B. Aksak, M. P. Murphy, and M. Sitti, "Adhesion of biologically inspired vertical and angled polymer microfiber arrays," Langmuir, vol. 23, no. 6, pp. 3322-3332, 2007], was used for the adhesion and shear experiments. FIG. 8 illustrates those experiments. FIG. 8a is an illustration of the displacements in the experiments. An initial vertical preload (1) is followed by a shear displacement (2) in either the 'gripping' direction or the 'releasing' direction. FIGS. 8b and 8c illustrate shear and normal forces during shear displacements after a 5 mN preload. Positive normal force values indicate compression, and negative values indicate adhesion. Positive shear displacements represent motion in the 'gripping' direction, and negative shear displacements represent displacement in the 'releasing' direction. Fibers with no tip angle (FIG. 8b) show nearly isotropic shear behavior. For samples with 28° angled tips (FIG. 8c) the shear forces during displacements in the 'gripping' direction are significantly higher than those seen in the 'releasing' direction, and are accompanied by adhesive force in the normal direction.

The experiments will now be described in more detail. In the fixed displacement experiments, an indenter was pressed into contact with the fibers to a specified preload value of 5 mN (FIG. 8a). When the preload is complete, approximately 30 fibers were in contact with the indenter. Next a shear displacement between the fibers and sphere was applied at a speed of 25 μm/s for 500 μm in either the 'gripping' direction or in the opposite 'releasing' direction while the vertical indentation depth was held constant. Data from these experiments for fibers with no tip angle, and tip angle samples are shown in FIGS. 8b, c, respectively. All data in each plot were taken at the same spot, and the close spacing of the data illustrate the repeatability of the adhesion.

The fibers with no tip angle (FIG. 8b) exhibit similar magnitudes of the shear forces in both directions, although the behaviors are not identical due to the non-vertical angle of the base fiber. Fiber arrays with no tip angle were found to have shear force anisotropy ratios (the ratio of the maximum shear force in the 'gripping' direction to the maximum shear force in the 'releasing' direction) as low as 1.07:1. During these trials, the fiber tips were observed to adhere to the indenter and stretch when sheared in either direction, resulting in similar adhesive characteristics.

In contrast, the results from the angled tip fiber sample (FIG. 8c) indicate highly anisotropic behavior. The mean maximum shear force in the 'gripping' direction is 5.6 times greater than the one observed in the 'releasing' direction (a 5.6:1 shear force anisotropy ratio). Also, the compressive normal force in the releasing direction tests indicates that the shear forces observed were due to classical Coulomb friction. In the 'gripping' direction experiments, the normal force is adhesive, meaning that the mode of shear force generation cannot be Coulomb friction, which requires a compressive normal force. Rather, it is the shear component of the attached fibers under tension. Furthermore, visual observations of these tests reveal that the fiber tips adhere and stretch when displaced in the 'gripping' direction, whereas the tips flip over and slide when displaced in the 'releasing' direction. This sliding behavior suggests that the fibers quickly detach and cannot support normal loading. In other words, they may be easily separated after being displaced in this direction.

The measured anisotropic characteristics of the angled tip samples from FIG. 8c are quite similar to the characteristics of real gecko setae as measured by Autumn et al. The gecko setae exhibit a similar shear force anisotropy ratio of ~4.5:1, and similar normal force characteristics.

Although the asymmetric geometry of fiber tips can result in asymmetric stress distributions at the edges of the contact interface as described by Bogy, we hypothesize that the observed anisotropic behavior arises primarily due to the stresses caused by the moment created when the tip is sheared. This can be understood by qualitative analysis of the rotation of the tip during shear loading in each direction (FIG. 9).

FIG. 9 illustrates tip behavior under various loading conditions. Tip angle $\phi$ is illustrated beneath each side view illustration with respect to $\phi_o$. FIG. 9a illustrates original unloaded geometry. FIG. 9b illustrates a fiber under preload compression. FIG. 9c illustrates shearing the fiber in the 'releasing' direction creates large tip rotation, FIG. 9d illustrates shearing the fiber in the 'gripping' direction reduces the tip rotation, returning to the original $\phi_o$ before increasing the tip 28 rotation in the opposite direction.

Any rotation angle of the tip 28 with respect to its original orientation causes a peeling moment, which, in combination with shear and tensile stresses at the interface, can cause an edge of the tip 28 to detach. When a fiber is compressed into intimate contact with a surface, the tip angle rotates from its original angle $\phi_o$ (FIG. 9a) to a larger angle $\phi_c$ (FIG. 9b). The change in angle, $\Delta\phi$, introduces a moment which is relative to the magnitude of the angle change from its undeformed state. The peeling moment is increased if the fiber is sheared in the releasing direction because it increases the already present tip 28 rotation to a larger angle ($\phi_r$), increasing $\Delta\phi$ as seen in FIG. 9c. This increased moment peels the leading edge (A), eventually detaching and overturning the fiber tip 28, as seen in previous studies of mushroom shaped fibers. However, when sheared in the 'gripping' direction the fiber tip 28 begins to return to its original angle, reducing the moment to zero (FIG. 9d). When the magnitude of the moment is near zero, the normal stress distribution at the interface is more evenly distributed, reducing the chances of detachment. After this point, if the shearing in the 'gripping' direction is continued, $\Delta\phi$ changes sign and begins to increase in magnitude, eventually causing the leading edge (B) to detach. The initial decrease in moment for shearing in the 'gripping' direction increases the allowable displacement before detachment occurs, in contrast to the 'releasing' direction where the moment increases immediately. The increased displacement in the 'gripping' direction allows the fibers to stretch and maintain contact, leading to high interfacial shear strength and anisotropy.

Figure 10:
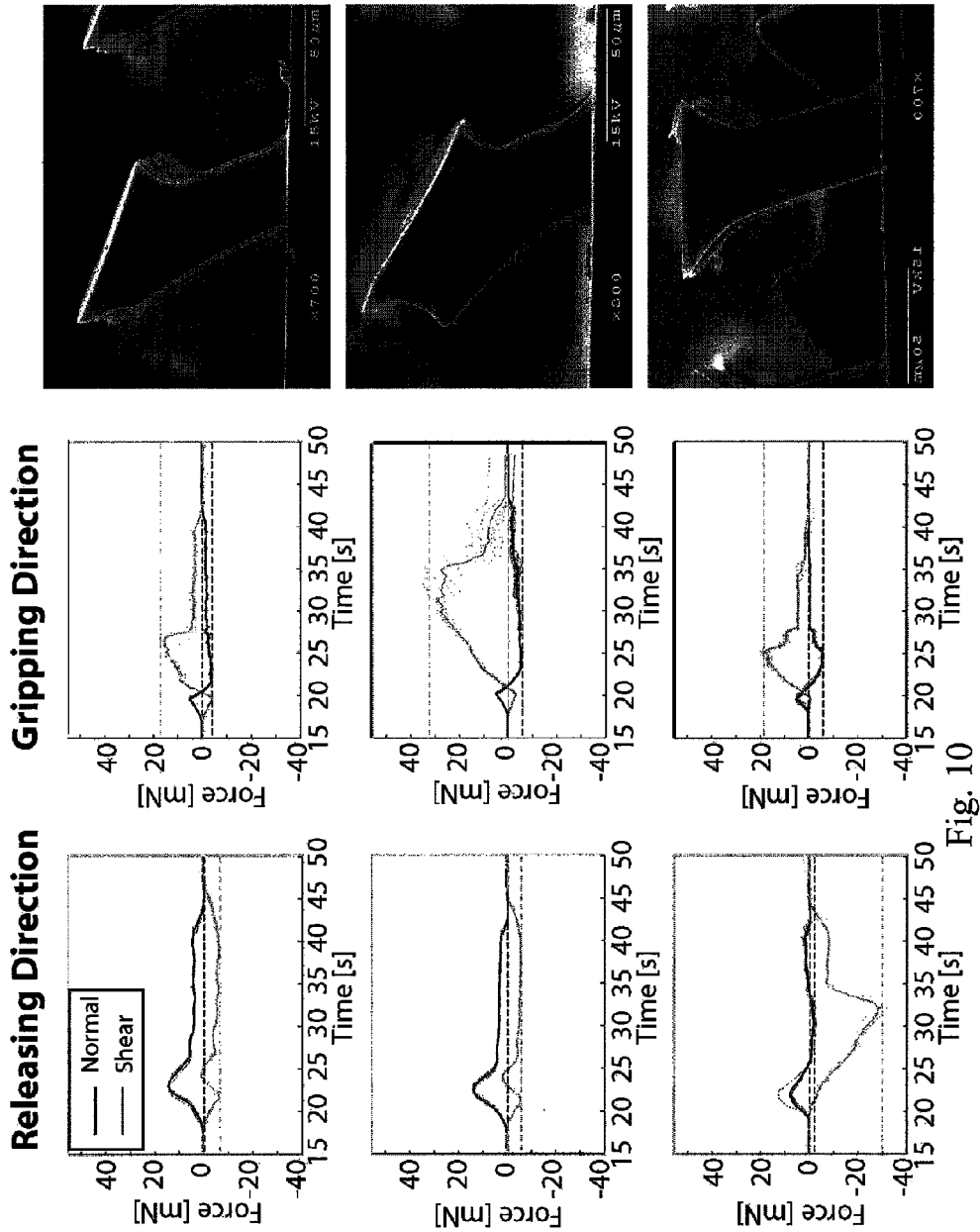
FIG. 10 provides data and associated SEM images for various fiber and tip geometries fabricated according to the present invention.

Three samples with varying geometry were tested using the same experimental setup outlined above. The resulting data from three representative samples are plotted together along with SEM images of the samples in FIG. 10. In particular, FIG. 10 illustrates anisotropy test data for three samples in which columns from left to right illustrate: normal and shear forces in the 'releasing' direction and gripping direction, SEM images of samples in profile view. Fibers with higher tip angle exhibit higher anisotropy.

Maximum shear force was not found to have any direct dependence on base fiber angle) (51-78°), tip angle (0-34°), base fiber diameter (32-45 µm), or base fiber length (74-105 µm) within the variations between the samples. However, a strong correlation was seen between maximum shear force and tip area, as illustrated in FIG. 11.

Figure 11:
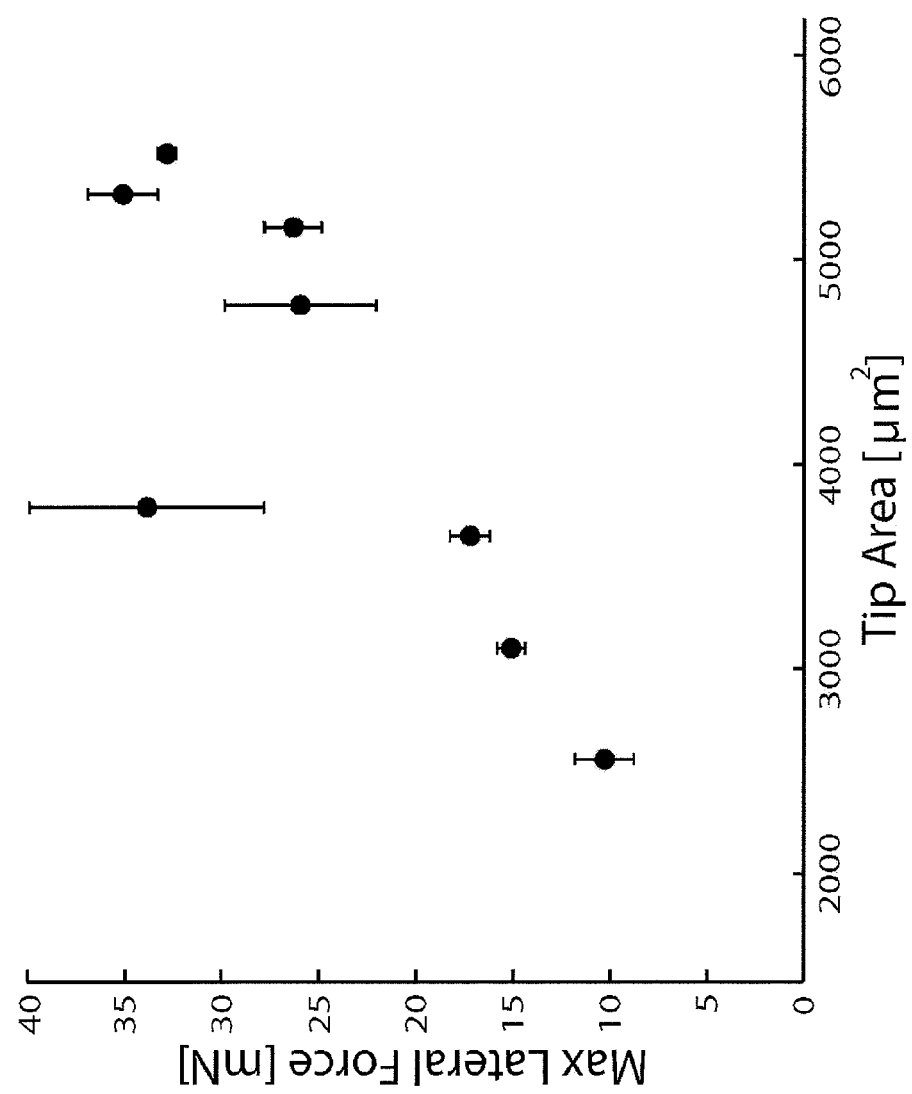
FIG. 11 provides data on the relationship between fiber tip area and lateral force.

FIG. 11 illustrates maximum measured lateral force has direct dependence on tip area. This relationship confirms that mushroom tips with large contact areas are beneficial for creating high shear adhesion, similar to the dependence of normal adhesion on tip area investigated previously. Also, the degree of anisotropy was seen to be correlated with tip angle, where larger tip angles resulted in larger differences between the shear resistances in the 'releasing' and 'gripping' directions, which is consistent with the expectations from the above analysis. These results indicate that tip area can be used as a design parameter to control the level of adhesion, while tip angle can be used to design for desired levels of anisotropy.

1.3.1 Adhesion Control

It has been shown that a shear displacement is required before biological gecko foot-hairs (setae) can provide adhesion to a surface. To demonstrate the ability to control adhesion of our microfiber arrays via shear displacement, a separate set of experiments was performed.

Figure 12A:
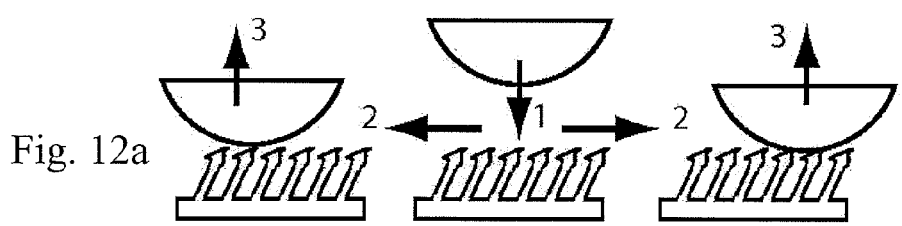
FIG. 12 provides data and microphotographs indicating the shear displacement of materials fabricated according to the present invention.
Figure 12B:
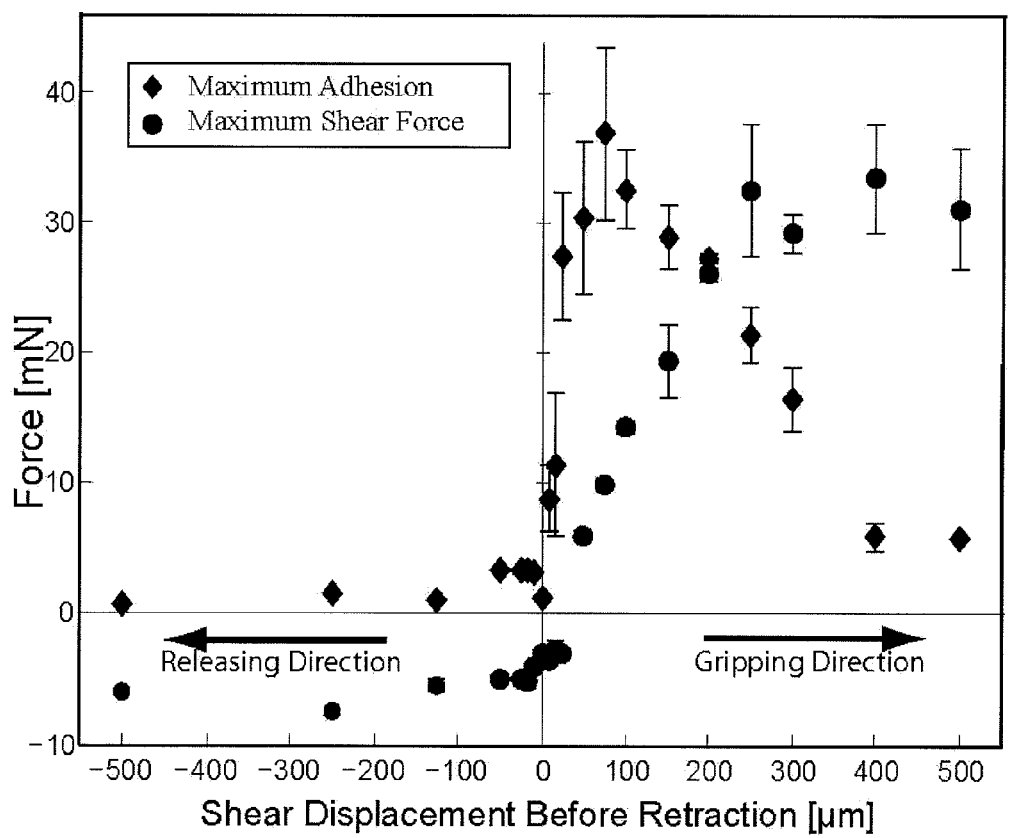

FIG. 12 illustrates how adhesion is controllable by varying the shear displacement of the fibers during loading. In summary, FIG. 12a is an illustration of the displacements in the Load-Drag-Pull experiments. FIG. 12b illustrates experimental data of maximum adhesion values during normal direction separation following varying shear displacements, as well as maximum shear forces during shear displacement. FIGS. 12c-12e illustrate maximum vertical stretching of fibers before detachment, following varying shear displacements of: (c) 100 µm (releasing direction); (d) 50 µm (gripping direction), (e) 75 µm (gripping direction), (Scale bar: 100 µm).

FIG. 12 will now be described in more detail. FIG. 12a illustrates the displacements of the indenter in the 'adhesion control' experiments. First the indenter was moved into contact with the fibers to apply a 5 mN preload force (step 1). Next, a variable shear displacement was applied between the surfaces in either the 'gripping' or 'releasing' direction. Finally, the indenter was retracted away from the fibers. This type of experiment is sometimes referred to as Load-Drag-Pull (LDP) [K. Autumn et al., "Frictional adhesion: a new angle on gecko attachment," Journal of Experimental Biology, vol. 209, pp. 3569-3579, 2006]. The maximum shear force during the shear displacement phase (step 2) and the maximum adhesion measured during the shear displacement or retraction phase, whichever is higher, (step 3) are plotted for varying shear displacements in FIG. 12b.

The results in FIG. 12b confirm that, similar to gecko setae, adhesion can be controlled by lateral displacement during initial contact. Experiments with zero shear displacement, or displacement in the 'releasing' direction of any magnitude, result in negligible adhesion and low shear forces. This is the same behavior observed by Autumn et al. in the natural gecko setae. However, displacements in the 'gripping' direction resulted in large detachment forces in the normal direction, and generated significantly higher shear forces during shear displacement as well. For our samples, the adhesion value is maximized at approximately 75 µm of shear displacement before retraction. After 75 µm of shear displacement, the fibers were observed to begin to contact each other, resulting in premature detachment, which results in lower adhesion during retraction. Another reason for the decrease in adhesion for experiments with higher shear displacements is that many of the fibers begin to detach from the indenter during the shear displacement due to high extension. When the fibers detach during the shear displacement phase, they do not contribute to the adhesion during the retraction phase, and the resulting adhesion is low. The significant difference in the adhesion in the 'gripping' and 'releasing' directions suggests that, like the gecko's footpads, the angled tip microfiber adhesives can provide controlled levels of adhesion to a surface via loading in the 'gripping' direction, and can be easily separated from a surface via shear motion in the 'releasing' direction.

FIG. 12(c-e) shows profile views of angled mushroom tip fibers at the instant before final detachment after varying shear displacements. Any shear displacement in the 'releasing' direction resulted in negligible fiber extension and very low adhesion as the fibers slid out of contact with the indenter (FIG. 12c). In the 'gripping' direction, the fibers stretched further before detaching when displaced 75 µm in shear (FIG. 12e) compared to the detachment after a shear displacement of 50 µm (FIG. 12d), which is expected from the results in FIG. 12b. These images demonstrate the significant difference in contact behavior for displacements in the 'gripping' and 'releasing' directions. The profile view also allowed direct observations of the fiber-fiber collisions which often resulted in immediate detachment. Although close fiber spacing can increase the number of fibers in contact with a surface for a given area, it limits the maximum size of the tips (the tips can merge during fabrication) and prevents long-range independent motion of the fibers. Increasing fiber spacing, altering the fiber angle orientation, or arranging the fibers in different patterns may increase the adhesive performance of the fibers by increasing the distance that fibers can extend before encountering a neighboring fiber.

Figure 13B:
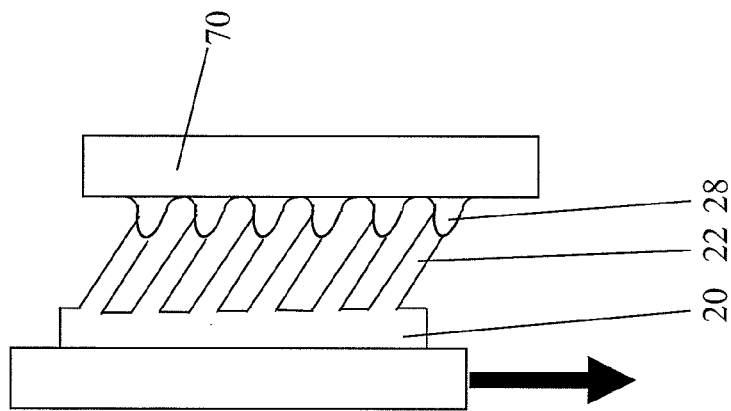
FIG. 13 provides photographs illustrating the directionality of the shear force capacity of materials fabricated according to the present invention.
Figure 13A:
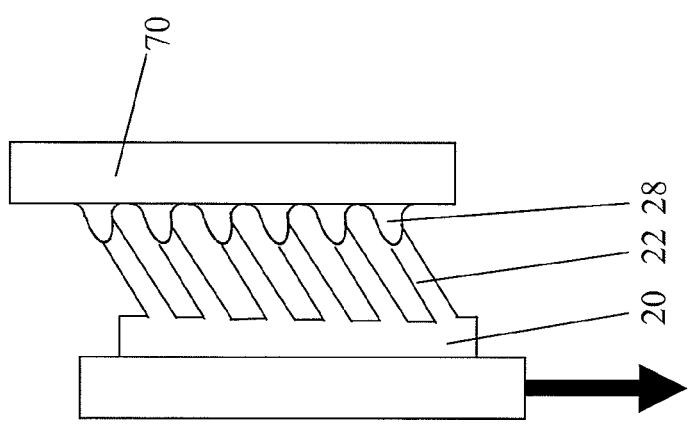

As a demonstration of the macroscale adhesion of the directional microfiber array, a small area (1 cm$^2$) of a sample with 14° tip angle was attached to a glass slide 70 which supported a hanging weight of 1 kg in pure shear in the 'gripping' direction, an interfacial shear strength of ~100 kPa (FIG. 13a), which is within the range of measured interfacial shear strength of gecko toes on smooth surfaces (88-200 kPa). When reversed to the 'releasing' direction, the same sample was able to support only 200 g (~20 kPa) as illustrated in FIG. 13b. However, for both of these experiments, the fiber sample could only sustain the load for tens of seconds before detaching. The highest sustained loading over five minutes was 500 g (~50 kPa) in the 'gripping' direction. The sample was a directional polyurethane microfiber array with 14° angled tips adhering to smooth glass can support.

1.3.2 Summary

We have described embodiments of the present invention in which fiber array constructs are created by dipping an angled fiber array into a thin film of liquid polymer and then pressed against a substrate to form specialized tips with controllable orientation to the fibers. These constructs exhibit similar shear adhesive strength to the gecko lizard's feet on smooth surfaces, as demonstrated with macro-scale support of significant loads (1 kg/cm$^2$). These adhesives exhibit directional characteristics, gripping when loaded in one direction, and releasing when loaded in the opposite shear direction. We have shown that the adhesion can be controlled by varying the shear displacement before loading in the normal direction. The angled tips of the fibers create a larger contact area and are responsible for the observed shear anisotropy. We have identified tip area as a main design parameter for the magnitude of the interfacial shear strength, and the tip angle as a design parameter to control the anisotropy ratio. The fabrication methods described in this invention can be easily extended to smaller size scales and stiffer materials to more closely mimic the gecko's adhesive structures. The high magnitude anisotropic adhesion of these materials may enable efficient gripping and releasing of structures. Additional embodiments of the invention will now be described.

1.4 Multi-Level Hierarchical Fibers

In other embodiments of the present invention, the fiber arrays fabricated according to the methods described above, are again placed into a thin film or liquid polymer. In these embodiments, however, instead of then pressing the wet polymer at the tip of the fibers onto a flat surface, the wet polymer is pressed onto either an array of smaller scale fibers, or onto a mold to create an array of smaller scale fibers on the tips of the fiber array. These methods result in a hierarchical fiber array construct, as described in further detail below. These structures provide improved adhesive characteristics for adherence to uneven and rough surfaces, and mimic the hierarchical fiber structures observed in nature.

The motivation for the creation of hierarchical structures is to provide greater adhesion to uneven and rough surfaces. Adaptation to uneven and rough surfaces is a major feature of biological fibrillar adhesives. Most natural and man-made surfaces are not perfectly smooth, and traditional adhesives are typically less effective on rougher surfaces. Fibrillar adhesive materials with large areas and high uniformity can be fabricated according to the methods of the present invention described below. We also describe experimental results, which characterize the adhesive performance of the hierarchical materials against a smooth flat punch and a smooth curved surface. The performance results are compared to a flat control sample. Furthermore, we describe observations that 21 were made about the interaction of fibrillar adhesives with uneven surfaces by viewing these interactions from the side with a microscope.

Figure 1A:
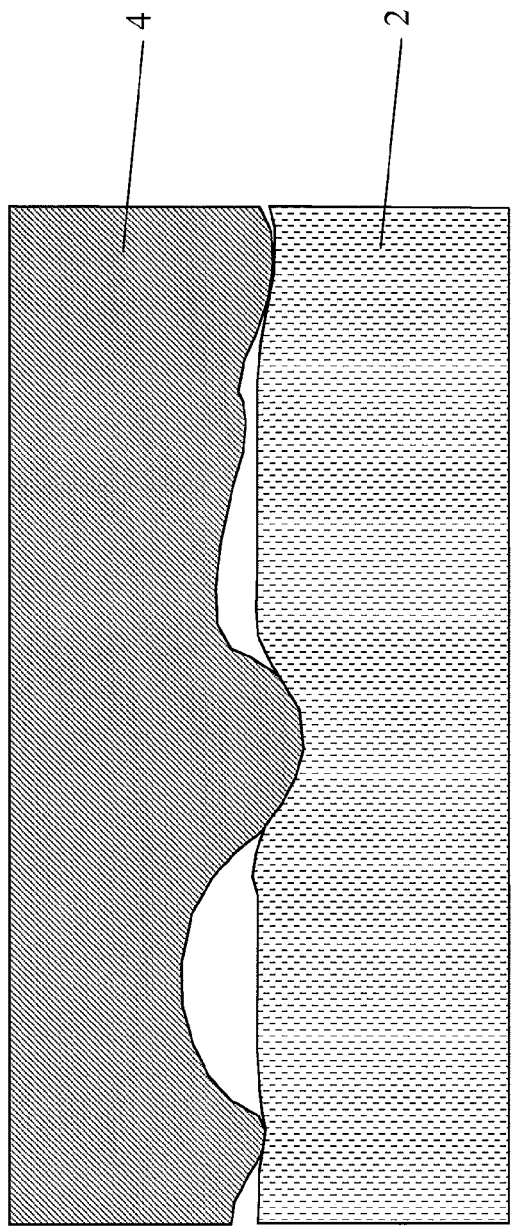
FIGS. 1a and 1b illustrate the contact area of a flat material and a fibrillar material against a rough surface.
Figure 1B:
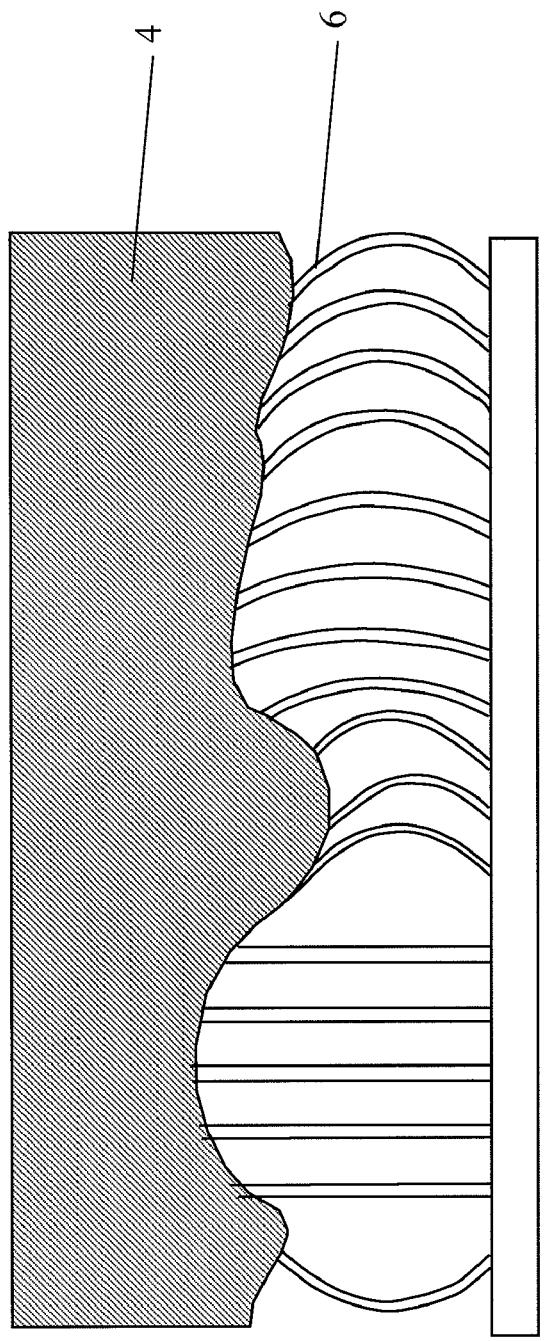

One advantage of fibrillar adhesives over flat unstructured adhesives is that each fiber deforms independently, which allows them to access deeper recessions to make contact. Even with the reduced total area due to the spaces between the fibers, the actual contact area can be greater than that of a flat adhesive in contact with a rough surface (FIG. 1). When a flat adhesive contacts a rough surface, contact is only made at the highest asperities, and deformations of the bulk layer is relatively small. This leads to an overall low contact area. Because of their structures, fibrillar adhesives have a much lower effective Young's modulus, and can deflect more to conform to surface roughness. In addition, the low effective modulus prevents the material from attempting to return to its original shape from stored elastic energy while attached to a surface, effectively peeling itself away from the surface as seen in unstructured polymers. This allows larger surface roughness asperities to be tolerated as well as some forms of contamination. Although the contact area at each tip can be small, the summation of the contact areas of all of the fibers in contact can be quite significant, particularly if the fibers can stretch or deflect and remain in contact for large extensions.

Another advantage of fibrillar surfaces is their ability to enhance adhesion by contact splitting. If contact is split into many finer independent contacts, adhesive strength increases due to load sharing. However, adhesive force is directly proportional to both adhesive strength and total contact area. To exploit the advantage from fibrillar adhesives, the enhancement from contact splitting must compensate for the reduction in contact area due to the lost area between the fibers.

1.4.1 Hierarchical Structures in Nature

In nature, the most advanced fibrillar dry adhesives are found in the heaviest animals such as the tokay gecko which can weigh up to 300 grams. In comparison to the insects whose bodies are much lighter and do not require high performance adhesion, these animals have more complex adhesive pads with many levels of compliance including their toes, foot tissue, lamellae, and fibers. Additionally, these fibers branch from a micron-scale diameter to sub-micron diameter tip fibers. The fiber structure is similar to a branching tree or a broom. This multi-level hierarchy allows the adhesives pads to conform to surface roughness with various frequency and wavelength scales. The toes and tissue conform to large-scale (mm scale) roughness, and each subsequent level conforms to roughness at its corresponding size-scale. Finally, the sub-micron tip fibers can access the smallest surface valleys.

Figure 14:
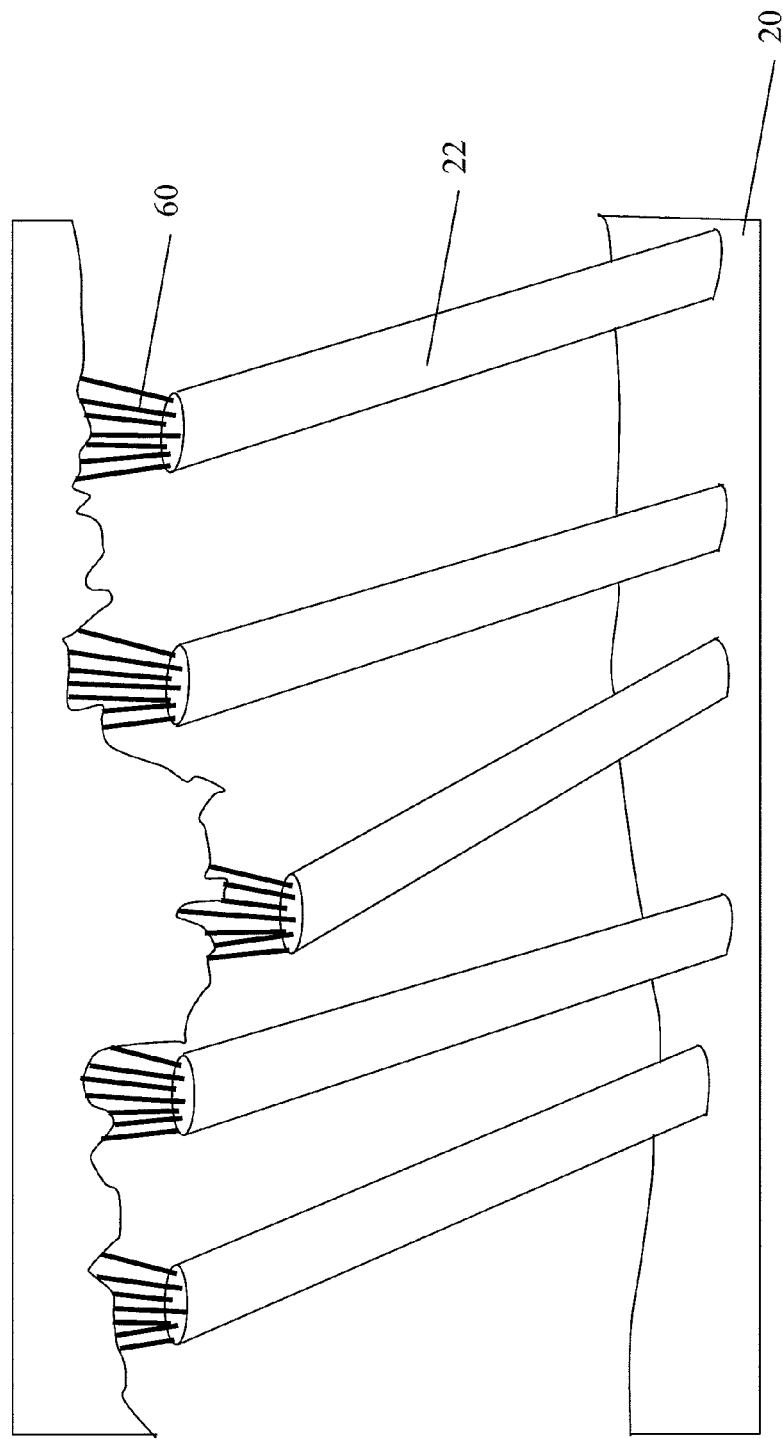
FIG. 14 illustrates the interaction between hierarchical fibrillar structures and a rough surface.

FIG. 14 illustrates a hierarchical structure that allows roughness adaptation to small and large wavelength and amplitude of surface roughness. In particular, a two level hierarchy is illustrated in FIG. 14 where the large base fibers or stem 22 conform to the low-frequency, high amplitude roughness, while the tip fibers 60 conform to the high frequency, low amplitude roughness. Furthermore, the smaller tip fibers 60 have small endings, which are more likely to lie flat against the adhering surface due to their size scale. Where a large fiber tip may encounter roughness underneath the tip, the surface may appear locally flat at the length scale of the smaller fibers' 60 tips. The smaller fibers 60 may be formed of the same material as the large base fibers 22 and may be, for example, another layer of stems, such as second layer stems. The smaller fibers 60 may be formed, for example, with a molding process as described herein or by other processes. The smaller fibers 60 may also be made from a different materials than the large base fibers 22, such as with carbon nanofibers of other materials, as described herein. Although this embodiment of the invention has been illustrated with two layers or hierarchies of stems, the present invention also includes dry adhesives with more than two layers of stems.

This type of multi-level structure is desirable for synthetic fibrillar adhesives as well. In this section, we disclose several fabrication techniques for creating hierarchical synthetic fibers according to the present invention. These methods result in hierarchies from the millimeter scale to sub-micron scale. Fabrication results are also demonstrated and described. Finally, hemispherical indenter tests are used to examine the effect of hierarchy on adhesion and interface toughness.

1.4.2 Fabrication

The present invention includes several embodiments to fabricate fibrillar structures with multiple levels of hierarchy. These methods span the size scales from millimeter scale molding to nanoscale carbon nanofiber embedding. The following sections detail the fabrication processes and provide experimental 23 results of these techniques.

1.4.3 Nanoscale Hierarchy

In order to reach into the smallest recesses of a surface, the distal fibers of an adhesive pad should have sub-micron diameters, as seen in the gecko's setae. It is possible to create synthetic fibrillar surfaces with nanoscale diameter tip fibers by embedding vertical arrays of carbon nanotubes or carbon nanofibers into the tips of base fibers.

In one embodiment of the present invention, the mushroom tip fabrication process detailed previously is altered to enable the embedding of smaller scale fibers 60, such as carbon nanofibers or carbon nanotubes, into the tips 28 of polyurethane fibers.

Figure 15E:
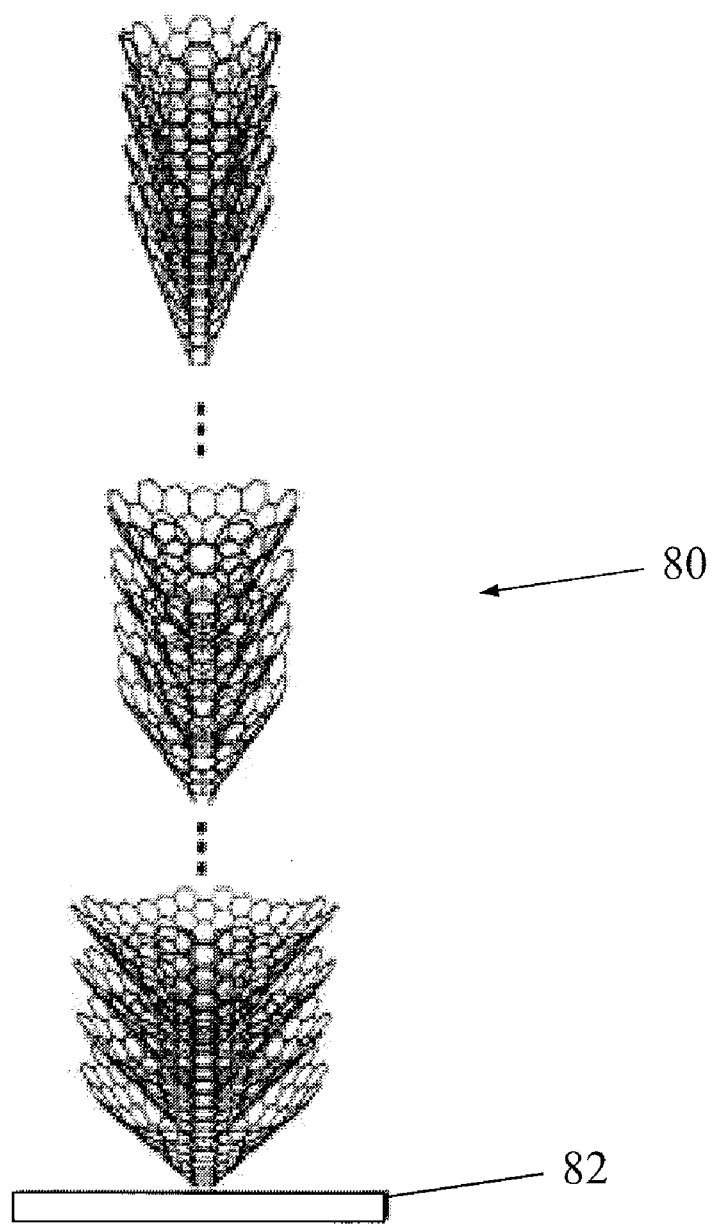
FIG. 15 illustrates the fabrication process for embedding carbon nanotubes or nanofibers into the tips of base fibers according to the present invention.

FIG. 15 illustrates one embodiment of that process according to the present invention. In general, the process is for embedding carbon nanotubes or carbon nanofibers, or other structures 60 into the tips 28 of base fibers to form a hierarchy. In FIG. 15*a*, fibers or stems 22 are dipped into a liquid polyurethane layer 40. In FIG. 15*b*, the ends of the fibers are coated with liquid polyurethane 40. In FIG. 15*c*, the fiber array is placed into contact with a vertical array of nanofibers or nanotubes or other structures 80 which will form the second layer stem 60. In FIG. 15*d*, the fiber array is peeled from the surface, retaining the embedded nanofibers 80 as a second layer stems 60. FIG. 15*e*, is an illustration of the stacked conical structure of Carbon Nanofibers that may be used with the present invention. The widening of the conical structure near the base of the fibers 80 makes them most likely to fracture at this point.

The process illustrated in FIG. 15 will now be discussed in more detail. The process utilizes an array of smaller fibers 80, such as carbon nanofibers or carbon nanotubes or other structures on, for example, a carrier wafer or chip 82. In the process, a base fiber 22 array is dipped into liquid polyurethane 40 (FIG. 15*a*) and picks up a layer of the liquid 40 on the tips of each fiber (FIG. 15*b*). After waiting some time to allow the liquid to partially cure, increasing its viscosity, the material is then placed onto the top of the vertical nanofiber 80 array (FIG. 15*c*). At this point, the liquid polyurethane 40 is pulled into the nanofiber 80 array by capillary forces. These forces are extremely strong, due to the small spacing and large surface area between the fibers 80, so low viscosity liquid polyurethane 40 would be completely absorbed. With proper viscosity, the liquid polyurethane layer is partially absorbed, resulting in a branch-like structure (see FIG. 16*b*). After curing, the material construct is mechanically peeled from the carrier wafer 82, breaking off the nanofibers 80 at their bases. The final structure is a hierarchical fiber with an extremely robust embedding of nanoscale diameter fibers 60 at the tips.

Vertical arrays of carbon nanofibers 60 were used in one embodiment of the present invention. Those skilled in the art will recognize that other small scale or nanofiber arrays could be used. Carbon nanofibers have sufficient stiffness to prevent lateral collapse and are able to be closely spaced. Although carbon nanofibers have high stiffness, they also can be grown to high aspect ratios, allowing them to be compliant in the vertical direction. Another advantage of carbon nanofibers for this process is that the weakest part of the structure is at the base where the fiber meets the carrier wafer, due to a widening of the cone-shaped carbon sheet structure near the interface (FIG. 15*e*). This weakness ensures that the fibers will break at this point when mechanically peeled, resulting in a uniform height for all of the fibers.

Figure 16:
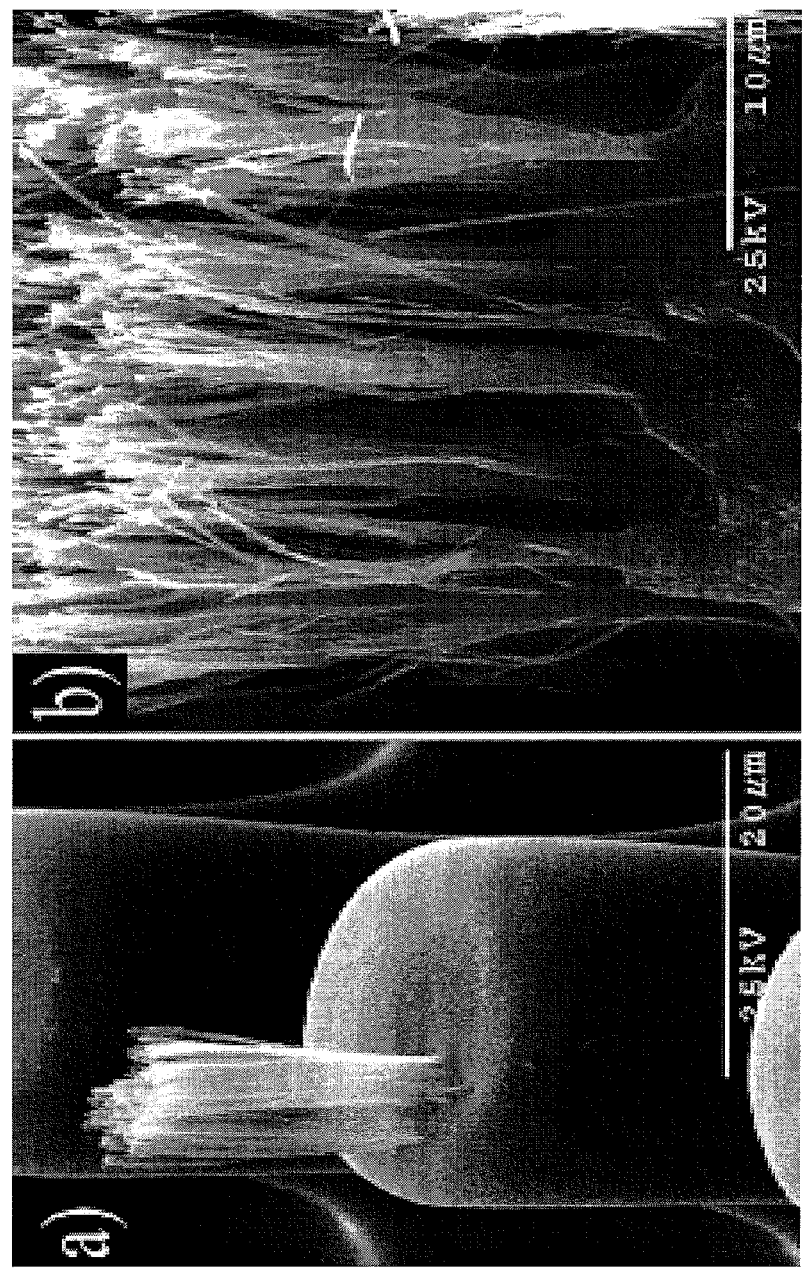
FIG. 16 provides SEM images of carbon nanofibers embedded into the tips of base fibers fabricated according to the present invention.

Initial results (FIG. 16) confirm that embedding nanofibers at the tips of polyurethane base fibers using the above process is feasible. FIG. 16*a* illustrates a Scanning Electron Micrograph of carbon nanofibers embedded into the tips of polyurethane base fibers to form a hierarchical fiber structure. FIG. 16*b* illustrates a detailed view of the branching structure and uniform height of the carbon nanofibers.

In another embodiment of the present invention, methods are provided to fabricate hierarchical structures with specialized tips on the smaller scale fibers. As we have shown previously as well as observed in natural fibrillar adhesives, widened tips provide a significant increase in adhesion. We have developed a tip fabrication process that allows the tip fiber shape to be controlled by micro-molding.

In this process, after the previously detailed dipping of base fibers 22 in a liquid polymer layer 40, the fibers 22 are placed onto an etched silicon wafer. This wafer has micron-scale diameter cylindrical holes with a widened tip formed by Deep Reactive Ion Etching. These silicon-on-oxide negative templates can be fabricated according to the methods described in U.S. patent application Ser. No. 12/448,243, which is incorporated herein by reference.

FIG. 17 illustrates one embodiment of the process for fabricating hierarchical fibrillar adhesives with controlled tip fiber shape. FIG. 17*a* illustrates base fibers 22 with mushroom tips 28 that are dipped into a liquid polyurethane layer 40. The liquid polyurethane 40 may be, for example, on a carrier surface. FIG. 17*b* illustrates that some of the liquid polymer 40 is retained by the tips 28. FIG. 17*c* illustrates the fiber 22/28 array placed onto an etched silicon mold 50, where the liquid 40 from the tips 28 is drawn into the negative features 52. FIG. 17*d* illustrates that after the polyurethane 40 has cured, the silicon mold 50 is etched away with, for example, a dry etching process. The polymer tips 40 may be removed mechanically by peeling from the mold 50, which is preferred when the mold 50 is made from a compliant material such as silicone rubber.

One embodiment of the process illustrated in FIG. 17 will now be described in more detail. The process begins with an array of base fibers 22 with flat tips 28, which are dipped (FIG. 17*a*) into a thin liquid polyurethane layer 40 and then placed onto the negative silicon master template 50 (FIG. 17*c*). Capillary forces draw the liquid polymer into the cavities 52, which become filled beneath the base fibers 22/28. The material is then cured according to methods known to those skilled in the art, and the cured material becomes second layer stems 60 formed in the mold 50. The mold 50 is removed using, for example, $Xe_{F2}$ dry etching to expose the second layer stems 60. Since the etching process occurs over several hours, the base fibers 22/28 must be protected from the etching gases, as they are damaged by the prolonged exposure. To prevent this, in one embodiment, the material construct is encapsulated in protective polymer layer (not shown), such as polyurethane, which seals the edges and does not allow the etching gases to reach the base fibers 22/28. When etching is complete, the final hierarchical structures remain (FIG. 17*d*).

Figure 18:
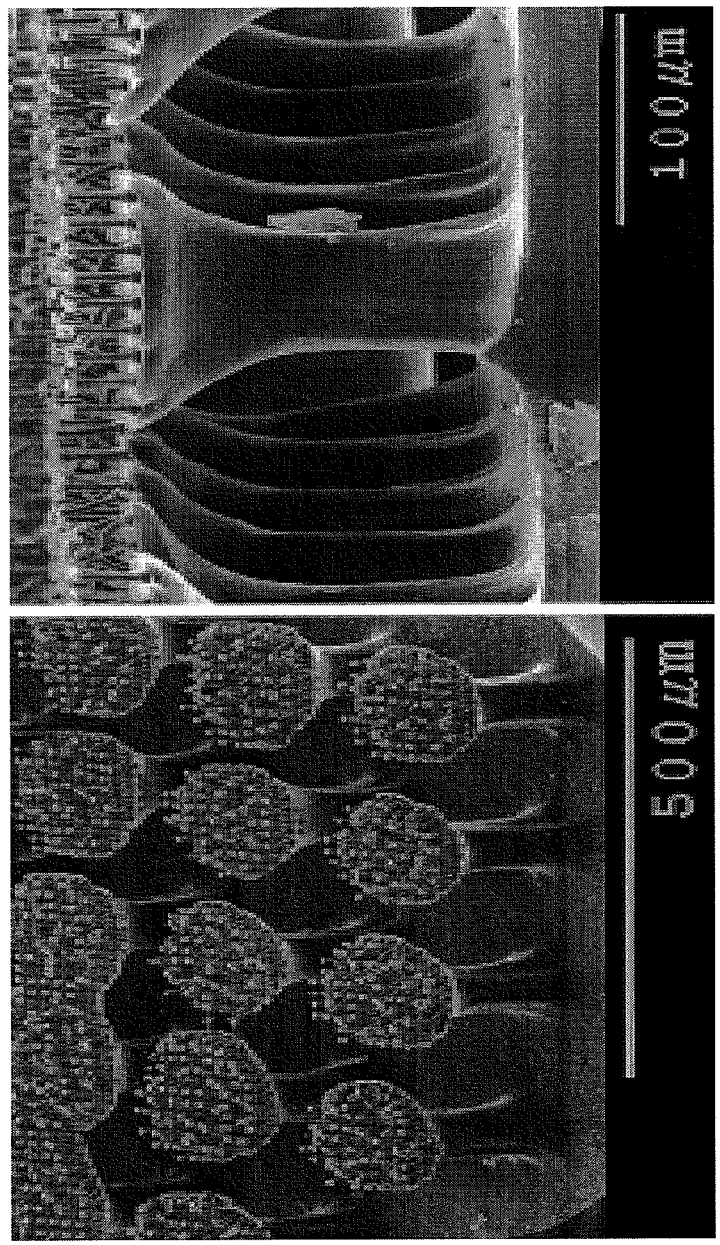
FIG. 18 provides SEM images of molded hierarchical fibrillar structures fabricated according to the present invention.

Material constructs fabricated with this process can be seen in FIG. 18. In particular, FIG. 18 illustrates Scanning Electron Micrograph of polyurethane hierarchical fibers with mushroom tips. The base fibers have approximately 50 µm diameter and the tip fibers have 3 µm diameter stems with 5 µm diameter tips.

One advantage of this fabrication method is that there is no constraint on the scale of the tip fibers or second layer stems 60. For example, nanoscale tip fibers 60 may be integrated into microscale base fibers 22 and tips 28 with this technique.

Figure 19:
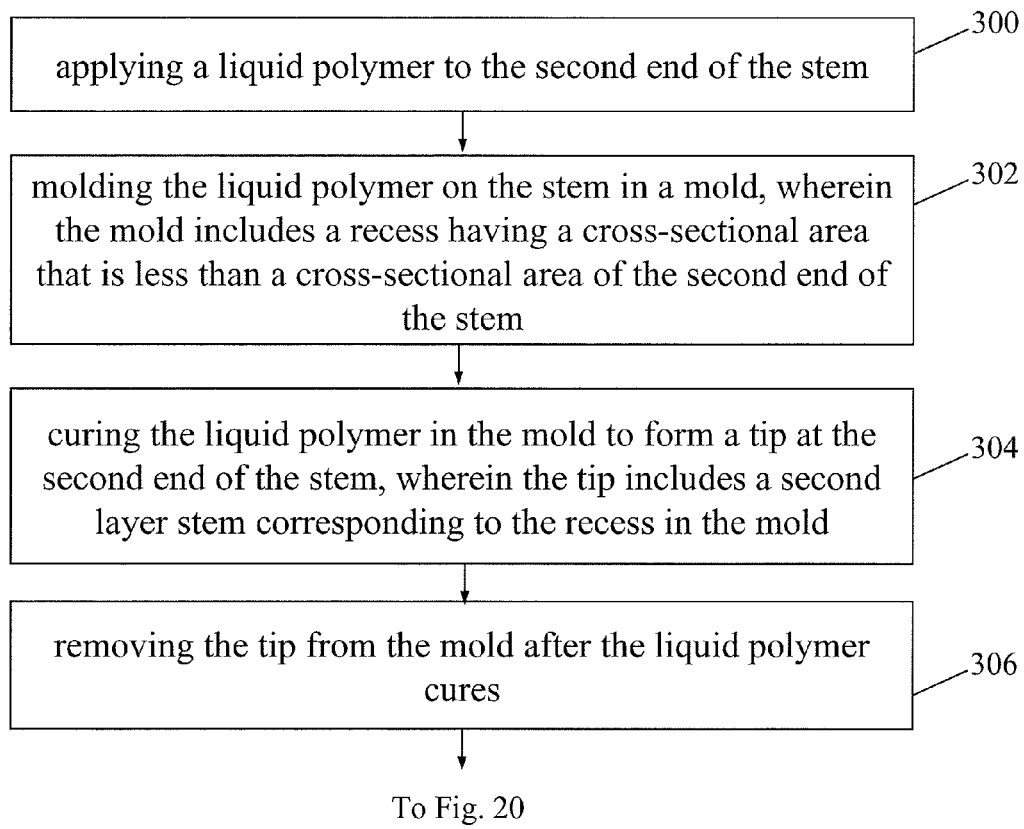
FIGS. 19-22 illustrate methods of making dry adhesives according to the present invention.

An overview of the methods of making dry adhesives according to one embodiment of the present invention will now be provided starting with FIG. 19.

FIG. 19 illustrates one embodiment of a method of forming a dry adhesive 10 with a structure including a backing layer 20 and a stem 22, wherein the stem 22 includes first 24 and second 26 ends on opposite sides of the stem 22, and wherein the first end 24 of the stem 22 is connected to the backing layer 20. The second end 26 of the stem 22 is connected to the tip 28. An example of such as structure is shown in FIG. 17.

Step 300 includes applying a liquid polymer to the second end 26 of the stem 22.

Step 302 includes molding the liquid polymer 40 on the stem 22 in a mold 50, wherein the mold 50 includes a recess 52 having a cross-sectional area that is less than a cross-sectional area of the second end 26 of the stem 22.

Step 304 includes curing the liquid polymer 40 in the mold 50 to form a tip 28 at the second end 26 of the stem 22, wherein the tip 28 includes a second layer stem 60, corresponding to the recess 52 in the mold 50; and Step 306 includes removing the tip 28 from the mold 50 after the liquid polymer 40 cures.

Many variations and modifications are possible with the present invention. Some of those variations and modifications. For example, the stem 22 may be perpendicular to the backing layer 20, or the stem 22 may be non-perpendicular to the backing layer 20. Other examples are provided below.

Step 306, removing the tip from the mold, can include etching the mold from the tip. For example, the tip 28 can be removed from the mold 50 by etching the mold 50 as opposed to, for example, pulling the tip 28 out of the mold 50. Other variations are also possible. If the mold 50 is etching from the tip 28, the method may also include covering the stem 22 with a protective polymer layer, such as polyurethane, before etching the mold 50. This may be done, for example, to protect the stem 22 from the etching processes.

The method of the present invention can be used to make many variations of dry adhesives. In one embodiment, the stem 22 is microscale and the second layer stem 60 is nanoscale. Other variations are also possible. For example, the present invention also includes microscale second layer stems 60 on milliscale stems 22, smaller microscale stems 60 on larger microscale stems 22, and other variations. The present invention can also be used to make dry adhesives with more than two levels of stems 22, 60. For example, the present invention may be used to make dry adhesives with three levels of stems, four levels of stems, or more.

Step 308, molding the liquid polymer on the stem, may include filling the recess 52 in the mold 50 with the liquid polymer 40 via capillary forces.

Step 300, applying a liquid polymer 40 to the second end 26 of the stem 22, includes dipping the second end 26 of the stem 22 in the liquid polymer 40 and removing the second end 26 of the stem 22 from the liquid polymer 40 after the liquid polymer 40 is applied to the second end 26 of the stem 22.

The present invention may also include bending the stem 22 relative to the backing layer 20 while molding 302 the liquid polymer 40 on the stem 22 in the mold 50. The present invention may also include bending the stem 22 relative to the backing layer 20 while curing the liquid polymer 40 in the mold 40. If the stem 22 is bent while the liquid polymer 40 cures, the tip 28 can be made to take on different shapes, depending on the extent to which the stem 22 is bent, as described herein. The bending of the stem may include applying a load to the backing layer 20. Furthermore, the stem may be bent in a direction away from a perpendicular orientation with the backing layer, as described herein.

Figure 20:
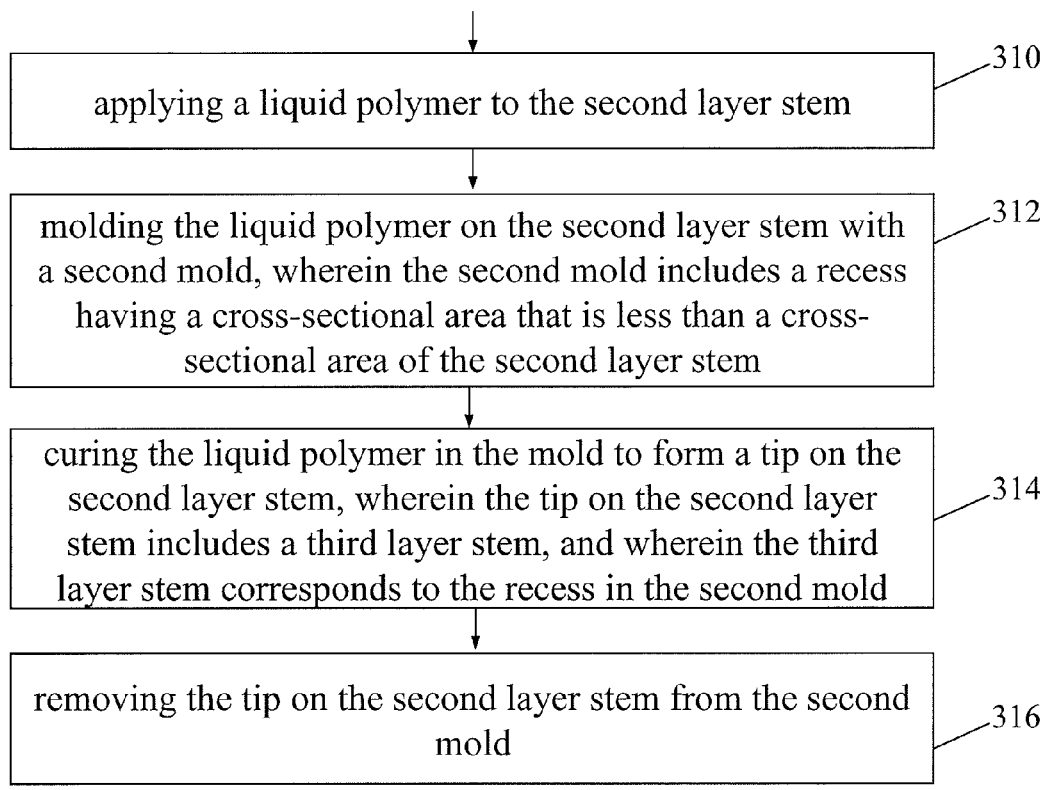

FIG. 20 illustrates another embodiment of the present invention in which further steps are performed after those described with reference to FIG. 19.

Step 310 includes applying a liquid polymer to the second layer stem.

Step 312 includes molding the liquid polymer on the second layer stem with a second mold, wherein the second mold includes a recess having a cross-sectional area that is less than a cross-sectional area of the second layer stem.

Step 314 includes curing the liquid polymer in the mold to form a tip on the second layer stem, wherein the tip on the second layer stem includes a third layer stem, and wherein the third layer stem corresponds to the recess in the second mold.

Step 316 includes removing the tip on the second layer stem from the second mold.

Figure 21:
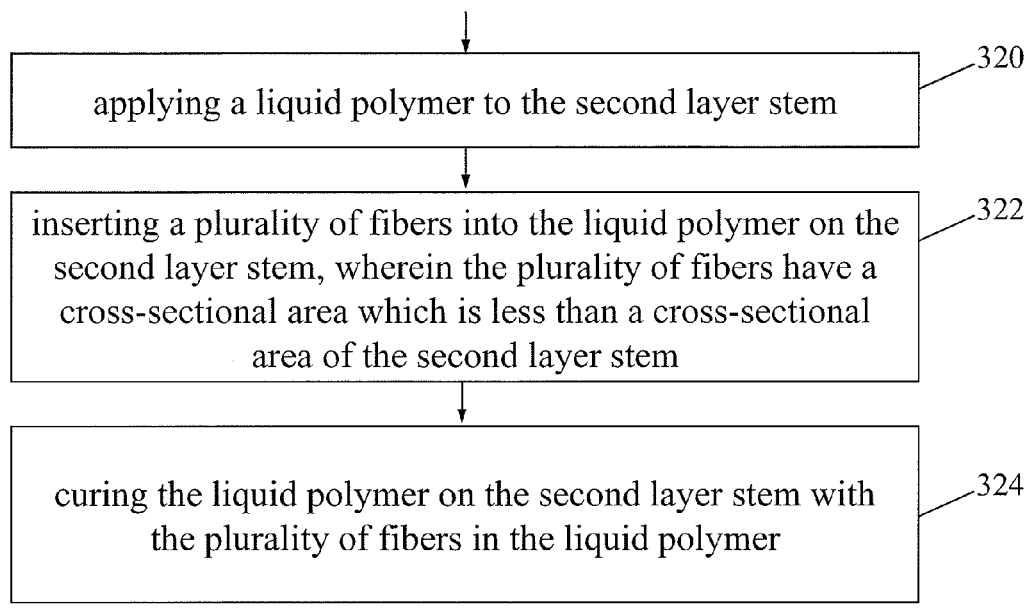

FIG. 21 illustrates another embodiment of the present invention. This embodiment of the method will be described with reference to FIG. 19, although it may also be performed after the steps of FIG. 20.

Step 320 includes applying a liquid polymer 40 to the second layer stem 60.

Step 322 includes inserting a plurality of fibers 80 into the liquid polymer 40 on the second layer stem 60, wherein the plurality of fibers 80 have a cross-sectional area which is less than a cross-sectional area of the second layer stem 60.

Step 324 includes curing the liquid polymer 40 on the second layer stem 60 with the plurality of fibers 80 in the liquid polymer 40.

Many variations and modifications are possible with this embodiment of the present invention. For example, the fibers may be nanotubes, nanowires, nanofibers, or other materials.

Figure 22:
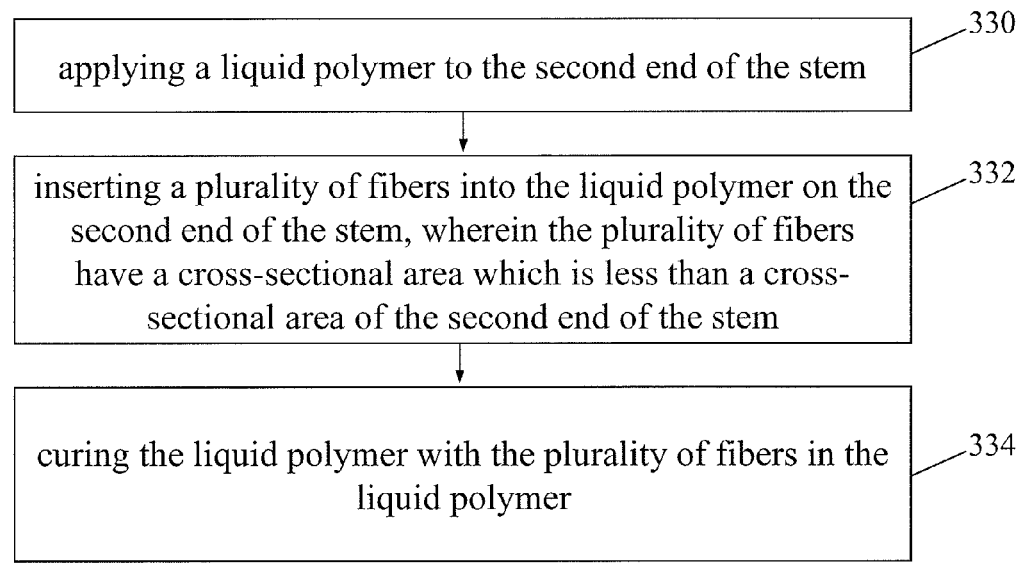

FIG. 22 illustrates another embodiment of the present invention including a method of forming a dry adhesive 10 with a structure including a backing layer 20 and a stem 22, wherein the stem 22 includes first 24 and second 26 ends on opposite sides of the stem 22, and wherein the first end 24 of the stem 22 is connected to the backing layer 20 and the second end 26 of the stem 22 is connect to the tip 28.

Step 330 includes applying a liquid polymer 40 to the second end 26 of the stem 22.

Step 332 includes inserting a plurality of fibers 80 into the liquid polymer 40 on the second end of the stem, wherein the plurality of fibers have a cross-sectional area which is less than a cross-sectional area of the second end of the stem.

Step 334 includes curing the liquid polymer with the plurality of fibers in the liquid polymer.

Many variations and modifications are possible with this embodiment of the present invention. For example, the fibers may be nanotube, nanofiber, nanowire arrays, or other structures. Also, the stem 22 may be perpendicular or non-perpendicular to the backing layer 20.

Step 332, inserting a plurality of fibers into the liquid polymer 40, may include inserting a plurality of fibers connected to a base. Also, after step 334, curing the liquid polymer 40, the present invention may include separating the plurality of fibers from the base.

1.4.4 Macroscale Hierarchy

The previously described techniques are intended to add tip fibers onto molded base fibers to create a multi-layer fibrillar adhesive. Another method to create a fibrillar structure is to create compliance in the backing layer at a larger scale than the base fibers. Even simple slits in an otherwise unstructured material has been demonstrated to increase the average fracture energy of flat elastomers by an order of magnitude, due to inhibited crack propagation. This is seen in the feet of geckos, where the base fibers are attached to thin plate-like structures with spaces in between called lamellae. These lamellae increase macro-scale compliance and prevent crack propagation. For synthetic adhesives, backing layer patterning can be integrated with one of the tip fiber methods described above to create a two-level hierarchy. Like the biological lamellae, these fibers act to arrest cracks and increase compliance.

Figure 23:
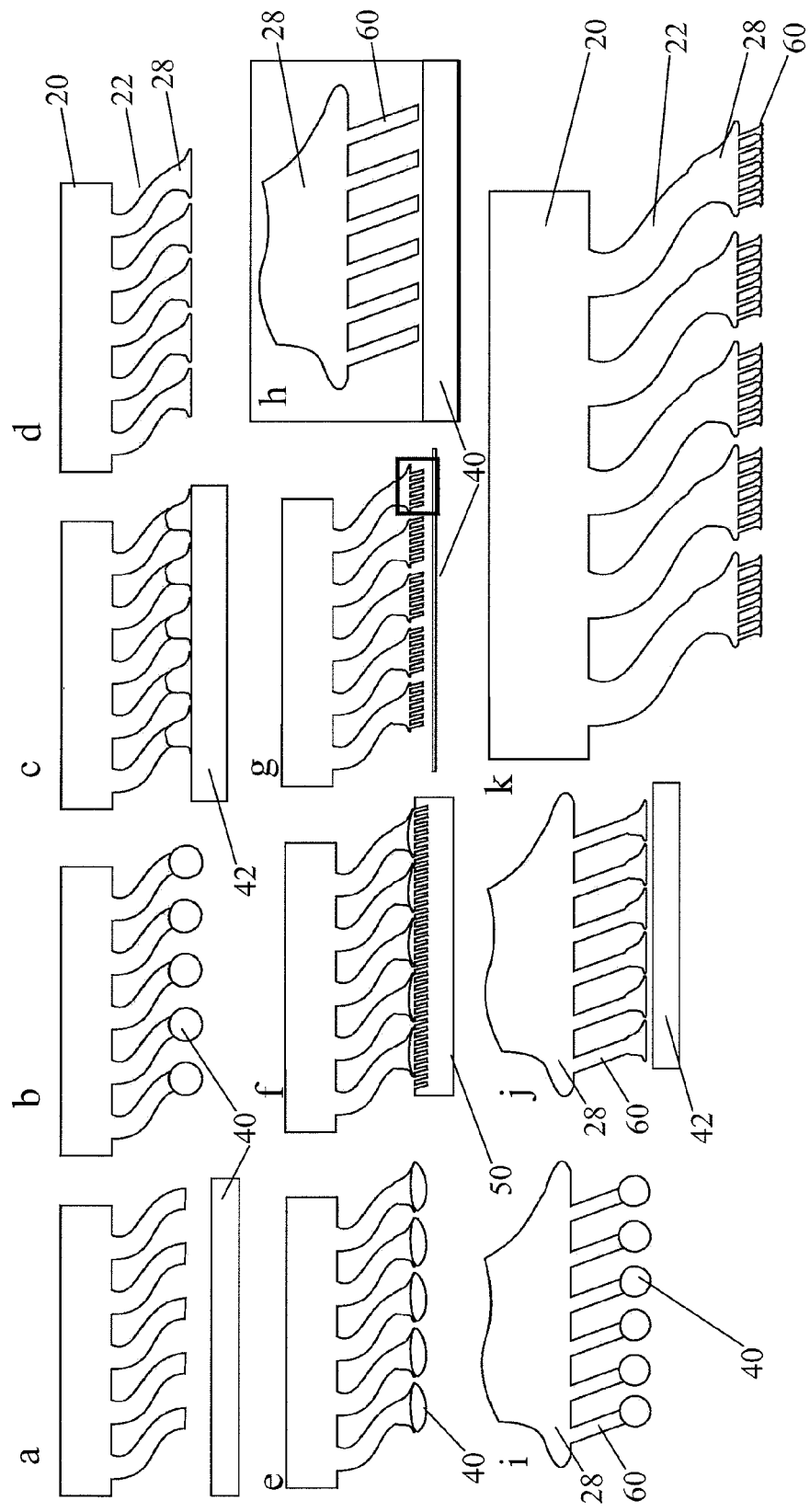
FIG. 23 illustrates the fabrication process for molding macro-micro hierarchical structures according to the present invention.

Fabrication of macro-micro scale hierarchical structures is accomplished using a technique similar to that described above in FIG. 17. FIG. 23 illustrates one embodiment of a fabrication process for macro-micro hierarchical structures Fabrication of the base fibers 22 is accomplished by using a rapid prototyping system (Invision HR, 3D Systems) to print plastic master templates of the desired structures. It is possible to create fibers with diameters as small as 250 μm with this hardware, but the technique is not limited to any particular size scale. Non-cylindrical geometries are possible using this technique as well. The master template is molded with silicone rubber (HS II, Dow Corning) to create a negative mold. After separation from the master template, the negative mold is used to replicate the base structures from polymers such as polyurethane. Wide flat mushroom tips 28 are added to these base fibers 22 in the same way as described for micro-scale fibers. Instead of using the etched silicon mold as in the previous Section, a soft silicone elastomer mold 50 is used to create the tip fibers 60 (FIG. 23*f*), and a subsequent dipping step (FIG. 23*g-j*) to add mushroom tips to these fibers 60. The final two-level structure is illustrated in FIG. 23*k*.

Figure 24:
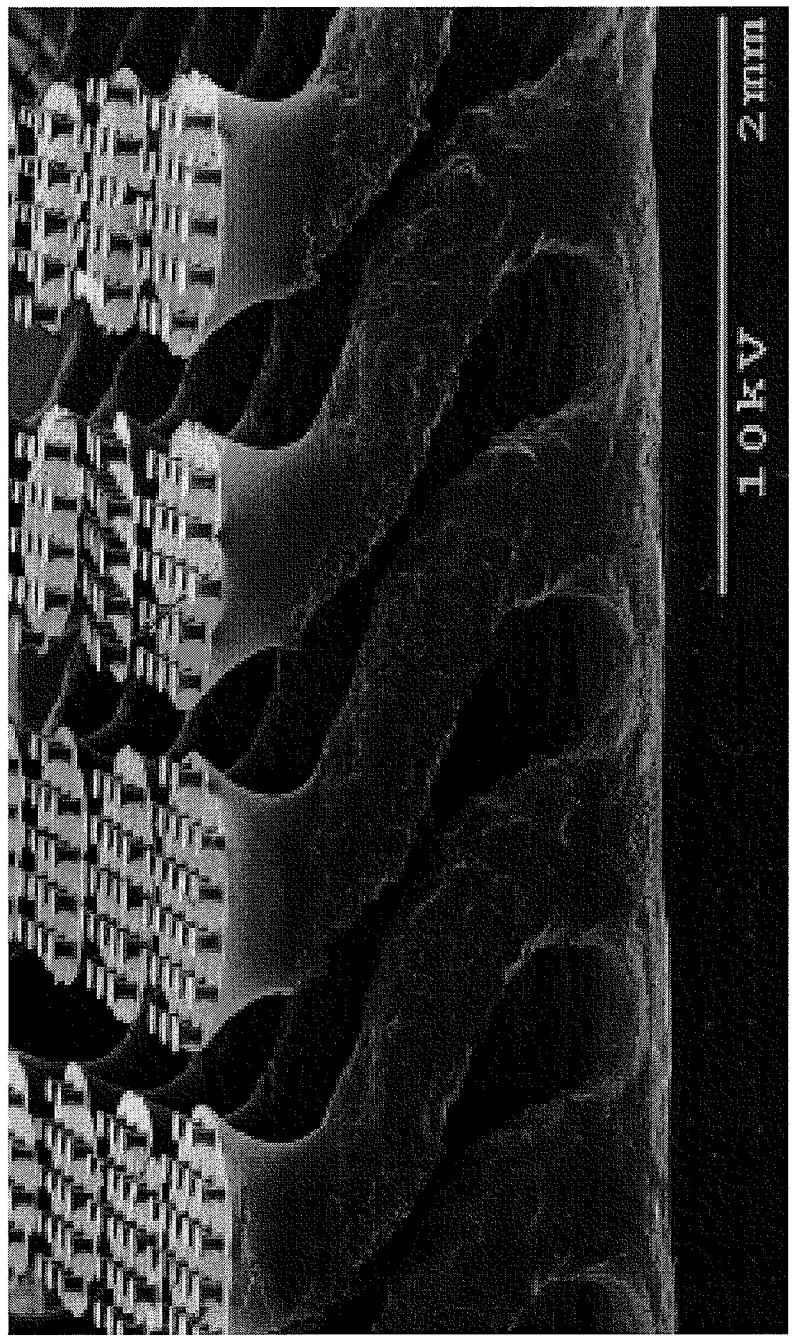
FIG. 24 provides SEM images of molded macro-micro hierarchical structures according to the present invention.

FIG. 24 illustrates a Scanning Electron Micrograph of a two level polyurethane fiber structure, with 50 µm diameter mushroom tipped fibers atop curved 400 µm diameter base fibers with 1 mm diameter mushroom tips.

FIG. 24 illustrates a typical two-level polyurethane fiber structure that can be fabricated using this method. This sample is comprised of 50 µm diameter fibers with 100 µm diameter mushroom tips atop 400 µm diameter base fibers with 1 mm diameter mushroom tips. The curved base fibers demonstrate the feasibility of creating complex shapes. The roughness of the base fibers is due to the relatively low resolution of the rapid prototype master template.

The larger length-scale of these dual-level hierarchical fibers, the roughness adaptation to larger amplitude rough surfaces should be significantly increased. This effect will be investigated in detail in Section 1.4.6.

1.4.5 Three-Level Hierarchy

Figure 25:
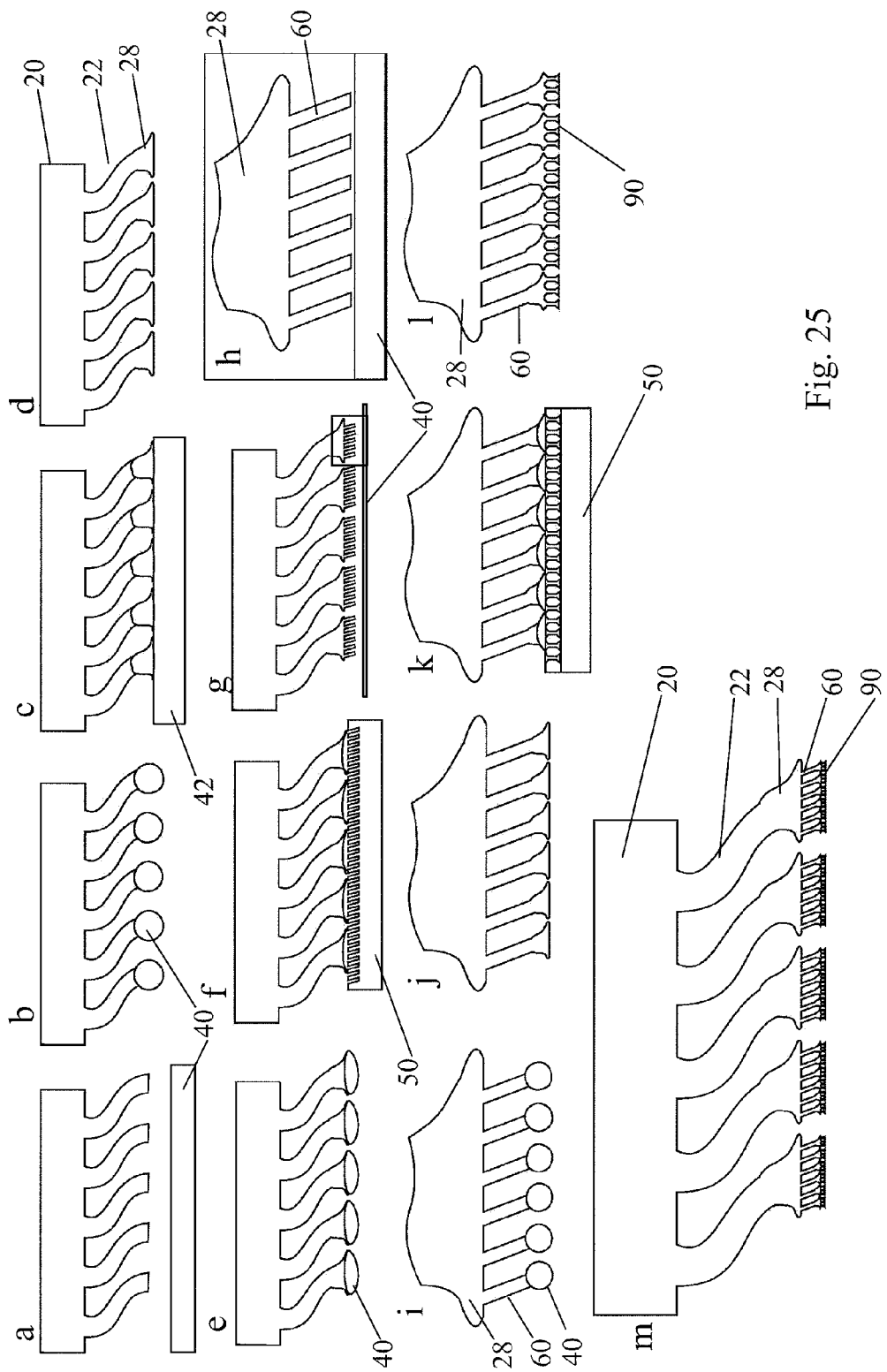
FIG. 25 illustrates the fabrication process for making three-level hierarchical fibers according to the present invention.

In another embodiment of the present invention, the macroscale hierarchy fabrication technique are combined with the microscale hierarchy technique to fabricate three-level hierarchical fibers, each level having mushroom shaped tips for increased area. Combining the processes is relatively straightforward, but does require several steps to complete. (FIG. 25). FIG. 25 illustrated one embodiment of the process flow for fabricating three-level hierarchical fibers according to the present invention. In this embodiment, smaller third level fibers are added by the same method taught in the two-level description above. The illustrated embodiment has first 22, second 60, and third 90 levels.

Many variations are possible. For example, it is possible to simplify this process by doing several of the steps (FIG. 25*a-j*) and then using the resulting structure as a master template. Forming a negative compliant silicone rubber mold at this step allows fabrication of steps (FIG. 25*k-m*) following a single molding step, rather than the many steps it would require otherwise. In this way, the first steps must only be completed once to form the master 2-level structures.

Figure 26:
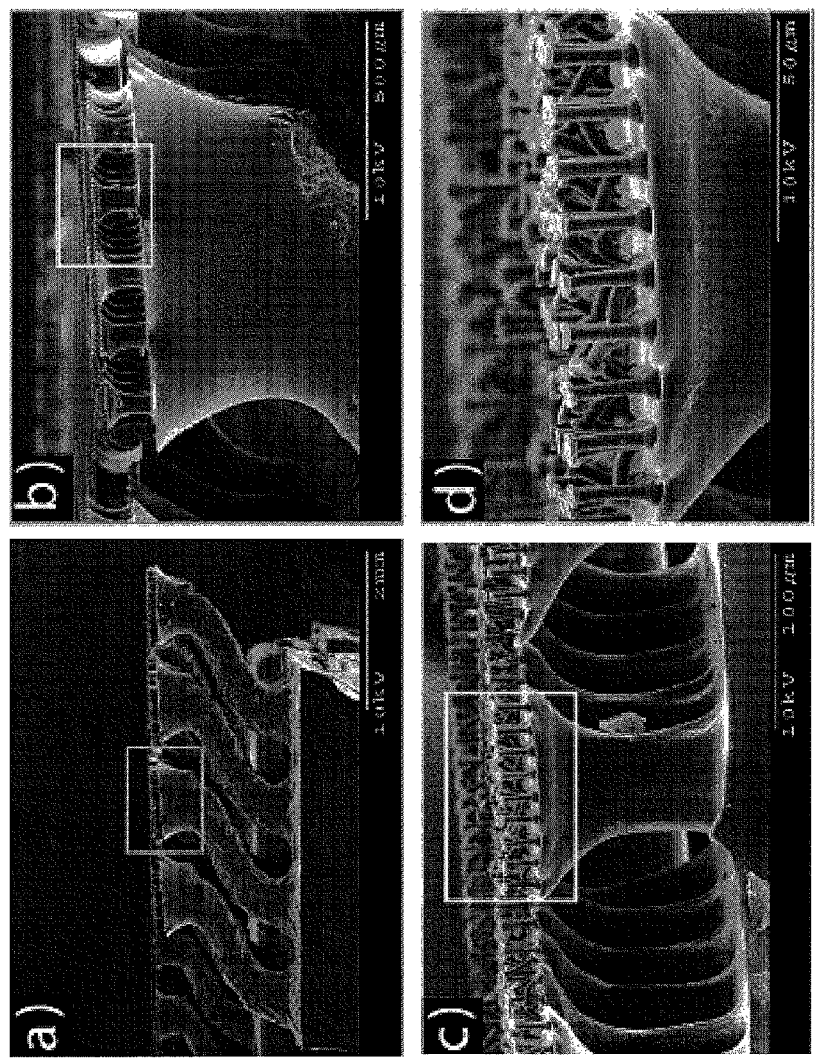
FIG. 26 provides SEM images of three-level hierarchical fibers according to the present invention.

Initial results of three-level hierarchical fiber fabrication are promising. FIG. 26 illustrates Scanning Electron Micrographs of 3-level hierarchical polyurethane fibers. FIG. 26*a* illustrates curved base fibers with 400 µm diameter. FIG. 26*b* illustrates base fiber tip with mid level 50 µm diameter fibers. FIG. 26*c* illustrates mid-level fibers in detail. FIG. 26*d* illustrates terminal third level fibers at the tip of the mid level fibers are 3 µm in diameter, 20 µm tall, and have 5 µm diameter mushroom tips.

Polyurethane structures (FIG. 26) exhibit good uniformity with the exception of the terminal tip fibers. Some of the microscale tip fibers are collapsed due to their small diameters and high aspect ratios, in addition to the large stresses from the final release step in fabrication. Smaller scale fibers benefit from stiffer materials, so it is likely beneficial to use different materials for each of the hierarchical levels. This is easily accomplished using the same fabrication process, simply by dipping with alternate compatible materials for each level of hierarchy.

1.4.6 Experiments

Four samples were fabricated from polyurethane (ST-1060; BJB Enterprises), an unstructured control sample, a single level fiber sample, a double level vertical sample, and a double level angled sample. The double level samples were fabricated using the techniques described in Section 1.4.4. The details of the samples can be seen in Table 1.

TABLE 1

Sample specifications.

| Sample Type | Material | Base Fiber Height | Base Fiber Diameter | Base Fiber Angle | Total Contact Area Fraction |
|---|---|---|---|---|---|
| Unstructured | ST-1060 | NA | NA | NA | 1005 |
| Single Level | ST-1060 | NA | NA | NA | 36% |
| Double Level Angled | ST-1060 | 1.75 mm | 425 µm | 20° | 10% |
| Double Level Vertical | ST-1060 | 1.2 mm | 300 µm | 0° | 19.5% |

All of the samples, other than the unstructured sample, have identical terminal fibers, with 50 µm diameter stems, 100 µm height, and 110 µm diameter mushroom tips with 160 µm center-to-center spacing. The unstructured sample was molded against the same substrate so that it has the same surface properties as the fiber samples. Since the terminal fibers are identical between the three fiber samples, the only difference between them is the contact area fraction, and the structure beneath the terminal fibers. In the Single Level case, this structure is a solid backing layer of the polyurethane. In the hierarchical samples, this structure is an array of larger base fibers. The base fibers are intended to make the sample effectively more compliant. However, along with the increased compliance, the contact area fraction (area—open space between fibers) is significantly reduced. The total contact area fraction for the Double Level samples is the product of the contact area fraction of the terminal layer (36%) and the contact area fraction of the base layer. The contact area fraction of the unstructured sample is 100%.

Figure 27:
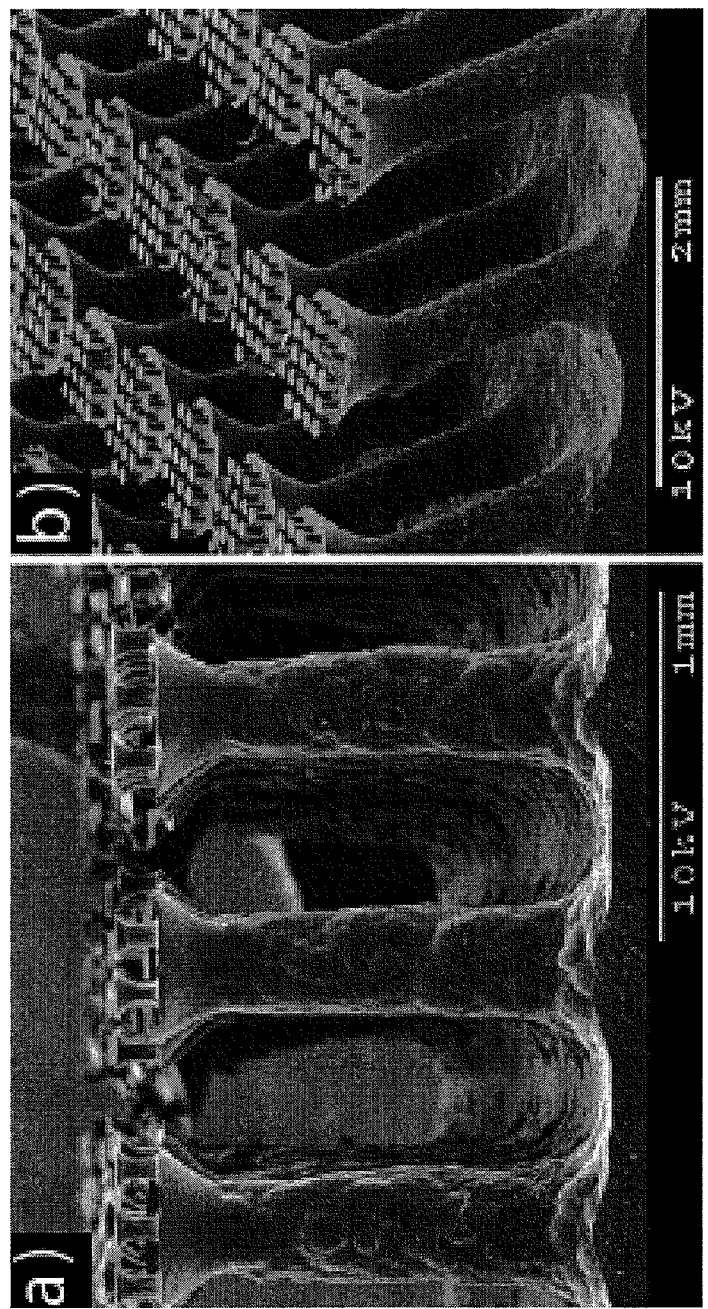
FIG. 27 provides SEM images of two embodiments of double level hierarchical fibers fabricated according to the present invention.

FIG. 27 illustrates Scanning Electron Micrographs of Double Level hierarchical fiber samples. FIG. 27*a* illustrates Double Level Vertical, and FIG. 27*b* illustrates Double Level Angled. The large areas between the fiber tips significantly reduce the total contact area fraction.

The four samples were tested using a 12 mm hemispherical smooth glass indenter. Because the extension length of the Double Level samples is high (mm scale), a retraction speed of 200 µm/s was chosen to minimize the duration of the experiments. Similarly, the approach speed was set to 50 µm/s. Although viscoelastic effects are present due to the relatively high strain rate, these experiments are intended to compare the hierarchical structures to the previously characterized Single Level Fibers and unstructured samples in a relative manner, not to determine their quantitative adhesive characteristics. Five experiments were performed on the same area of each sample at each specified preload between 2 mN and 400 mN.

Figure 28:
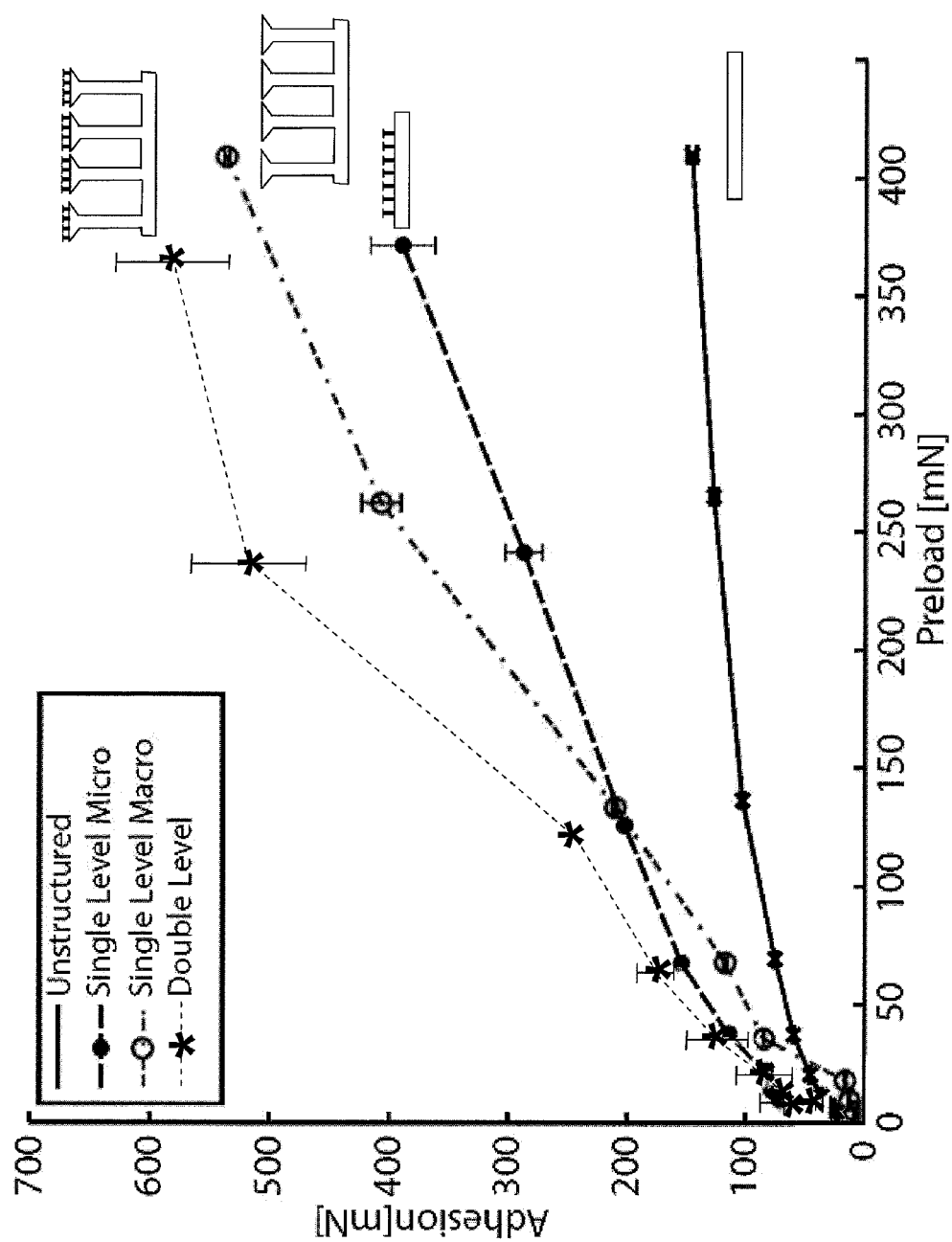
FIG. 28 provides comparison data on adhesion of unstructured, single level, double level angled, and double level vertical fibrillar materials.

The resulting performance curves are plotted together in FIG. 28. In particular, FIG. 28 illustrates the performance curves for unstructured, single level, double level angled, and double level vertical samples against a 12 mm diameter glass hemisphere. Error bars represent standard deviations. The double level vertical fibers generally exhibit the highest adhesion.

Results from the experiments in FIG. 28 indicate that for low preloads, the four samples exhibit similar adhesion. However, for larger preloads, the adhesion of the two vertical fiber samples (Single Level and Double Level Vertical) increase at a faster rate than the increase for the unstructured sample. The reason for this increase is that as the indenter is pressed further into contact with the fibers with increasing preloads, the fibers deform and allow neighboring fibers to come into contact with the indenter. This is true for all of the fiber samples, especially the Double Level samples, which have highly increased compliance. The contact zone of the indenter on the unstructured sample does not increase as much as in the case of the fiber samples, so the increase in adhesion with increasing preloads is modest. The decrease in adhesion for the Double Level Angled sample for preloads greater than 128 mN is results from detachment during the preloading phase when the indentation depth becomes too high. The angled fibers detach under high preloads and do not contribute to the adhesion during separation.

Since a hemispherical indenter represents a special case of a rough surface, these result suggest that the Double Level Vertical fibers provide higher adhesion against surfaces with high amplitude (mm scale) roughness.

Figure 29A:
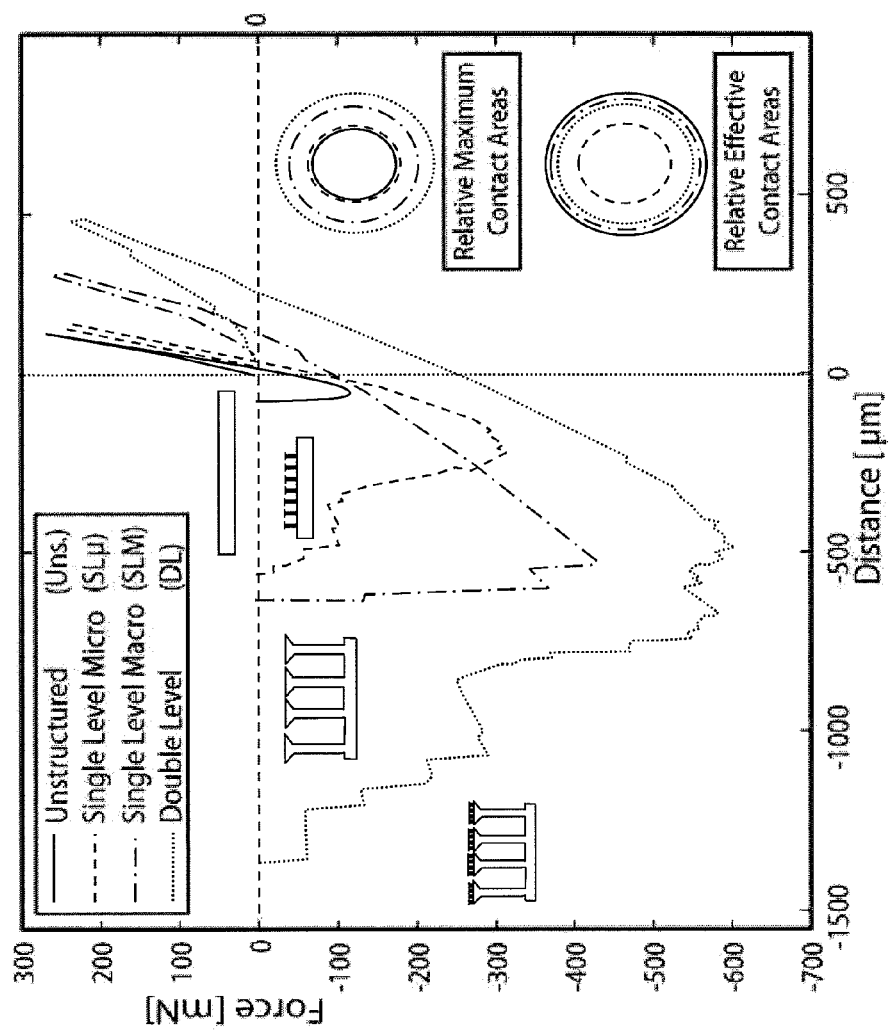
FIG. 29 provides comparison data on force-distance of unstructured, single level, double level angled, and double level vertical fibrillar materials.

To examine the sample-indenter interaction in more detail, the Force-Distance data for the four samples are plotted together in FIG. 29. In particular, FIG. 29a illustrates Force-Distance curves for the samples tested at a preload of 128 mN. FIG. 29b illustrates Maximum adhesion. FIG. 29c illustrates Adhesion pressures. FIG. 29d illustrates Dissipated energy. FIG. 29e illustrates Total Work of Adhesion. The experimental parameters for these tests were the same as above, and the preload was set to 128 mN. The unstructured sample saw a higher preload due to over-shoot during the indenting phase, its high stiffness and the small time delay in stopping and retracting the indenter caused a higher preload than for the other more compliant samples. The indentation depth (maximum positive distance) of the indenter for the unstructured sample and single level sample are similar (73 μm and 93 μm, respectively), with the fiber sample being more compliant. The Double Level Vertical sample is significantly more compliant, with an indentation depth of 305 μm, and the most compliant sample was the Double Level Angled sample with an indentation depth of 350 μm.

Using the indentation depths of from these data, it is possible to estimate the size of the contact zone using the geometrical equations for a spherical cap. The contact zone area $a_{cz}$ is found as $$a_{cz} = \pi \Delta_p (2R - \Delta_p) \quad (2)$$

where $\Delta_p$ is the indentation depth and R is the radius of the hemi-spherical indenter. The contact zone areas for these tests were found to be 2.7 mm$^2$, 3.5 mm$^2$, 12.8 mm$^2$, and 11.2 mm$^2$ for the Unstructured, Single Level Fiber, Double Level Angled, and Double Level Vertical samples, respectively. Multiplying the estimated contact zone areas by the contact area fraction for each sample results in an estimate for the real contact area. For the four samples, the real contact areas were found to be 2.7 mm$^2$, 1.26 mm$^2$, 1.28 mm$^2$, and 2.18 mm$^2$ for the Unstructured, Single Level Fiber, Double Level Angled, and Double Level Vertical samples, respectively. Therefore, the enhancements due to contact splitting and load sharing for the Double Level Vertical sample increased the adhesion.

The adhesions, maximum negative force, for the samples are compared in FIG. 29b. The Double Level Vertical exhibited the highest adhesion, followed by the Single Level Fiber, Double Level Angled, and Unstructured samples, respectively. The adhesion pressures, which are calculated by dividing the adhesion values by the estimated contact zone areas are shown in FIG. 29c. The adhesion pressures of the hierarchical samples are significantly lower than the unstructured and single level fiber samples, likely due to their significantly lower contact area fraction. Furthermore, the small contact area of the Unstructured and Single Level Fiber samples means that the contact area of the indenter was relatively locally flat (less than 100 μm of height change), while the contact area of the Double Level samples contacted parts of the indenter with over 300 μm of height difference. Despite the lower adhesion pressure of the Double Level Vertical sample, due to its roughness adaptation characteristics, it was able to adhere to the indenter with higher adhesion than the other samples. The hierarchical structure was able to more than make up for a contact area fraction of less than 20%, exhibiting the best adhesion performance against the uneven geometry of the indenter.

The Force-Distance data can be used to calculate the energy dissipated during detachment for each of the samples, which indicates the toughness of an interface. This energy is seen in FIG. 29 as the area under the retraction curve for each sample. The high retraction extension of the Double Level samples requires a higher amount of energy to be expended during detachment. FIG. 29d shows the dissipated energy of each sample. Very little energy is required to separate the Unstructured sample, while the Single Level Fiber, 31 Double Level Angled, and Double Level Vertical each require increasingly more energy, with the Double Level Vertical sample requiring 39.4 times as much energy than the unstructured sample. FIG. 29e shows the work of adhesion of each sample, a value calculated by dividing the dissipated energy by the estimated contact zone area. The hierarchy samples, even with much larger contact zones, exhibited higher work of adhesion than the unstructured sample, with the Double Level Vertical sample exhibiting the highest work of adhesion, with 9.6 times as much as the unstructured sample.

Figure 30:
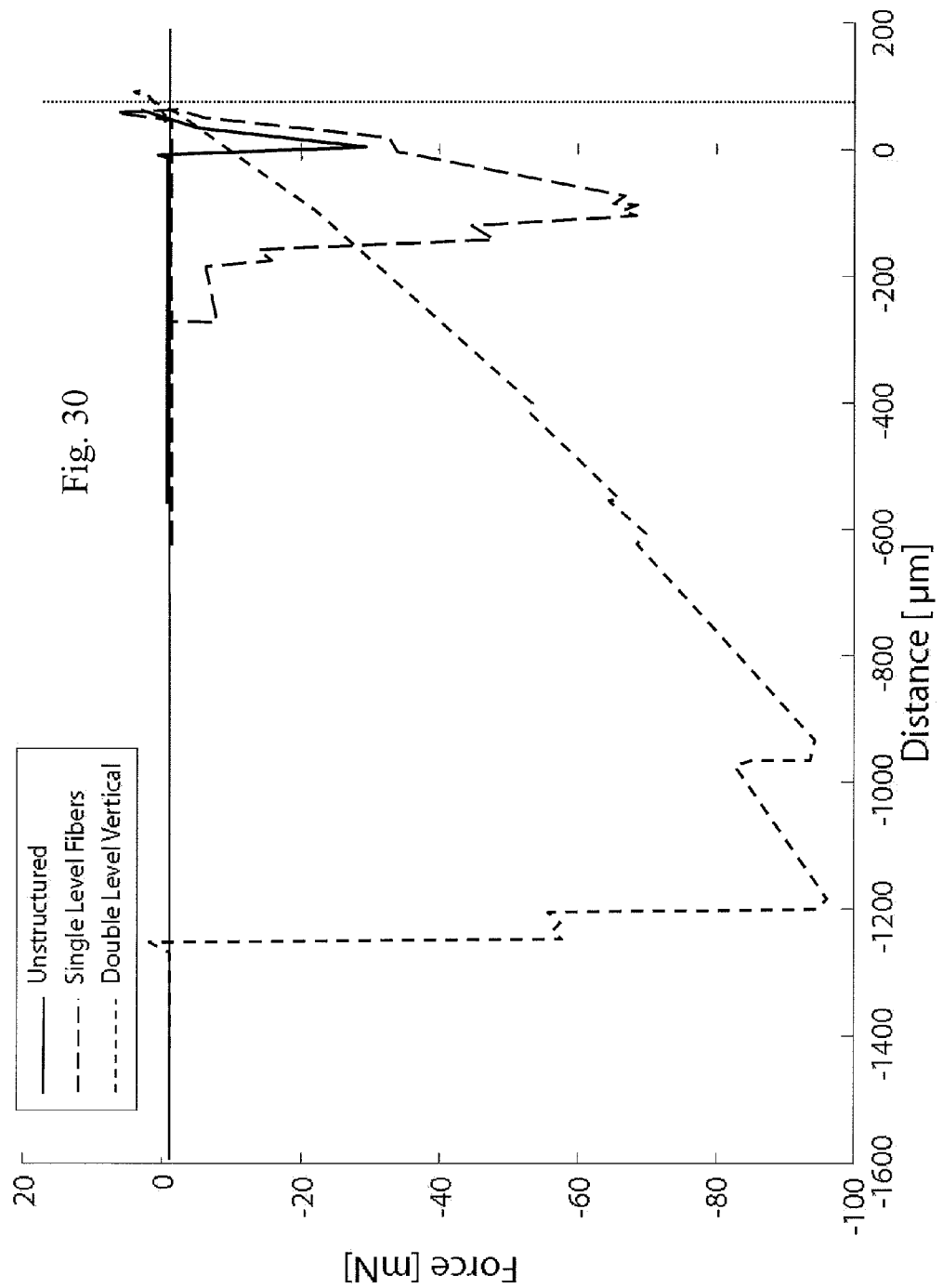
FIG. 30 provides comparison data on force-distance of unstructured, single level, and double level vertical fibrillar materials.

The advantage of hierarchical fibers does not only appear at large preloads, it is also evident at low preloads as well. FIG. 30 illustrates Force-Distance curves for the samples tested at a preload of 5 mN. In particular, FIG. 30 depicts Force-Distance data for the Double Level Vertical sample along with the Single Level Fibers and the unstructured sample tested at a preload of 5 mN. In this test, hierarchical structures extended over 1.2 mm and adhered with over 96 mN after being preloaded with only 5.5 mN, dissipating 10 times as much energy during detachment as the unstructured sample, and 7.8 times as much energy as the Single Level Fiber sample.

Figure 31:
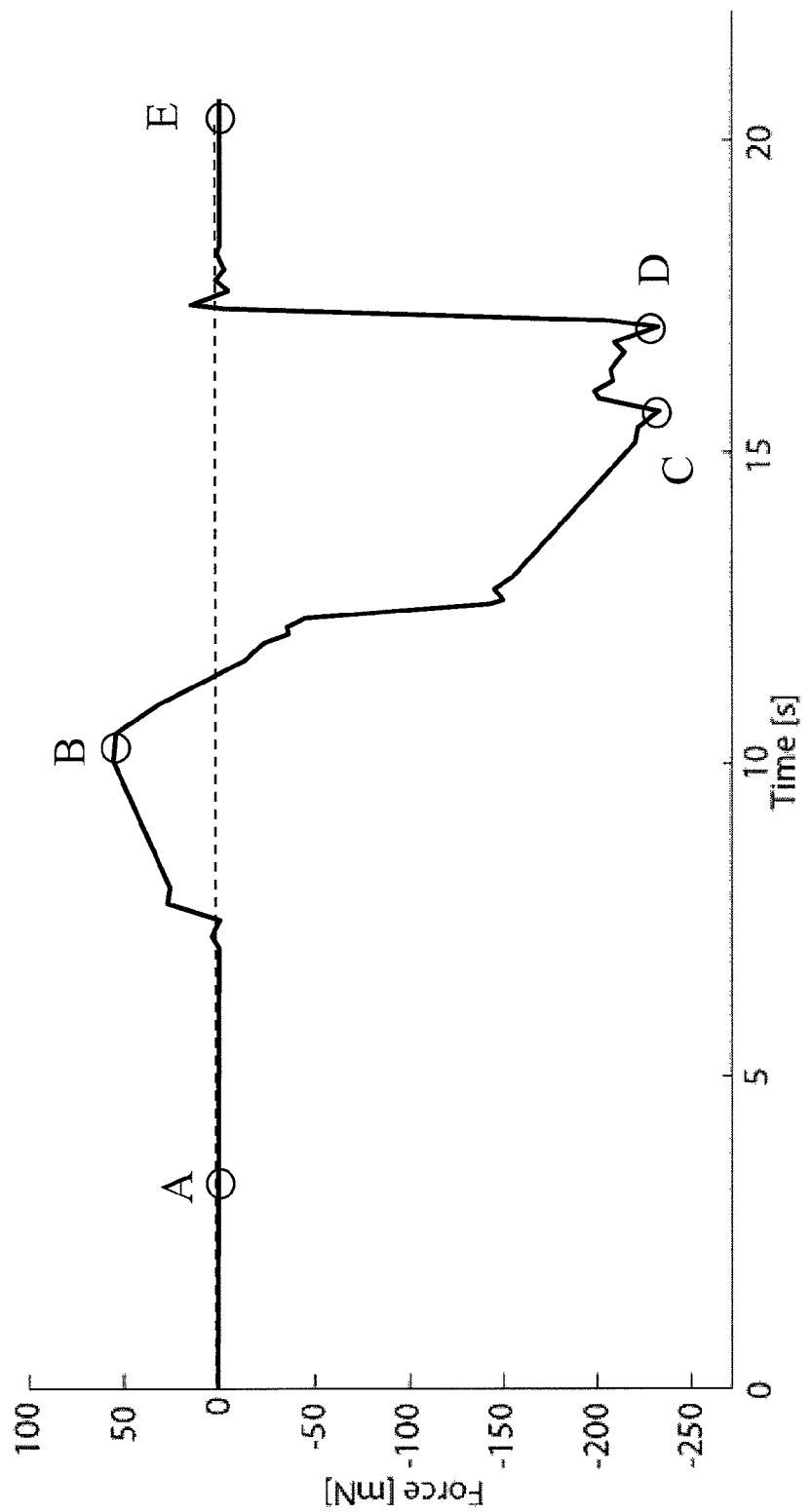

To examine the behavior of a hierarchical sample interacting with an uneven surface, an experiment was run while recording a video of the side view of the sample. The test data (force vs. time) is illustrated in FIG. 31. Frames from associated still side-view video images are shown below the data in the same figure showing the approach (FIG. 31a), maximum preload condition (FIG. 31b), maximum adhesion (FIG. 31c), the last frame before final detachment (FIG. 31d), and the fibers returned to their original configuration (FIG. 31e). The edge of the sphere is outlined for clarity. During retraction, both the terminal tip fibers and base fibers are observed to stretch as the sample maintains contact with the indenter for large extensions (FIGS. 31c and 31d).

1.5 Repeatability

Figure 32:
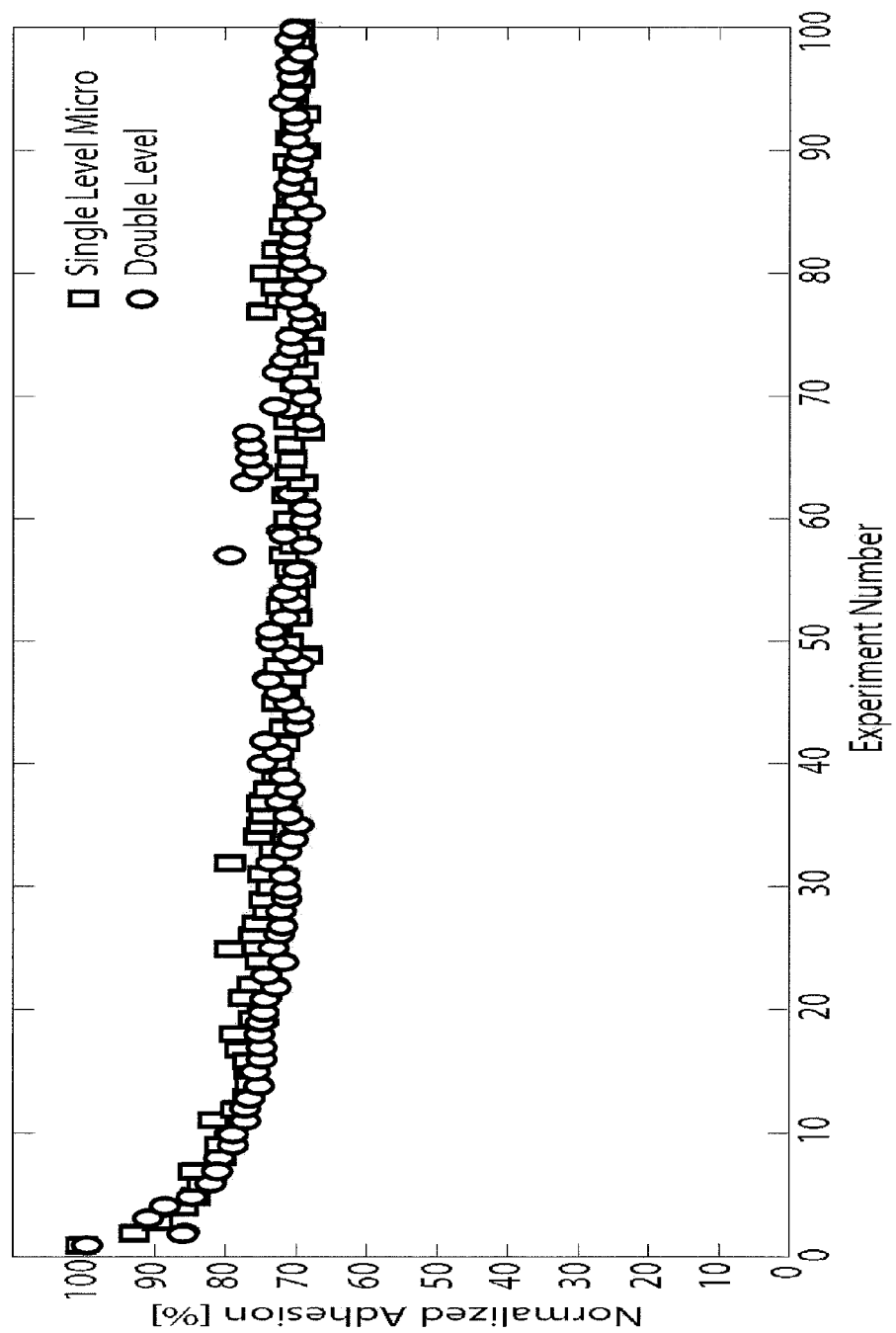
FIG. 32 illustrates data indicative of the repeatability of the present invention.

FIG. 32 illustrates data indicative of the repeatability of the present invention. In particular, the normalized adhesion is fairly constant with increasing numbers of experiments, indicating that the adhesives retain their performance over many attachment and detachment cycles.

Although the present invention has generally been described in terms of specific embodiments and implementations, the present invention is applicable to other methods, apparatuses, systems, and technologies. The examples provided herein are illustrative and not limiting, and other variations and modifications of the present invention are contemplated. Those and other variations and modifications of the present invention are possible and contemplated, and it is intended that the foregoing specification and the following claims cover such modifications and variations.

The invention claimed is:

1. A method of forming a dry adhesive with a structure including a backing layer and a non-perpendicular stem, wherein the stem includes first and second ends on opposite sides of the stem, and wherein the first end of the stem is connected to the backing layer, comprising:
   applying a liquid polymer to the second end of the stem;
   contacting the liquid polymer on the stem with a tip shaping surface;
   bending the stem relative to the backing layer while contacting the liquid polymer on the stem with the tip shaping surface to form an angle $\beta$ relative to an imaginary line perpendicular to the backing layer, wherein $\beta$ is greater than $\theta$ and less than ninety degrees;
   curing the liquid polymer to form a tip having an expanded surface on the second end of the stem while bending the stem relative to the backing layer and while contacting the liquid polymer on the stem with the tip shaping surface;
   removing the tip from the tip shaping surface after the liquid polymer cures, wherein after removing the tip from the tip shaping surface (i) the stem forms an angle $\theta$ relative to an imaginary line perpendicular to the backing layer, wherein $\theta$ is greater than zero and less than ninety degrees, and (ii) the expanded surface of the tip forms an angle $\beta-\theta$ relative to an imaginary plane parallel to the backing layer.

2. The method of claim 1, wherein applying a liquid polymer to the second end of the stem includes:
   dipping the second end of the stem in a liquid polymer; and
   removing the second end of the stem from the liquid polymer after the liquid polymer is applied to the second end of the stem.

3. The method of claim 1, wherein contacting the liquid polymer on the stem with a tip shaping surface includes forming an expanded surface in the liquid polymer.

4. The method of claim 3, wherein forming an expanded surface in the liquid polymer includes forming a planar surface in the liquid polymer where the liquid polymer contacts the tip shaping surface.

5. The method of claim 3, wherein the expanded surface of the tip has an area that is greater than a cross-sectional area of the second end of the stem in a plane parallel to the expanded surface of the tip.

6. The method of claim 1, wherein curing the liquid polymer to form a tip includes forming an expanded surface on the tip where the tip contacts the tip shaping surface.

7. The method of claim 6, wherein:
   the expanded surface of the tip is planar; and
   the expended surface of the tip is not parallel to the backing layer after removing the tip from the tip shaping surface.

8. The method of claim 6, wherein curing the liquid polymer includes forming an expanded surface indicative of the tip shaping surface.

9. The method of claim 1, further comprising:
   maintaining the backing layer parallel to the tip shaping surface when bending the stem relative to the backing layer; and
   maintaining the backing layer parallel to the tip shaping surface when curing the liquid polymer.

10. The method of claim 1, wherein bending the stem includes applying a load to the backing layer.

11. The method of claim 1, wherein bending the stem includes bending the stem in a direction away from a perpendicular orientation with the backing layer.

12. The method of claim 1, wherein the dry adhesive includes a backing layer and a plurality of non-perpendicular stems, wherein each of the stems includes first and second ends on opposite sides of the stem, and wherein the first end of the stem is connected to the backing layer, and wherein:
   applying a liquid polymer includes applying a liquid polymer to the second end of the plurality of stems;
   contacting the liquid polymer includes contacting the liquid polymer on the plurality of stems with a tip shaping surface;
   bending includes bending the plurality of stems relative to the backing layer while contacting the liquid polymer on the stems with the tip shaping surface;
   curing the liquid polymer includes curing the liquid polymer to form a tip on the second end of the plurality of stems while bending the stems relative to the backing layer and while contacting the liquid polymer on the stems with the tip shaping surface; and
   removing includes removing the tip from the tip shaping surface after the liquid polymer cures.

13. A method of forming a dry adhesive with a structure including a backing layer and a non-perpendicular stem, wherein the stem includes first and second ends on opposite sides of the stem, and wherein the first end of the stem is connected to the backing layer, comprising:
   applying a liquid polymer to the second end of the stem;
   contacting the liquid polymer on the stem with a tip shaping surface;
   forming an expanded, planar surface in the liquid polymer where the liquid polymer contacts the tip shaping surface;
   curing the liquid polymer to form a tip having an expanded surface on the second end of the stem while bending the stem relative to the backing layer and while contacting the liquid polymer on the stem with the tip shaping surface;
   bending the stem relative to the backing layer while contacting the liquid polymer on the stem with the tip shaping surface, wherein bending the stem includes bending the stem in a direction away from a perpendicular orientation with the backing layer to form an angle $\beta$ relative to an imaginary line perpendicular to the backing layer, wherein $\beta$ is greater than $\theta$ and less than ninety degrees;
   maintaining the backing layer parallel to the tip shaping surface when bending the stem relative to the backing layer;
   curing the liquid polymer to form a tip on the second end of the stem while bending the stem relative to the backing layer and while contacting the liquid polymer on the stem with the tip shaping surface, wherein the expanded surface of the liquid polymer forms an expanded surface of the tip during curing, wherein the expanded surface of the tip has an area that is greater than a cross-sectional area of the second end of the stem in a plane parallel to the expanded surface of the tip;
   maintaining the backing layer parallel to the tip shaping surface when curing the liquid polymer; and
   removing the tip from the tip shaping surface after the liquid polymer cures, wherein the expanded surface of the tip is not parallel to the backing layer, wherein after removing the tip from the tip shaping surface (i) the stem forms an angle θ relative to an imaginary line perpendicular to the backing layer, wherein θ is greater than zero and less than ninety degrees, and (ii) the expanded surface of the tip forms an angle β−θ relative to an imaginary plane parallel to the backing layer.

14. The method of claim 13, wherein the dry adhesive includes a backing layer and a plurality of non-perpendicular stems, wherein each of the stems includes first and second ends on opposite sides of the stem, and wherein the first end of the stem is connected to the backing layer:

applying a liquid polymer includes applying the liquid polymer to the second end of the plurality of stems;

contacting the liquid polymer includes contacting the liquid polymer on the stems with a tip shaping surface;

forming includes forming an expanded, planar surface in the liquid polymer on the stems where the liquid polymer contacts the tip shaping surface;

bending includes bending the stems relative to the backing layer while contacting the liquid polymer on the stems with the tip shaping surface, wherein bending the stem includes bending the stems in a direction away from a perpendicular orientation with the backing layer;

maintaining the backing layer parallel to the tip shaping surface includes maintaining the backing layer parallel to the tip shaping surface when bending the stems relative to the backing layer;

curing the liquid polymer includes curing the liquid polymer to form a tip on the second end of the stems while bending the stems relative to the backing layer and while contacting the liquid polymer on the stems with the tip shaping surface, wherein the expanded surface of the liquid polymer forms an expanded surface of the tips during curing, wherein the expanded surface of the tips has an area that is greater than a cross-sectional area of the second end of a corresponding stem in a plane parallel to the expanded surface of the tip; and removing includes removing the tips from the tip shaping surface after the liquid polymer cures, wherein the expanded surface of the tips is not parallel to the backing layer after removing the tips from the tip shaping surface.

* * * * *